US 11,960,049 B2

(12) United States Patent
Grace et al.

(10) Patent No.: US 11,960,049 B2
(45) Date of Patent: Apr. 16, 2024

(54) TURBULENCE MONITORING AND FORECASTING SYSTEMS AND METHODS

(71) Applicants: Grains Research and Development Corporation, Barton (AU); Western Australian Agriculture Authority, South Perth (AU)

(72) Inventors: Warwick Grace, Bellevue Heights (AU); Graeme Tepper, Lysterfield (AU); Amy Stidworthy, Cambridge (GB); Martin Seaton, Cambridge (GB); David Carruthers, Cambridge (GB)

(73) Assignees: The Western Australian Agriculture Authority, South Perth (AU); Grains Research and Development Corporation, Barton (AU)

( * ) Notice: Subject to any disclaimer, the term of this patent is extended or adjusted under 35 U.S.C. 154(b) by 5 days.

(21) Appl. No.: 17/597,002

(22) PCT Filed: Jun. 25, 2020

(86) PCT No.: PCT/AU2020/050647
§ 371 (c)(1),
(2) Date: Dec. 22, 2021

(87) PCT Pub. No.: WO2020/257859
PCT Pub. Date: Dec. 30, 2020

(65) Prior Publication Data
US 2023/0194751 A1    Jun. 22, 2023

(30) Foreign Application Priority Data
Jun. 25, 2019   (AU) ................................ 2019902210

(51) Int. Cl.
  *G01W 1/06*  (2006.01)
  *G01W 1/00*  (2006.01)
  *G01W 1/10*  (2006.01)

(52) U.S. Cl.
  CPC ................ *G01W 1/06* (2013.01); *G01W 1/00* (2013.01); *G01W 2001/003* (2013.01);
  (Continued)

(58) Field of Classification Search
  CPC ............ G01W 1/06; G01W 2001/003; G01W 2001/006; G01W 2203/00; G01W 1/00; G01W 1/10
  See application file for complete search history.

(56) References Cited

U.S. PATENT DOCUMENTS 7,114,388 B1    10/2006  French et al.
2007/0145191 A1  6/2007  Smith et al.
(Continued)

OTHER PUBLICATIONS

Hofman et al. ("Reducing Spray Drift", North Dakota State University, Agricultural and Biosystems Engineering, North Dakota, Jun. 2017) (Year: 2017).*
(Continued)

Primary Examiner — Manish S Shah
Assistant Examiner — Christian T Bryant
(74) Attorney, Agent, or Firm — Knobbe, Martens, Olson & Bear, LLP

(57) ABSTRACT

Systems and methods are for determining and/or forecasting local atmospheric stability and/or turbulence. This information can be used to inform decisions regarding crop spraying, such as whether the atmospheric conditions are sufficiently turbulent to avoid airborne spray fines drifting in an undesirable manner. For example, a spray drift hazard alert system can include a data logger. The data logger is configured to: receive local meteorological observation data from one or more sensors at a location, analyze the data to
(Continued)

determine a local vertical turbulence characteristic indicative of a current level of vertical turbulence at the location, compare the vertical turbulence characteristic with a predetermined threshold of the vertical turbulence characteristic, and transmit information to a client device indicating whether local meteorological conditions are suitable for crop spraying based on the comparison between the vertical turbulence characteristic and the predetermined threshold.

22 Claims, 22 Drawing Sheets

(52) U.S. Cl.
CPC ........ *G01W 2001/006* (2013.01); *G01W 1/10* (2013.01); *G01W 2203/00* (2013.01)

(56) References Cited

U.S. PATENT DOCUMENTS

2013/0103211 A1    4/2013   Peterson et al.
2019/0246579 A1*   8/2019   Anderson .............. A01G 25/16

OTHER PUBLICATIONS

Hofman ("Spray Equipment and Calibration", North Dakota State University, Agricultural and Biosystems Engineering, North Dakota , Mar. 2018) (Year: 2018).*
International Search Report in PCT/AU2020/050647, dated Aug. 10, 2020.
Crabbe, R.S., "The Influence of Atmospheric Stability on Wind Drift from Ultra-Low-Volume Aerial Forest Spray Applications," Journal of Applied Meteorology, vol. 33, Issue 4 (1994) pp. 500-507.
Craig, I.P., "The GDS model—a rapid computational technique for the calculation of aircraft spray drift buffer distances," Computers and Electronics in Agriculture 43 (2004) 235-250.
Grace, W. and Tepper, G., "Measurements of the Ratio of the Components of Turbulence Kinetic Energy in the Surface Layer," AMOS/ARCCSS National Conference Feb. 8-11, 2016, Minutes to Millennia traversing the scales, MCEC, Melbourne, p. 330 (2 pages).

* cited by examiner

301 — receiving local meteorological observation data from one or more sensors at a location 302 — analysing the data to determine a local vertical turbulence characteristic indicative of a current level of vertical turbulence at the location 303 — comparing the vertical turbulence characteristic with a predetermined threshold of the vertical turbulence characteristic 304 — providing information to a user indicating whether local atmospheric stability conditions are suitable for crop spraying based on the comparison between the vertical turbulence characteristic and the predetermined threshold

Fig.3

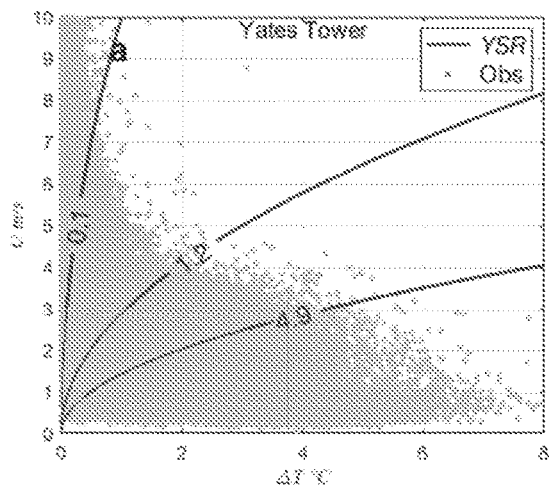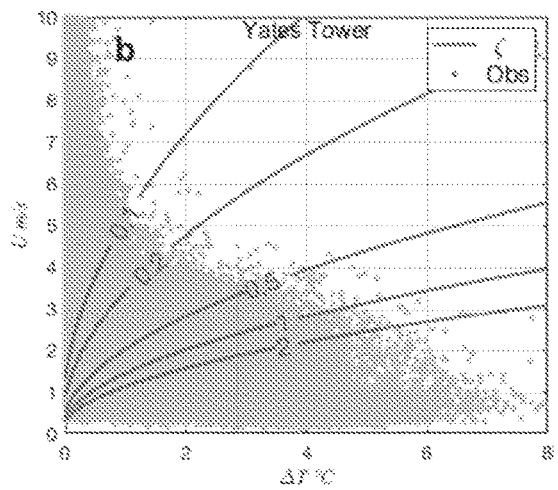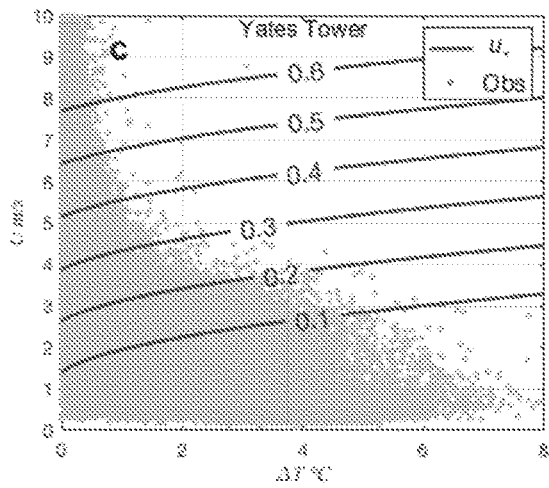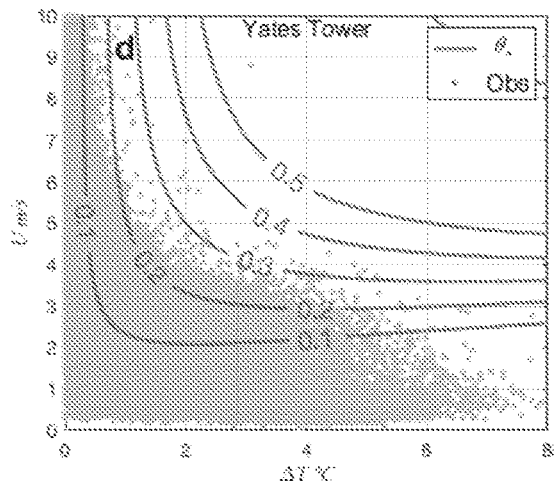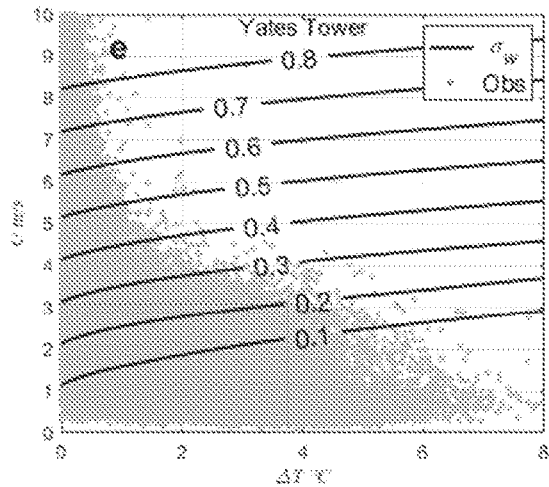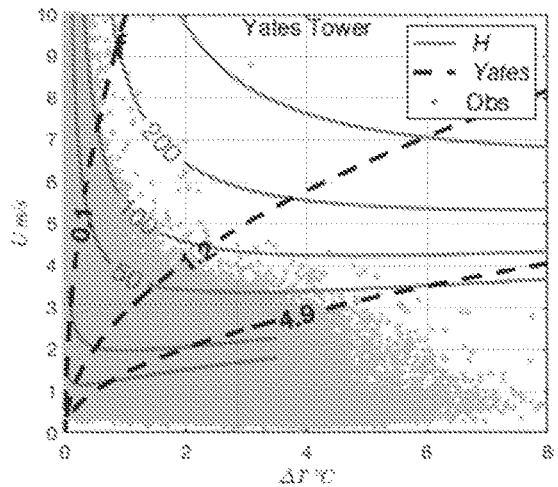
Fig.7

A graphical representation of the % accuracy figures in Tables 7 to 14: % accuracy by hour of the day by station. Note the scale on the y-axis starts at 70%.

TURBULENCE MONITORING AND FORECASTING SYSTEMS AND METHODS

TECHNICAL FIELD

Embodiments generally relate to systems and methods for determining and/or forecasting local atmospheric stability and/or turbulence. This information can then be used to inform decisions regarding crop spraying, such as whether the atmospheric conditions are sufficiently turbulent to avoid airborne spray fines drifting in an undesirable manner, for example. Alternatively, the turbulence information may be used to predict the movement or dispersion of other airborne substances, such as airborne particles, dust, smoke, combustion products, pollution, volatile organic compounds (VOC), synthetic compounds, pesticides, fungicides, herbicides, fertilisers, foreign compounds, odour compounds, pollen, seeds, fungal spores, insects, water (or moisture/humidity), carbon dioxide, nitrous oxides, methane, or other classes of or specific gases or molecules, for example.

BACKGROUND

Agricultural crop spraying is typically performed during neutral or unstable atmospheric conditions. Heavier droplets or particles fall onto the target crop, while some lighter droplets, particles or vapours (which may be referred to as 'fines', e.g., smaller than approximately 100 microns in diameter) can sometimes become airborne. The fines are usually quickly dispersed to low concentrations in the atmosphere via turbulent mixing.

There are certain limitations to crop spraying, for example, if the wind is too strong, some of the heavier particles or droplets may also become airborne and not be deposited on the target crop, and in high temperature/low humidity conditions (i.e., hot and dry), crop spraying is typically avoided due to water-stress in crops and high evaporation of spray droplets, which can lead to airborne particles or small droplets with high concentrations of active chemicals.

On the other hand, during temperature inversion conditions near the surface, there is typically less turbulence. Therefore, spraying during inversion conditions may result in airborne fines being suspended near the surface in relatively high concentrations (as there may be insufficient turbulence-driven mixing and dispersion) and potentially drifting in an undesirable manner to be deposited in off target areas, such as other crops or natural environments in relatively high concentrations, compared with spraying in neutral or unstable conditions.

Therefore, current guidance for pesticide spraying in agricultural settings is that neutral atmospheric conditions are preferred (or in some cases mandated) and to avoid spraying if an atmospheric temperature inversion exists near the surface.

There are existing systems and methods that spray applicators can use for determining if an inversion exists and deciding whether to spray. However, in Australia, inversion conditions occur in most places on most nights and therefore preclude spraying for substantial periods of time. Such restrictions are particularly limiting when combined with the need to avoid hot and dry conditions, which are common during the day in parts of Australia at certain times of the year.

It is desired to address or ameliorate one or more shortcomings or disadvantages associated with existing systems or methods for determining local atmospheric stability and/or safe crop spraying conditions, or to at least provide a useful alternative.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

It has been found that there are some cases in which there is sufficient turbulent mixing to allow for crop spraying during inversion conditions while avoiding spray fines drifting in an undesirable manner. The systems and methods described herein are directed to determining a local vertical turbulence characteristic and comparing it against a threshold indicating whether there is sufficient vertical turbulence for sufficient dispersion of spray fines (or other airborne substances) in a particular area, whether or not inversion conditions are present.

Some embodiments relate to a turbulence monitoring system comprising a processing unit configured to:
  receive local meteorological observation data from one or more sensors at a location;
  analyse the data to determine a local vertical turbulence characteristic indicative of a current level of vertical turbulence at the location; and
  transmit information to a client device indicating a level of vertical turbulence based on the vertical turbulence characteristic.

In some embodiments, the level of vertical turbulence may be used to predict a degree of dispersion of airborne substances, such as a specific type of airborne substance, a particular droplet size or a particular particle size, for example.

In some embodiments, the processing unit may be configured to compare the vertical turbulence characteristic with a predetermined threshold of the vertical turbulence characteristic. The predetermined threshold of the vertical turbulence characteristic may be selected such that it is associated with a level of vertical turbulence that is sufficient for dispersing a specific airborne substance, particle size or droplet size to a certain desired degree. For example, the predetermined threshold of the vertical turbulence characteristic may be associated with local meteorological conditions which are suitable for crop spraying.

In some embodiments, the processing unit may comprise a data logger approximately co-located with the one or more sensors and configured to receive and record measured sensor data from the one or more sensors.

In some embodiments, the processing unit may be remote from the one or more sensors. For example, the processing unit may comprise a server configured to receive data transmitted from the one or more sensors. The sensors may be configured to transmit data directly to the server, or in some embodiments, the system may further comprise a data logger approximately co-located with the one or more sensors and configured to receive data from the one or more sensors and transmit the data to the server.

In some embodiments, the turbulence monitoring system may comprise a spray drift hazard alert system.

Some embodiments relate to a spray drift hazard alert system comprising a data logger configured to:
- receive local meteorological observation data from one or more sensors at a location;
- analyse the data to determine a local vertical turbulence characteristic indicative of a current level of vertical turbulence at the location;
- compare the vertical turbulence characteristic with a predetermined threshold of the vertical turbulence characteristic; and
- transmit information to a client device indicating whether local meteorological conditions are suitable for crop spraying based on the comparison between the vertical turbulence characteristic and the predetermined threshold.

The vertical turbulence characteristic may comprise any suitable measure of the vertical turbulence. In some embodiments, the vertical turbulence characteristic may comprise the standard deviation of the vertical wind speed $\sigma_w$. That is, the standard deviation of fluctuations in the vertical wind speed w. In some embodiments, the vertical turbulence characteristic may comprise one or more of: the standard deviation, variance, average absolute deviation, median absolute deviation, and interquartile range of fluctuations in the vertical wind speed. In some embodiments, the vertical turbulence characteristic may comprise a ratio or other quantity related to the vertical turbulence, such as a ratio or other quantity dependent on fluctuations in vertical wind speed, for example.

In some embodiments, the system may comprise the one or more sensors. The one or more sensors may be mounted on an observation tower at predetermined heights above local ground level. The observation tower may comprise any suitable structure meeting the predetermined heights, such as a purpose built observation tower or an existing structure such as a power pylon or antenna tower, for example. In some embodiments, the system may comprise a plurality of spaced observation towers defining a network covering a region, each observation tower supporting a set of the one or more sensors. Each of the sets of one or more sensors may transmit observation data (directly or indirectly) to a central one of the processing unit for data analysis to determine the vertical turbulence characteristic at each observation tower, or to determine an interpolated vertical turbulence characteristic at a particular location in the region, such as a client device location, for example.

The one or more sensors may include: a first temperature sensor configured to measure atmospheric temperature at a first height; a second temperature sensor configured to measure atmospheric temperature at a second height; and an anemometer configured to measure horizontal wind characteristics at a third height. In some embodiments, the one or more sensors may further include a second anemometer configured to measure horizontal wind characteristics at a fourth height.

In some embodiments, the one or more sensors may include other sensors such as sensors to detect and/or measure one or more airborne substances selected from: airborne particles, dust, smoke, combustion products, pollution, volatile organic compounds (VOC), synthetic compounds, pesticides, fungicides, herbicides, fertilisers, foreign compounds, odour compounds, pollen, seeds, fungal spores, insects, water (or moisture/humidity), carbon dioxide, nitrous oxides, methane, or other classes of or specific gases or molecules. This may allow monitoring of the movement of such particles/compounds/gases across a region covered by a network of observation towers.

The horizontal wind characteristics may include: a first horizontal wind speed component in the general wind direction (e.g., wind direction averaged over a predetermined period, such as 1, 2, 3, 5, 8, 10, 20 minutes); a second horizontal wind speed component perpendicular to the first horizontal wind speed component across the general wind direction; a standard deviation of the first horizontal wind speed component; and a standard deviation of the second horizontal wind speed component, for example. The standard deviations of the first and second horizontal wind speed components may be determined by measuring wind speed fluctuations and calculating the standard deviation.

The predetermined heights may be selected as desired for different applications. For example, the third height may be approximately 2 m above local ground level, or approximately 10 m above local ground level. These heights are commonly selected for measuring wind speed, but any other suitable height may be selected. In some embodiments, the second height is greater than the first height, and third height is approximately equal to the geometric mean of the first and second heights. In some embodiments, the third height may be less than 10 m, less than 5 m, less than 4 m, less than 3 m, less than 2.5 m or less than 2 m, for example.

In some embodiments, the one or more sensors include a sonic anemometer configured to measure the vertical wind speed at a predetermined height above ground level. In some embodiments, the vertical turbulence characteristic is determined based only on temperature data from the first and second temperature sensors, and horizontal wind data from the anemometer. In some embodiments, the vertical turbulence characteristic comprises the standard deviation of the vertical wind speed.

Determining the vertical turbulence characteristic may comprise calculating a first estimate of the vertical turbulence characteristic based on an atmospheric stability index, and then calculating a second estimate of the vertical turbulence characteristic based on horizontal wind characteristics and the first estimate of the vertical turbulence characteristic. For example, the horizontal wind characteristics may include: a first horizontal wind speed component in the general wind direction; a second horizontal wind speed component perpendicular to the first horizontal wind speed component across the general wind direction; a standard deviation of the first horizontal wind speed component; and a standard deviation of the second horizontal wind speed component. A first estimate of the standard deviation of the vertical wind speed may be determined iteratively using an atmospheric stability index based on the first and second temperatures and the first and second horizontal wind speed components. A second estimate of the standard deviation of the vertical wind speed may be determined based on the standard deviations of the first and second horizontal wind speed components and the first estimate of the standard deviation of the vertical wind speed. The vertical turbulence characteristic may comprise or consist of the second estimate of the standard deviation of the vertical wind speed.

In some embodiments, the data logger may be configured to communicate with one or more user devices or client devices over a communication network to transmit information to the client device indicating whether local meteorological conditions are suitable for crop spraying. In some embodiments, the data logger may be configured to communicate with the one or more client devices via a server. In some embodiments, the server may transmit the information from the data logger to the client devices via a web based portal, via email, or via SMS text message, for example.

Some embodiments relate to a network system comprising a plurality of turbulence monitoring systems (or spray drift hazard alert systems) arranged at spaced locations across a region. Each processing unit (or data logger) may be approximately co-located with the associated one or more sensors mounted on an observation tower of each respective turbulence monitoring system (or spray drift hazard alert system).

In some embodiments, the plurality of turbulence monitoring systems (or spray drift hazard alert systems) may be arranged in a substantially hexagonal array. However, the precise location of each observation tower or system may vary from an ideal hexagonal array due to certain constraints, such as land availability or topography, for example. An average spacing distance between adjacent observation towers may be in the range of 1 km to 100 km, 1 km to 80 km, 5 km to 20 km, 20 km to 100 km, 30 km to 90 km, 40 km to 80 km, or 50 km to 70 km, or the spacing distance may be more than 100 m and less than 1 km, 2 km, 5 km, 10 km, 20 km, 50 km, 70 km or 80 km, for example.

In some embodiments, one or more of the data loggers, may be configured to compare observation data with other data loggers in the network to check data quality. Data quality may also be checked by comparing data from similar times on previous days, for example.

In some embodiments, upon request from a client device at a user location, a closest one of the data loggers relative to the user location may be selected to transmit turbulence information to the client device (e.g. indicating whether local meteorological conditions are suitable for crop spraying). For example, the data loggers in the network (or the client device, or a server) may compare distances of each of the data loggers from the user location to determine which is the closest.

In some embodiments, upon request from a client device at a user location, a subset plurality of the data loggers near the user location may be selected to transmit information to the client device indicating whether local meteorological conditions are suitable for crop spraying. The selected data loggers may be configured to: compare observation data between the respective data loggers and interpolate the data between the locations of the respective data loggers to determine an interpolated estimate of the vertical turbulence characteristic at the user location; compare the vertical turbulence characteristic at the user location with the predetermined threshold of the vertical turbulence characteristic; and transmit information to the user via the client device indicating whether local meteorological conditions at the user location are suitable for crop spraying based on the comparison between the vertical turbulence characteristic and the predetermined threshold.

In some embodiments, the client device may be configured to select the subset plurality of nearby data loggers, and the client device may be configured to: compare the vertical turbulence characteristics determined and provided by respective ones of the data loggers and interpolate between the locations of the respective data loggers to determine an interpolated estimate of the vertical turbulence characteristic at the user location; compare the vertical turbulence characteristic at the user location with the predetermined threshold of the vertical turbulence characteristic; and transmit information to the client device indicating whether local meteorological conditions at the user location are suitable for crop spraying based on the comparison between the vertical turbulence characteristic and the predetermined threshold.

In some embodiments, the network system may further comprise a server in communication with the data loggers and the client device, wherein the server is configured to select the closest one or the nearby subset plurality of the data loggers relative to the user location. Upon request from the client device at the user location, the server may be configured to: compare the vertical turbulence characteristics determined and provided by respective ones of the data loggers and interpolate between the locations of the respective data loggers to determine an interpolated estimate of the vertical turbulence characteristic at the user location; compare the vertical turbulence characteristic at the user location with the predetermined threshold of the vertical turbulence characteristic; and transmit information to the user via the client device indicating whether local meteorological conditions at the user location are suitable for crop spraying based on the comparison between the vertical turbulence characteristic and the predetermined threshold.

In some embodiments, upon request from the client device at the user location, the server may be configured to: compare observation data between the respective data loggers and interpolate the data between the locations of the respective data loggers to determine an interpolated estimate of the vertical turbulence characteristic at the user location; compare the vertical turbulence characteristic at the user location with the predetermined threshold of the vertical turbulence characteristic; and transmit information to the client device indicating whether local meteorological conditions at the user location are suitable for crop spraying based on the comparison between the vertical turbulence characteristic and the predetermined threshold.

In some embodiments, the data loggers may continually transmit local atmospheric stability information to the server. The server may transmit the local atmospheric stability information to a client device at a client device location upon request from the client device. The client device may access the server to retrieve the local atmospheric stability information for the client device location. In some embodiments, the server may transmit local atmospheric stability information to one or more registered client devices at predetermined times, or send alerts or warning notifications when local atmospheric stability conditions are not suitable for crop spraying.

In some embodiments, the alerts or warning notifications may be used to warn of atmospheric conditions leading to decreased dispersion (and potentially higher concentrations) of any already airborne substances, particles, or gases such as: dust, smoke, combustion products, pollution, volatile organic compounds (VOC), synthetic compounds, pesticides, fungicides, herbicides, fertilisers, foreign compounds, odours, odour compounds, pollen, seeds, or fungal spores, for example. The alerts or warning notifications may also be used to warn of atmospheric conditions leading to increased sound propagation due to acoustic refraction off the top of an atmospheric temperature inversion, which may lead to increased noise levels in certain areas, for example.

Some embodiments relate to a method of determining local atmospheric stability conditions, the method comprising: receiving local meteorological observation data from one or more sensors at a location; analysing the data to determine a local vertical turbulence characteristic indicative of a current level of vertical turbulence at the location;

and transmitting information to a client device indicating a level of vertical turbulence based on the vertical turbulence characteristic.

In some embodiments, the method may further comprise: comparing the vertical turbulence characteristic with a predetermined threshold of the vertical turbulence characteristic; and transmitting information to a client device indicating whether local atmospheric stability conditions are suitable for crop spraying based on the comparison between the vertical turbulence characteristic and the predetermined threshold.

The vertical turbulence characteristic may comprise the standard deviation of the vertical wind speed, for example. Receiving the local meteorological data may comprise receiving the data from the one or more sensors. The one or more sensors may be mounted on an observation tower at predetermined heights above local ground level.

In some embodiments, receiving the local meteorological data may comprise receiving the data from: a first temperature sensor configured to measure atmospheric temperature at a first height; a second temperature sensor configured to measure atmospheric temperature at a second height; and an anemometer configured to measure horizontal wind characteristics at a third height. For example, the third height may be less than 10 m, less than 5 m, less than 4 m, less than 3 m, less than 2.5 m, less than 2 m, approximately 10 m, or approximately 2 m above local ground level.

In some embodiments, the second height may be greater than the first height, and third height may be approximately equal to the geometric mean of the first and second heights.

In some embodiments, receiving the local meteorological data may comprise receiving the data from a sonic anemometer configured to measure the vertical wind speed at a predetermined height above ground level.

In some embodiments, determining the local vertical turbulence characteristic may comprise determining the local vertical turbulence characteristic based only on temperature data from the first and second temperature sensors, and horizontal wind data from the anemometer.

The horizontal wind characteristics may include: a first horizontal wind speed component in the general wind direction; a second horizontal wind speed component perpendicular to the first horizontal wind speed component across the general wind direction; a standard deviation of the first horizontal wind speed component; and a standard deviation of the second horizontal wind speed component.

A first estimate of the standard deviation of the vertical wind speed may be determined iteratively using an atmospheric stability index based on the first and second temperatures and the first and second horizontal wind speed components. A second estimate of the standard deviation of the vertical wind speed may be determined based on the standard deviations of the first and second horizontal wind speed components and the first estimate of the standard deviation of the vertical wind speed. The vertical turbulence characteristic may comprise the second estimate of the standard deviation of the vertical wind speed.

In some embodiments, transmitting information to a client device indicating whether local meteorological conditions are suitable for crop spraying may comprise communicating the information to one or more client devices over a communication network. For example, the one or more client devices may comprise a mobile device, mobile phone, smart phone, laptop or tablet computer, or in-cab agricultural management system (i.e., in the cab of a tractor or spraying machine, for example, the John Deere in-cab system, or in an automated spraying machine, aircraft, helicopter, unmanned aerial vehicle (UAV), or other vehicle or spray applicator). The communication network may comprise a wireless telephonic or internet network, for example.

In some embodiments, the method may further comprise comparing the observation data with supplementary observation data received from data loggers in a network system of turbulence monitoring systems (or spray drift hazard alert systems) arranged at spaced locations across a region. In some embodiments, the method may further comprise determining an observation data quality based on the comparison between the observation data and the supplementary observation data.

Each turbulence monitoring system in the network of turbulence monitoring systems (or spray drift hazard alert system in the network of spray drift hazard alert systems) may comprise a data logger approximately co-located with an associated group of one or more sensors configured to measure and provide the observation data to the data logger. The turbulence monitoring systems (or spray drift hazard alert systems) may be arranged in a substantially hexagonal array. However, the precise location of observation towers or systems may vary from an ideal hexagonal array due to certain constraints, such as land availability or topography, for example. An average spacing distance between adjacent observation towers may be in the range of 1 km to 100 km, 5 km to 20 km, 20 km to 100 km, 30 km to 90 km, 40 km to 80 km, or 50 km to 70 km, for example.

In some embodiments, the method may further comprise determining a user location associated with a client device, wherein: analysing the data to determine a local vertical turbulence characteristic indicative of a current level of vertical turbulence comprises interpolating the data between the locations of the respective data loggers within the network to determine an interpolated estimate of the vertical turbulence characteristic at the user location; comparing the vertical turbulence characteristic with a predetermined threshold of the vertical turbulence characteristic comprises comparing the vertical turbulence characteristic at the user location with the predetermined threshold of the vertical turbulence characteristic; and transmitting information to a user indicating whether local meteorological conditions are suitable for crop spraying comprises transmitting information to the client device.

In some embodiments, the method may further comprise determining the local atmospheric stability conditions at a user location associated with a client device, wherein: analysing the data to determine a local vertical turbulence characteristic indicative of a current level of vertical turbulence comprises interpolating the data between the locations of the respective data loggers within the network to determine an interpolated estimate of the vertical turbulence characteristic at the user location; comparing the vertical turbulence characteristic with a predetermined threshold of the vertical turbulence characteristic comprises comparing the vertical turbulence characteristic at the user location with the predetermined threshold of the vertical turbulence characteristic; and transmitting information to a user indicating whether local meteorological conditions are suitable for crop spraying comprises transmitting information to the client device indicating whether local meteorological conditions at the user location are suitable for crop spraying.

Some embodiments relate to a method of determining local atmospheric stability conditions, the method comprising: determining a user location associated with a client device; receiving location data from a plurality of data loggers; selecting a subset plurality of the data loggers based on a proximity of the data loggers to the client device;

receiving and comparing vertical turbulence characteristic data from respective ones of the subset of data loggers and interpolating between the locations of the respective data loggers to determine an interpolated estimate of the vertical turbulence characteristic at the user location; and transmitting information to the client device indicating a level of vertical turbulence at the client device location based on the interpolated estimate of vertical turbulence characteristic at the client device location.

In some embodiments, the method may further comprise: comparing the interpolated estimate of the vertical turbulence characteristic at the user location with a predetermined threshold of the vertical turbulence characteristic; and transmitting information to the client device indicating whether local atmospheric stability conditions at the user location are suitable for crop spraying based on the comparison between the vertical turbulence characteristic and the predetermined threshold.

Some embodiments relate to a method of determining local atmospheric stability conditions, the method comprising: receiving data from a client device, the data comprising a client device location and a request for local turbulence conditions at the client device location; receiving location data from a plurality of data loggers; selecting a subset plurality of the data loggers based on a proximity of the data loggers to the client device; receiving vertical turbulence characteristic data from respective ones of the subset of data loggers; comparing the vertical turbulence characteristic data provided by the respective ones of the subset of data loggers and interpolating between the locations of respective ones of the subset of data loggers to determine an interpolated estimate of the vertical turbulence characteristic at the client device location; and transmitting information to the client device indicating a level of vertical turbulence at the client device location based on the interpolated estimate of vertical turbulence characteristic at the client device location.

In some embodiments, the method may further comprise: comparing the interpolated estimate of the vertical turbulence characteristic at the user location with a predetermined threshold of the vertical turbulence characteristic; and sending information to the client device indicating whether local atmospheric stability conditions at the client device location are suitable for crop spraying based on the comparison between the vertical turbulence characteristic and the predetermined threshold.

Some embodiments relate to a method of determining local atmospheric stability conditions, the method comprising: receiving data from a client device, the data comprising a client device location and a request for local turbulence conditions at the client device location; receiving location data from a plurality of data loggers; selecting a subset plurality of the data loggers based on the proximity of the data loggers with the client device; receiving local meteorological observation data from each of the subset plurality of data loggers, the data having been measured by one or more sensors associated with each of the subset plurality of data loggers; comparing the received observation data between the respective data loggers and interpolating the data between the locations of the respective data loggers to determine an interpolated estimate of the vertical turbulence characteristic at the client device location; and transmitting information to the client device indicating a level of vertical turbulence at the client device location based on the interpolated estimate of vertical turbulence characteristic at the client device location.

In some embodiments, the method may further comprise: comparing the interpolated estimate of the vertical turbulence characteristic at the user location with a predetermined threshold of the vertical turbulence characteristic; and sending information to the client device indicating whether local atmospheric stability conditions at the client device location are suitable for crop spraying based on the comparison between the vertical turbulence characteristic and the predetermined threshold.

Some embodiments relate to a computer implemented method of forecasting local atmospheric conditions at a location of interest, the method comprising:

analysing stored data including values of a local vertical turbulence characteristic corresponding to the location of interest for a predetermined past period;

estimating a probability distribution for the local vertical turbulence characteristic at the location of interest over a selected future period, based on statistical characteristics of the stored local vertical turbulence characteristic data of the predetermined past period;

comparing the probability distribution for the local vertical turbulence characteristic with a predetermined threshold of the vertical turbulence characteristic;

determining an estimated likelihood of the local vertical turbulence characteristic at the location of interest falling below the predetermined threshold during the selected future period based on the comparison between the probability distribution for the local vertical turbulence characteristic and the predetermined threshold; and transmitting information to a client device indicating whether local atmospheric stability conditions at the location of interest are likely to be suitable for crop spraying during the selected future period based on the estimated likelihood of the local vertical turbulence characteristic falling below the predetermined threshold.

The selected future period may also be referred to as a forecast period or prediction period, for example.

In some embodiments, the stored local vertical turbulence characteristic data corresponding to the location of interest may be determined according to any one of the methods described in the present disclosure.

The local vertical turbulence characteristic may comprise an estimate of the standard deviation of the vertical wind speed at the location of interest, for example. The predetermined threshold of the vertical turbulence characteristic may be a predetermined threshold of the standard deviation of the vertical wind speed. For example, the predetermined threshold may be in the range of 0.1 m/s to 0.3 m/s, 0.15 m/s to 0.25 m/s, 0.18 m/s to 0.22 m/s or about 0.2 m/s.

The stored local vertical turbulence characteristic data may include a set of values of the local vertical turbulence characteristic corresponding to a series of regular time intervals spanning the predetermined past period. For example, the time intervals of the data may be 10 minutes in duration. Alternatively, other suitable time intervals may be used. The predetermined past period may be 2 hours in duration, for example, or any other suitable period, such as at least 30 minutes, at least 1 hour, at least 2 hours, or about 1 hour or about 2 hours, for example.

Estimating the probability distribution for the local vertical turbulence characteristic over the selected future period may comprise: determining statistical deviations in the local vertical turbulence characteristic over the predetermined past period relative to a historical baseline for the local vertical turbulence characteristic; and combining the determined statistical deviations with the historical baseline at each of a plurality of timepoints over the selected future period to estimate the probability distribution for the local vertical turbulence characteristic at each timepoint.

For example, the plurality of timepoints may be defined as a series of points in time distributed over the selected future period. The timepoints may be separated by time intervals. The timepoints may be regularly distributed over the selected future period. The timepoints may be separated by regular time intervals over the selected future period.

For example, the statistical deviations in the local vertical turbulence characteristic determined over the predetermined past period may include: minimum deviation; $25^{th}$ percentile of deviation; median deviation; $75^{th}$ percentile of deviation; and maximum deviation.

The probability distribution at each timepoint over the selected future period may be estimated by combining the determined statistical deviations with the historical baseline at each timepoint assuming a uniform distribution between each of the quartiles such that there is:
- a 25% likelihood of the vertical turbulence characteristic having a value between the minimum deviation and the $25^{th}$ percentile of deviation relative to the baseline at each timepoint;
- a 25% likelihood of the vertical turbulence characteristic having a value between the percentile of deviation and the median deviation relative to the baseline at each timepoint;
- a 25% likelihood of the vertical turbulence characteristic having a value between median deviation and the $75^{th}$ percentile of deviation relative to the baseline at each timepoint; and
- a 25% likelihood of the vertical turbulence characteristic having a value between the $75^{th}$ percentile of deviation and the maximum deviation relative to the baseline at each timepoint.

Determining the estimated likelihood of the local vertical turbulence characteristic falling below the predetermined threshold during the selected future period may comprise: summing the probabilities of the probability distributions for each timepoint in the selected future time period to determine an expected number of timepoints in the selected future time period with a value of the local vertical turbulence characteristic below the predetermined threshold.

The selected future time period may be considered safe or suitable for crop-spraying if the expected number of timepoints with a value of the local vertical turbulence characteristic below the predetermined threshold is less than a certain number, or less than a predetermined proportion of the total number of timepoints in the selected future period. The selected future time period may be considered unsafe or unsuitable for crop-spraying if the expected number of timepoints with a value of the local vertical turbulence characteristic below the predetermined threshold is greater than a certain number, or greater than a predetermined proportion of the total number of timepoints in the selected future period.

For example, the selected future period may be considered unsafe if the expected number of timepoints with a value of the local vertical turbulence characteristic below the predetermined threshold is greater than 1 ten-minute interval in a two hour period, or greater than a predetermined proportion of 8.33%. The threshold number of points or predetermined proportion may be selected based on the level of acceptable risk for a given application or location. For example, the predetermined proportion may be in the range of 1% to 20%, 1% to 15%, 1% to 10%, 1% to 5%, 1% to 3%, 3% to 5%, 4% to 4.5%, 5% to 7%, 7% to 9%, 9% to 11%, or about 10%, about 8%, about 5%, about 4%, about 4.2% or about 1/24.

When the expected number of timepoints in the selected future time period with a value of the local vertical turbulence characteristic below the predetermined threshold is greater than a predetermined proportion of the total number of timepoints in the selected future time period, information may be transmitted to the client device indicating that local atmospheric stability conditions at the location of interest are likely to be unsuitable for crop spraying during the selected future time period.

The timepoints may be regularly distributed over the selected future period. For example, the timepoints may be distributed in time-intervals of 1 minute, 5 minutes, 10 minutes, 15 minutes, 20 minutes, 25 minutes, 30 minutes, 35 minutes, 40 minutes, 45 minutes, 50 minutes, 55 minutes, 60 minutes, or in the range of 1 to 60 minutes, 1 to 45 minutes, 1 to 30 minutes, 1 to 20 minutes, 10 to 20 minutes, 13 to 17 minutes, or any other suitable time-interval.

The number of timepoints in the selected future period may be equal (or different) to the number of datapoints for the local vertical turbulence characteristic from the predetermined past period.

The historical baseline for the local vertical turbulence characteristic may provide a baseline estimate of the expected level of vertical turbulence at the location based on the time of day (and optionally the time of year). The statistical characteristics for the predetermined past period may then be combined with the expected baseline for the selected future period to estimate the probability distribution for the local vertical turbulence characteristic at the location over the selected future period.

The historical baseline may provide an estimation of diurnal fluctuations in the local vertical turbulence characteristic at the location of interest. The historical baseline may provide an estimation of annual fluctuations in the local vertical turbulence characteristic at the location of interest.

The historical baseline may be based on stored data indicating the level of vertical turbulence at the location from recent days, weeks, or months, or from the previous year, or from a number of previous years. The historical baseline may comprise an average of available data from different days to account for variations or gaps in the data. The historical baseline may comprise data from one or more other (nearby) locations, particularly if there is no data available from the location of interest. For example, the historical baseline data may be created by interpolating from datasets from the one or more other locations.

The historical baseline may be determined based on stored baseline data of the local vertical turbulence characteristic from a plurality of previous days at a similar time of day to the time of day of the selected future period.

For example, the plurality of previous days of stored baseline data may immediately precede the day of the selected future time period. In some embodiments, (some or all of) the plurality of previous days of stored baseline data may be from one or more previous years at a similar time of year to the selected future time period.

The plurality of previous days of stored baseline data from each of the one or more previous years may include days, or parts of days, within a time-of-year window, which is similar to the time of year of the selected future period. The time-of-year window may have a duration in the range of 2 to 30 days, 5 to 25 days, 10 to 20 days, 12 to 18 days, 13 to 17 days, 14 to 16 days, The time-of-year window of each of the one or more previous years may be centred on a date of each corresponding year that is similar to or the same as the time of year of the selected future period. The time of year window may be centred on the same date of each of the one or more previous years as the date of the selected future period.

The stored baseline data for the selected future period may be limited to datapoints within a time-of-day window in each of the plurality of previous days, which is similar to the time of day of the selected future period. In other words, the stored baseline data may be taken from a similar time of day to the time of day of the selected future period.

The time-of-day window may be any suitable duration and may have a duration of less than 4 hours, less than 2 hours, less than 1.5 hours, less than 1 hour, less than 45 minutes, less than 30 minutes, or about 40 minutes, for example.

The time-of-day window may be centred on a time of day that is similar to or the same as the time of day of the selected future period. For example, the time-of-day window may be centred on a start, end or mid-point of the selected future period. In some embodiments, the time-of-day window is centred on a time of day that is similar to or the same as the time of day of each timepoint of the selected future period. That is, a separate historical baseline may be determined for each timepoint of the selected future period.

The stored baseline data may be determined from observation measurements made at the location of interest. Alternatively, or additionally, the stored baseline data may be determined from observation measurements made away from location of interest. Using interpolation, for example. Alternatively, or additionally, the stored baseline data may be determined from a model, such as a forecasting model, for example.

The historical baseline may be determined as the mean average of the stored baseline data corresponding to the selected future period. Alternatively, a separate historical baseline may be determined for each timepoint of the selected future period as the mean average of the stored baseline data corresponding to each timepoint of the selected future period.

The predetermined past period immediately precedes the selected future period. For example, the predetermined past period may be the previous two hours from a current time of day, and the selected future period may be the next two hours. This may allow a user to determine whether conditions are suitable for crop spraying at the current time, and whether the conditions will remain suitable for the next two hours, in which time the crop spraying may be carried out.

In some embodiments, the predetermined past period may precede the selected future period by 24 hours. That is, when forecasting conditions for the selected future period, the statistical characteristics from a similar time of day on the previous day may be used to estimate the probability distribution for the vertical turbulence characteristic.

This may allow a user to plan crop spraying options at any time within the next 24 hours relying on the past 24 hours of data.

In some embodiments, the predetermined past period may precede the selected future period by more than 24 hours, for example, up to 48 hours or 72 hours. However, it will be appreciated that the relevance of the statistical characteristics of the predetermined past period may reduce the longer the duration between the predetermined past period and the selected future period. That is, forecasting further into the future usually becomes less accurate the further ahead the forecast is.

In some embodiments, the predetermined past period may be similar or equal in duration to the selected future period.

In some embodiments, other meteorological forecasts may be used to augment the estimated probability distributions, for example, by modifying the historical baseline.

Estimating the probability distribution for the local vertical turbulence characteristic at the location of interest over the selected future period may further comprise adding a forecast contribution to the historical baseline. The forecast contribution may be defined as a change in magnitude of the local vertical turbulence characteristic based on a local horizontal windspeed forecast, for example. Alternatively, the forecast contribution may be based on a forecast of temperature, humidity, wind shear, or surface heat flux, for example.

All of the described methods may be computer implemented methods in some embodiments. Such computer implemented methods may be performed entirely by single computing devices or multiple cooperating computing devices, for example, and may be automatically performed.

Some embodiments relate to a computer-readable storage medium storing executable program code that, when executed by at least one processor, causes the at least one processor to perform the method of any of the embodiments described herein.

BRIEF DESCRIPTION OF DRAWINGS

Embodiments are described below with reference to the accompanying drawings, in which:

FIG. 1 is a schematic diagram of a spray drift hazard alert system illustrating various sensor arrangements, according to some embodiments;

FIG. 2 is a schematic diagram of a network system of alert systems in communication with a client device via a communications network, according to some embodiments;

FIG. 3 is a block diagram illustrating a method of determining local atmospheric stability conditions, according to some embodiments;

FIG. 4 shows observational data and parameters calculated from theory for a 10 m tower with two anemometers (at 2 m and 10 m) (a) Ri, (b) $\zeta$, (c) u*, (d) $\theta$*, (e) $\sigma_w$, (f) Heat flux H (see definitions below);

FIG. 5 is similar to FIG. 4 but for Rib, (a) Rib, (b) $\zeta$, (c) u*, (d) $\theta$*, (e) $\sigma_w$, (f) Heat flux H;

FIG. 6 is similar to FIGS. 4 and 5, but for GTR with 3 m tower, (a) GTR (blue). (b) $\zeta$, (c) u*, (d) $\theta$*, (e) $\sigma_w$, (f) Heat flux H;

FIG. 7 is similar to FIGS. 4 to 6, but for YSR with 10 m tower as described, (a) YSR, (b) $\zeta$, (c) u*, (d) $\theta$*, (e) $\sigma_w$, (f) Heat flux H;

FIG. 8 shows data for or all eight towers combined as histograms of $\sigma_w$ measured at 2 m (green) and at 10 m (blue) for (a) Rib<0, (b) Rib≥0, (c) Rib≥0 during DJF (December, January and February) and (d) Rib≥0 during JJA (June, July and August);

FIG. 9 shows the combined data from all eight towers as empirical cumulative distribution frequencies for $\sigma_w$ at 2 m and 10 m (green and blue respectively) for (a) Rib<0, (b) Rib≥0, (c) Rib≥0 during DJF and (d) Rib≥0 during JJA;

FIG. 10 shows histograms of $\sigma_w$ measured at 10 m for Rib≥0 during DJF at each tower;

FIG. 11 shows histograms of $\sigma_w$ at 10 m for stable conditions (Rib>0) and split about YSR of 1.2 for DJF and JJA. (a) YSR<1.2 for DJF, (b) YSR≥1.2 for DJF, (c) YSR<1.2 for JJA, and (d) YSR≥1.2 for JJA;

FIG. 12 shows combined data for all stations during stable conditions (Rib>0), with plots of the vertical turbulence $\sigma_w$ versus each of Ri, Rib, 1/L, YSR and GTR ($\sigma_w$ is given for 10 m for 12a to 12d and 2 m for 12e—GTR), and with a silhouette of the observation data overlain with the running percentiles (median, and 10% and 90%);

Figure 19:
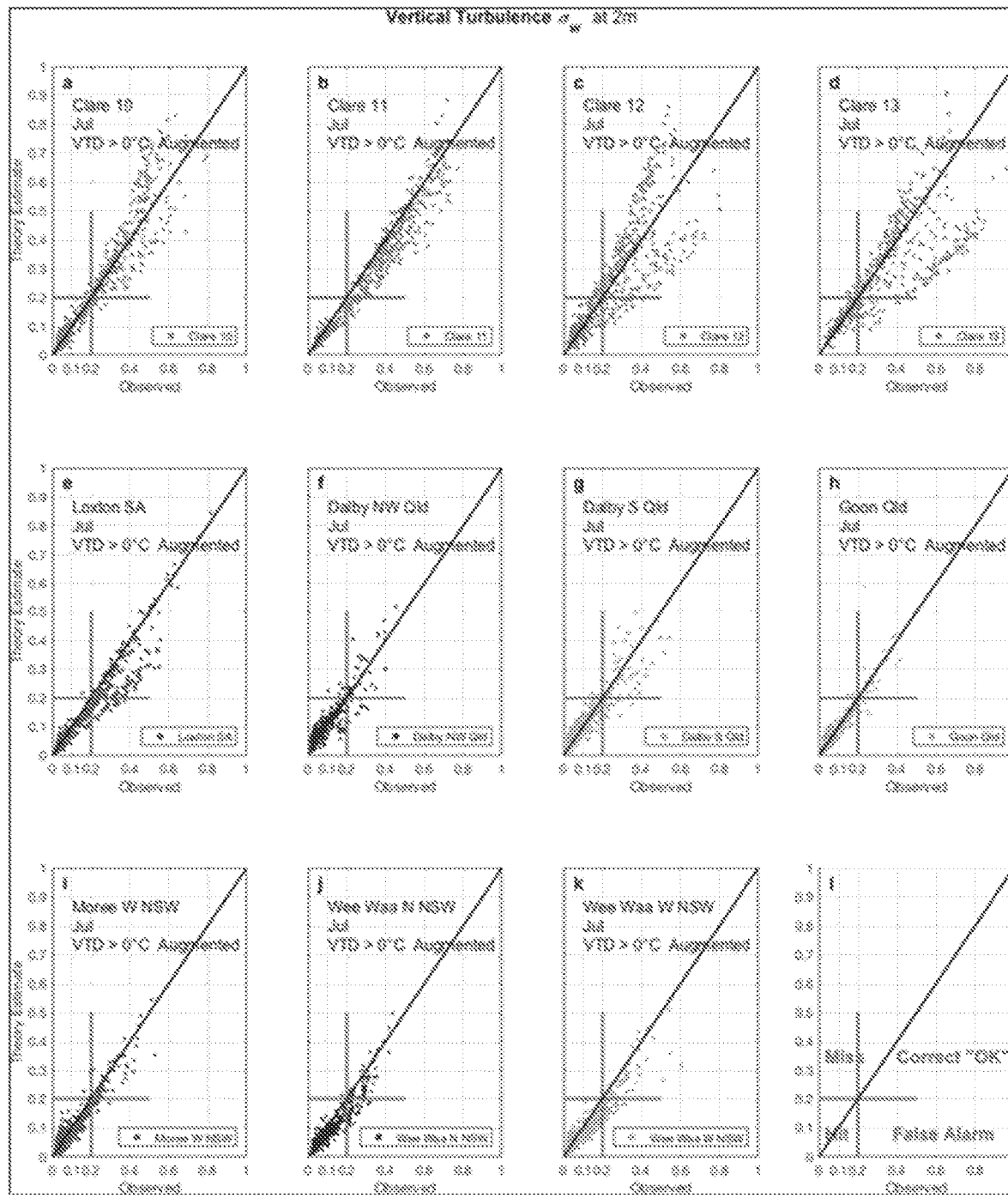
Figure 20:
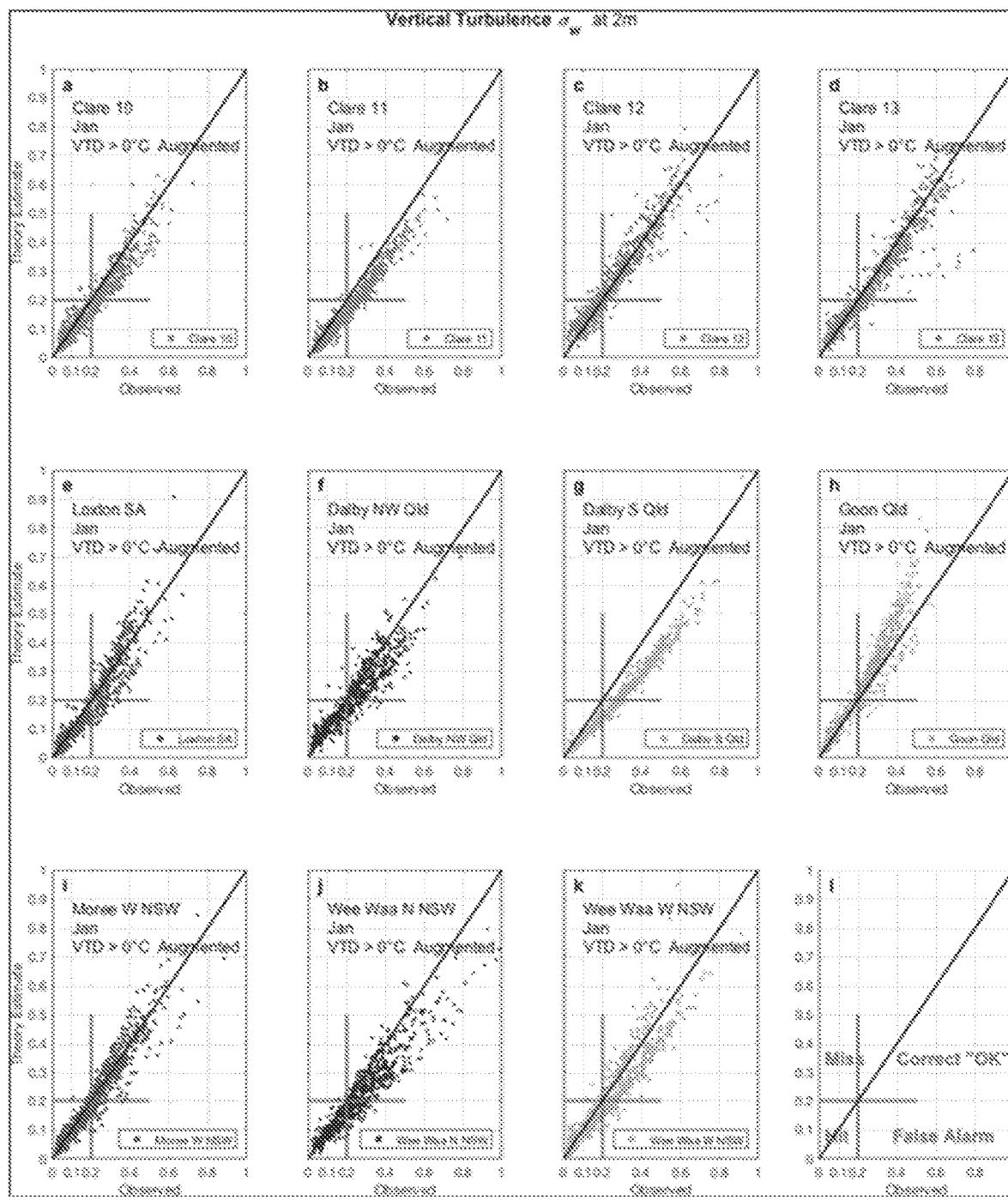
Figure 21:
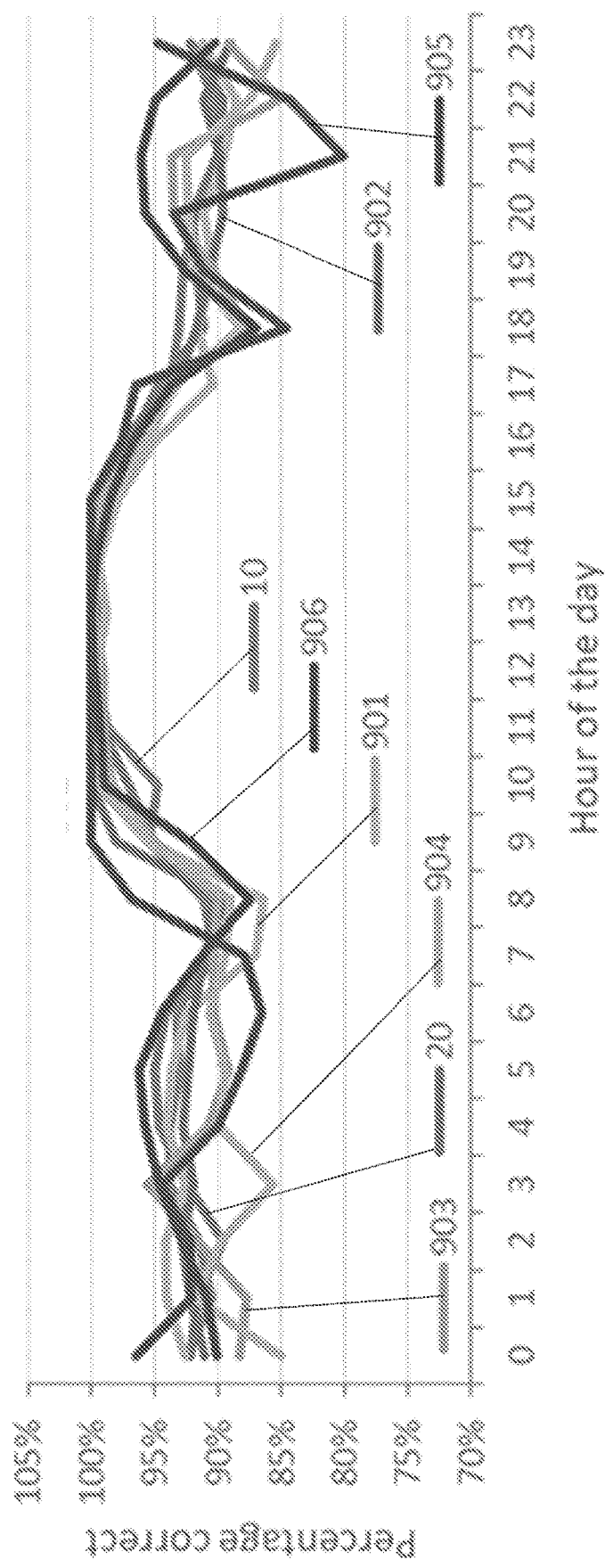
Figure 22:
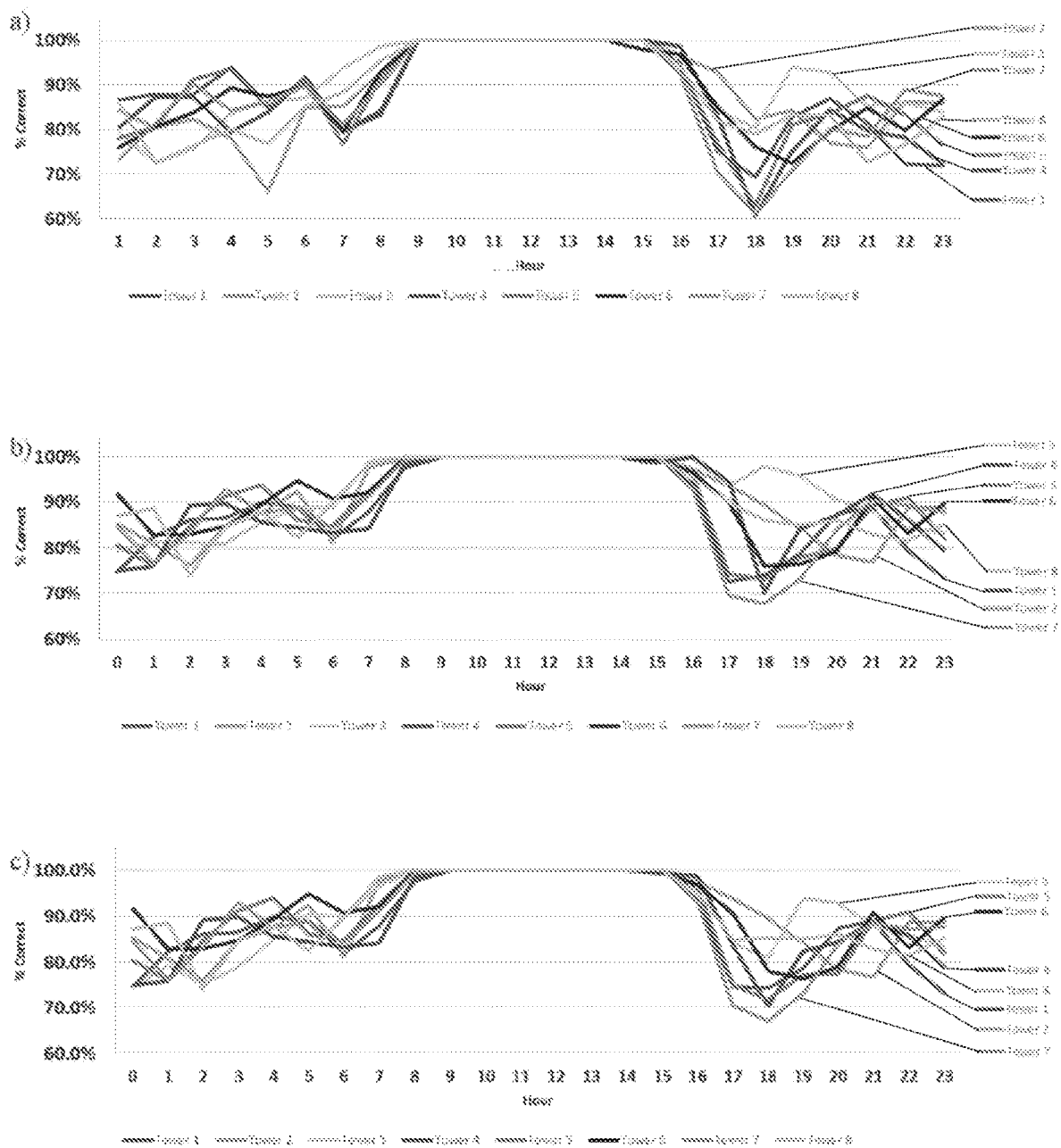

FIG. 19 comparisons of a calculated estimate $\sigma_{w2}$, with measured data from a number of observation towers for 2 m during inversion conditions in July;

FIG. 20 comparisons of a calculated estimate $\sigma_{w2}$, with measured data from a number of observation towers for 2 m during inversion conditions in January;

FIG. 21 shows a graphical representation of the percentage accuracy of a forecasting method according to some embodiments; and FIG. 22 shows a graphical representation of the percentage accuracy of a forecasting method using three different baseline calculation methods, according to some embodiments.

DESCRIPTION OF EMBODIMENTS

Agricultural crop spraying is generally avoided (or prohibited) during inversion conditions to avoid non-dispersion of spray fines which can remain suspended in the air in high concentrations and drift into off-target areas. However, it has been found that in some cases, during inversion conditions there can still be sufficient turbulence to disperse spray fines to relatively low concentrations in the atmosphere and avoid spray fines drifting in an undesirable manner. In these cases, even though an inversion exists, the atmosphere is often closer to neutral conditions than very stable conditions, in which case the spray fines are likely to be dispersed relatively quickly and are less likely to be transported long distances at high concentrations near the surface.

Embodiments generally relate to systems and methods for determining local atmospheric stability and/or turbulence. This information can then be used to inform decisions regarding crop spraying, such as whether the atmospheric conditions are sufficiently turbulent to avoid spray fines drifting in an undesirable manner, for example.

In the presence of an inversion, the surface boundary layer can be classified into a weakly stable regime or a very stable (or laminar) regime. A number of atmospheric stability indices have been proposed to describe these regimes, but none of them are universally applicable in defining a threshold to distinguish between the two regimes.

It is proposed that the degree of vertical turbulence is most relevant to spray dispersion, and in particular, the magnitude of the standard deviation of vertical wind speed ($\sigma_w$). However, other quantities, such as various atmospheric stability indices may be used to provide a vertical turbulence characteristic indicative of the local level of vertical turbulence in a region or at a particular location.

A literature review and findings from field tower observations indicate that if the vertical turbulence, as indicated by the standard deviation of the vertical wind speed, is greater than about 0.2 m/s at a height of 10 m (or greater than 0.15 m/s at a height of 2 m), then turbulence driven mixing and dispersion is moderate or strong. This level of turbulence is comparable to the turbulence typically observed in near neutral conditions (i.e., an absence of inversion conditions) and is therefore seen as an acceptable prerequisite to avoid non-dispersive conditions associated with spray drift. However, a more conservative threshold of less than 0.2 m/s may be appropriate in certain circumstances, such as 0.15 m/s or 0.1 m/s, for example.

In some embodiments, vertical wind speed may be measured directly with a 3D sonic anemometer, such as RM Young Ultrasonic anemometer model 81005A with Campbell Scientific CR1000 data logger sampling at 4 Hz, for example. The standard deviation of the vertical wind speed ($\sigma_w$) can then be calculated from the measurements of vertical wind speed and compared against a predetermined threshold for the standard deviation of vertical wind speed. When measuring vertical wind speed directly, it may be necessary to make adjustments for ground slope or deviations in tilt of the observation tower away from vertical.

While direct measurement of vertical wind speed may be preferable, the relatively high cost, maintenance requirements and power requirements of 3D sonic anemometers may make them unsuitable for certain applications, such as remote installations, for example.

Therefore, in some embodiments, it may be preferable to estimate a vertical turbulence characteristic (such as the standard deviation of vertical wind speed) based on observation data other than direct measurement of vertical wind speed.

This may be achieved by using one or more of the following atmospheric stability indices to estimate the standard deviation of the vertical wind speed. These include the Richardson Number Ri, Bulk Richardson Number Rib, Grace-Tepper Ratio GTR, and Yates Stability Ratio YSR.

Each of the indices listed above require observation data from a first temperature sensor configured to measure atmospheric temperature at a first height ($z_1$); a second temperature sensor configured to measure atmospheric temperature at a second height ($z_2$); and an anemometer configured to measure horizontal wind characteristics at a third height ($z_4$). The Richardson number also requires the horizontal wind speed measured at a fourth height ($z_3$).

Figure 1:
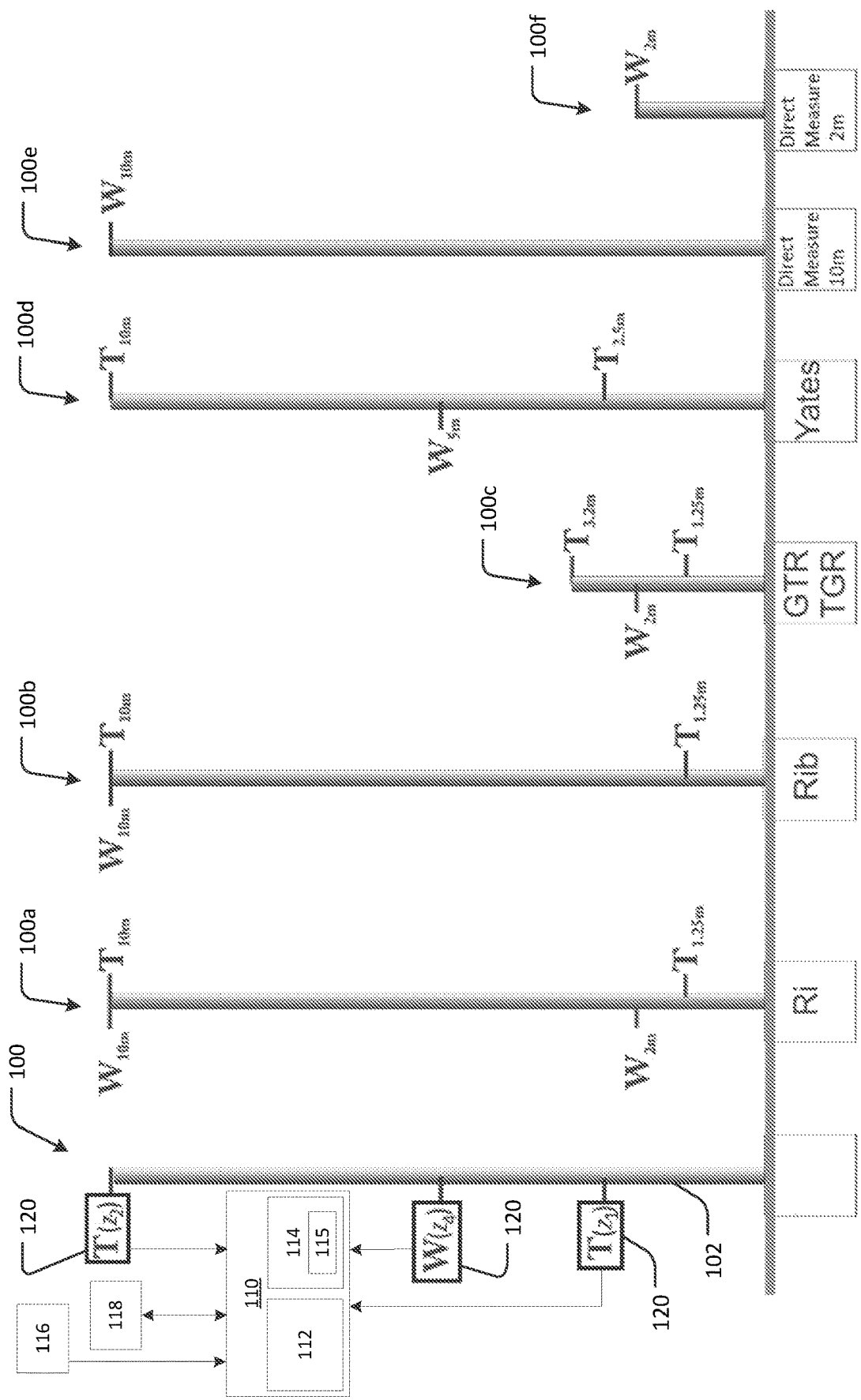

There are specific predetermined sensor heights associated with each stability index as shown in FIG. 1. The sensors could be mounted at any suitable height for calculation of GTR, and could vary in different embodiments. However, the anemometer height was chosen as 2 m for testing, as it is a common height for measuring wind run data, and it is relatively close to typical crop spraying height (~1 m). The first and second temperature sensor heights were chosen as 1.25 m and 3.2 m, such that the anemometer height is set at the geometric mean of the first and second temperature sensor heights, as temperature and wind speed typically increase logarithmically in the boundary layer near the surface.

Estimating the vertical turbulence characteristic (or standard deviation of the vertical wind speed) using the stability indices listed above may be advantageous as they only require measurement of temperature at two heights (e.g., with paired type EE181 thermocouples calibrated by Campbell Scientific Australia), and measurement of horizontal wind speed at one height (or two for Ri), which can be done with relatively inexpensive conventional anemometers (or any more sophisticated anemometers as desired).

The Richardson number can be calculated from equation (1), where g is gravitational acceleration, $\theta$ is a reference temperature at ground level, $\theta(z)$ is potential temperature at height z, and u(z) is horizontal wind speed at height z (averaged over a predetermined time interval, such as 10 min, for example).

$$Ri = \frac{g}{\theta} \frac{\theta(z_2) - \theta(z_1)}{(u(z_4) - u(z_3))^2} \frac{[z_4 - z_3]^2}{z_2 - z_1} \quad (1)$$

For example, the sensor heights may be set at $z_1=2$ m, $z_2=10$ m, $z_3=1.25$ m, and $z_4=10$ m, and the reference temperature may be set at $\theta=290°$ K.

The Bulk Richardson number Rib can be calculated from equation (1) with a single anemometer at height $z_4$, by taking $z_3=0$ and $u(z_3)=0$.

The Grace-Tepper Ratio GTR can be calculated from equation (2) below, where $\theta(z)$ is potential temperature at height z, and u(z) is horizontal wind speed at height z (averaged over a predetermined time interval, such as 10 min, for example).

$$GTR = \frac{\theta(z_2) - \theta(z_1)}{u(z_4)^2} \quad (2)$$

The sensor heights may be set at $z_1=1.25$ m, $z_2=3.2$ m, and $z_4=2$ m, for example.

The Yates Stability Ratio YSR also requires two temperature sensors and a single anemometer, but does not account for the adiabatic effect. YSR can be calculated from equation (3) with the temperature sensors set at $z_1=2.5$ m and $z_2=10$ m, and the anemometer is set at $z_4=5$ m.

$$YSR = 10 \frac{T(10m) - T(2.5m)}{u(5m)^2} \quad (3)$$

Following Monin-Obukhov Stability Theory (MOST) and assuming horizontally homogeneous and steady state conditions:

$$L = -\frac{\theta u_*^3}{kg\langle\theta'w'\rangle} = \frac{\theta u_*^2}{kg\theta_*} \quad (4)$$

where L is the Obukhov length, g is gravitational acceleration, k is von Karman constant, w is vertical velocity, u* is friction velocity, $\theta$ is reference potential temperature, $\theta$* is friction temperature or a scaling temperature, primes denote fluctuations about the mean and < > represents the meaned value.

The Monin-Obukhov parameter (at height z is:

$$\zeta = z/L \quad (5)$$

For stable conditions:

$$u(z) = \frac{u_*}{k}\left(\ln\frac{z}{z_0} + 5\frac{z}{L}\right) \quad (6)$$

$$\Delta\theta = \theta(z) - \theta(z_{ref}) = \frac{\theta_*}{k}\left(\ln\frac{z}{z_{ref}} + 5\frac{z}{L}\right) \quad (7)$$

where $z_0$ is roughness length and $z_{ref}$ is the reference height for the surface temperature analogous to $z_0$.

The difference in potential temperatures can also be expressed as:

$$\Delta\theta = \Delta T + 0.01(z_2 - z_1). \quad (8)$$

where T is temperature and a dry adiabatic lapse rate is assumed.

Manipulation of Equations 4, 6 and 7 provides:

$$\frac{\Delta\theta}{u^2} = \frac{1}{L}\frac{\theta}{g}\frac{\ln\frac{z_2}{z_1} + 5\frac{z_2 - z_1}{L}}{\left(\ln\frac{z_a}{z_0} + 5\frac{z_a}{L}\right)^2} \quad (9)$$

where $z_a$ is anemometer height (for single anemometer stability parameter) and $z_0$ is roughness length set to 0.03 m.

Assuming $\theta$ at the surface is essentially constant at 290K, then:

$$Rib = \frac{1}{L}11.4\frac{\left(2.1 + \frac{44}{L}\right)}{\left(5.81 + \frac{50}{L}\right)^2} \quad (10)$$

$$Ri = \frac{1}{L}7.32\frac{\left(2.1 + \frac{44}{L}\right)}{\left(1.61 + \frac{40}{L}\right)^2} \quad (11)$$

$$GTR = \frac{1}{L}29.6\frac{\left(0.94 + \frac{9.75}{L}\right)}{\left(4.2 + \frac{10}{L}\right)^2} \quad (12)$$

and neglecting the adiabatic component between 2.5 and 10 m, then:

$$YSR = \frac{1}{L}296\frac{\left(1.39 + \frac{37.5}{L}\right)}{\left(5.12 + \frac{25}{L}\right)^2} \quad (13)$$

The formulas at Equations 10 to 13 are specific to the heights $z_1$, $z_2$, $z_3$, $z_4$ of the tower configurations and the chosen $z_0$ value. Therefore, Ri, Rib and GTR are functions of 1/L and vice-versa. Given [$\Delta\theta$,u], then all of L, $\zeta$, $\theta$* and u* can be calculated iteratively using a numerical method, such as the profile method, for example.

The vertical turbulence characteristic can then be determined as the standard deviation of the vertical velocity $\sigma_w$ which is given by:

$$\sigma_w = 1.25 u^*(1+0.2\zeta) \text{ for } 0 \leq \zeta \leq 1 \tag{14}$$

and beyond $\zeta > 1$ we assume $\zeta = 1$.

To summarise, from the temperature difference between the first and second temperatures, and the mean wind speed, one may estimate $1/L$, parameter $\zeta$ and then determine a first estimate of the standard deviation of the vertical wind speed $\sigma_w$.

This is the MOST model estimate for stable conditions. However, this first estimate reduces in accuracy as $\zeta$ increases.

In some embodiments, determining the vertical turbulence characteristic may comprise calculating a first estimate of the vertical turbulence characteristic based on an atmospheric stability index and then calculating a second estimate of the vertical turbulence characteristic based on horizontal wind characteristics and the first estimate of the vertical turbulence characteristic.

For example, calculating the first estimate of the vertical turbulence characteristic may comprise calculating a first estimate of the standard deviation of the vertical wind speed $\sigma_w$ based on one or more of the following atmospheric stability indices: Ri, Rib, GTR, YSR. This may be achieved using the equations set out above with input observation data from the first and second temperature sensors, and single anemometer (or two anemometers for Ri), and using a numerical method (such as the profile method, for example) to iteratively determine the first estimate of the standard deviation of the vertical wind speed $\sigma_w$.

Calculating the second (more refined) estimate of the vertical turbulence characteristic may comprise calculating a second estimate of the standard deviation of the vertical wind speed $\sigma_w$ based on horizontal wind characteristics and also based on the first estimate of the standard deviation of the vertical wind speed $\sigma_w$. The first estimate of $\sigma_w$ may be denoted as $\sigma_{w1}$ and the second estimate of $\sigma_w$ may be denoted as $\sigma_{w2}$.

The horizontal wind characteristics may include: a first horizontal wind speed component u in the general wind direction; a second horizontal wind speed component v perpendicular to the first horizontal wind speed component across the general wind direction; a standard deviation of the first horizontal wind speed component $\sigma_u$; and a standard deviation of the second horizontal wind speed component $\sigma_v$.

The first and second horizontal wind speed components may be measured with a two-component anemometer such as a 2D sonic anemometer, for example. The standard deviations of the horizontal wind speed components may then be determined from the fluctuations in the first and second horizontal wind speed components.

By applying regression analysis to the first estimate of the standard deviation of vertical wind speed $\sigma_{w1}$ in relation to its measured value (from 3D sonic anemometers) and measured horizontal wind characteristics $\sigma_u$ and $\sigma_v$ (from 2D sonic anemometers) the inventors formed a linear combination of the first estimate of the standard deviation of vertical wind speed $\sigma_w$ with the horizontal standard deviation components $\sigma_u$ and $\sigma_v$ to provide a more accurate second estimate of the standard deviation of vertical wind speed $\sigma_{w1}$.

For an anemometer height of 10 m:

$$\sigma_{w2} = 0.5 * \sigma_{w1} + 0.5 * \min([0.5*6\sigma_u, 0.6*\sigma_v]) \tag{15}$$

For an anemometer height of 2 m:

$$\sigma_{w2} = 0.5*(0.85*\sigma_{w1} + \min([0.52*\sigma_u, 0.65*\sigma_v])) \tag{16}$$

If $\sigma_w$ at 10 m is greater than a value of 0.2 m/s (or if $\sigma_w$ at 2 m is greater than a value of 0.15 m/s) then the weak turbulence and mixing of VS regime will be avoided. That is, if a, at 10 m is greater than a value of 0.2 m/s (or if $\sigma_w$ at 2 m is greater than 0.15 m/s), then farmers could safely conduct spray applications provided all other guidelines and recommendations relevant to spraying operations are met.

Figure 18:
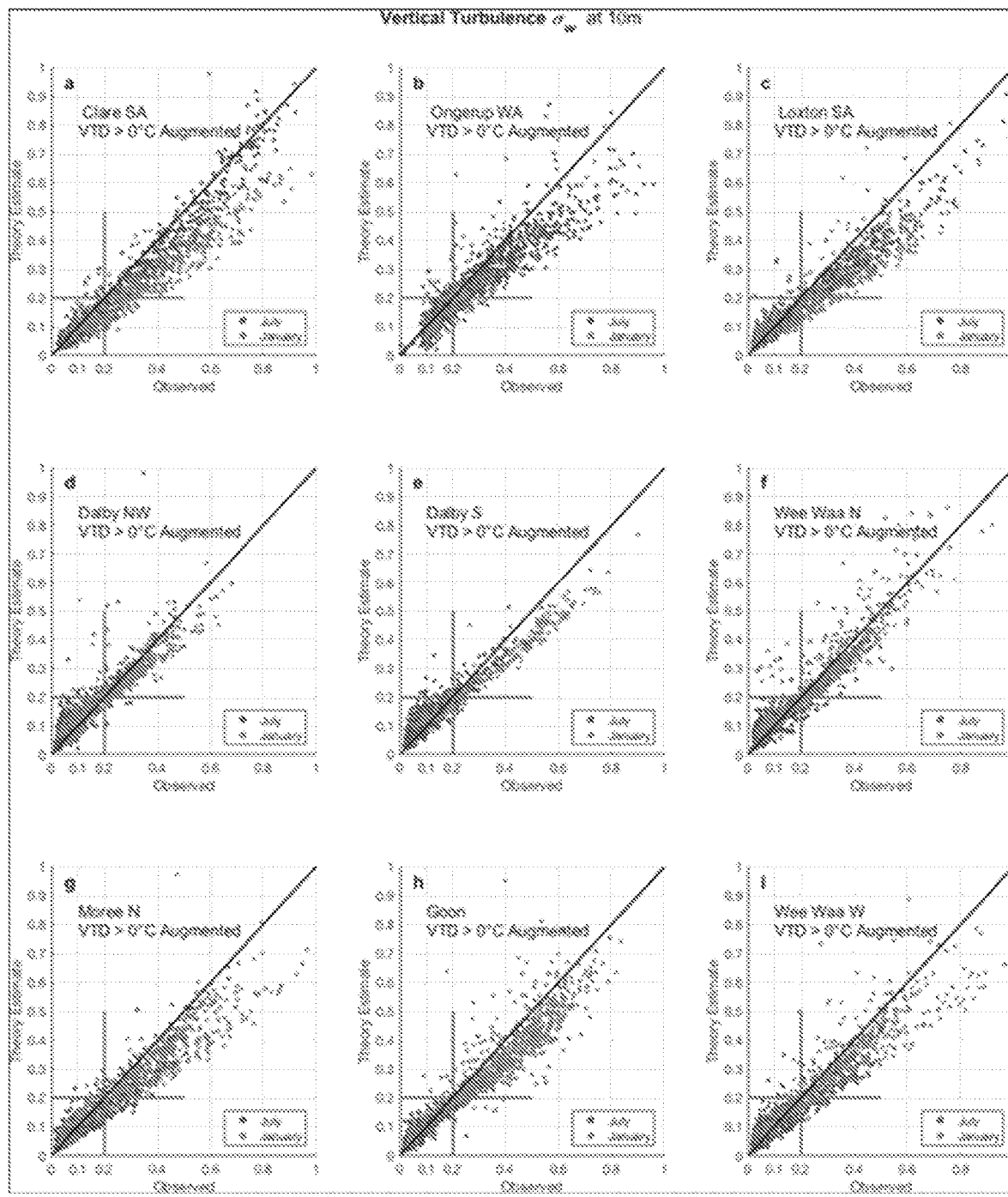
FIG. 18 shows comparisons of a calculated estimate $\sigma_{w2}$, with measured data from a number of observation towers for 10 m during inversion conditions in July (blue) and January (red)

FIGS. 18 to 20 show comparisons of the calculated estimate $\sigma_{w2}$, with selected data at a number of observation towers. FIG. 18 shows $\sigma_{w2}$ estimates for 10 m during inversion conditions in July (blue) and January (red). FIG. 19 shows $\sigma_{w2}$ estimates for 2 m during inversion conditions in July and FIG. 20 shows $\sigma_{w2}$ estimates for 2 m during inversion conditions in January.

Plots for July and January are presented because wintertime months typically have the most intense inversions and summertime months typically have the weaker inversions. Purely as a matter of visual clarity, the observations have been thinned; subjectively the graphs are essentially unchanged regardless of how thinning is performed. The diagonal black line represents a perfect model. The nine subplots are for all towers with vertical turbulence data. In particular subplot a is for the complex terrain Clare station; others are for observation towers elsewhere in flatter wheat and cotton growing regions.

FIGS. 18 to 20 illustrate that the $\sigma_{w2}$ estimate for the standard deviation of vertical wind speed is reasonably accurate, particularly in the range of interest around $\sigma_{w2} \approx 0.2$ m/s.

In some embodiments, a more conservative approach may be taken by setting an additional requirement that one of the other stability parameters such as Rib must be less than 0.05 in order to allow farmers to spray.

However, there are two situations when spraying during weakly stable inversion conditions would not be advisable (at least in Australia). One is in the post-dawn period when $\sigma_w$ may be increasing in a very shallow layer as the inversion lifts (being eroded from below). In this scenario spray material could be lofted into the inversion still existing overhead and the material transported with little dispersion—possibly until being fumigated down to the surface elsewhere. A second situation is in the late afternoon toward dusk when a rapid increase in stability and therefore a rapid decrease in $\sigma_w$ is likely to be imminent.

In some embodiments, an additional requirement for spraying may be imposed requiring that spraying must not be performed at certain times, such as close to typical times of inversion onset or inversion cessation in a particular region, for example within 30 minutes, 60 minutes or 90 minutes either of sunrise or sunset.

Referring to FIG. 1, a turbulence monitoring system or spray drift hazard alert system 100 is illustrated in a schematic diagram, according to some embodiments, with alternative sensor arrangements shown in systems 100a, 100b, 100c, 100d, 100e, and 100f.

The alert system 100 comprises a data logger 110 configured to: receive local meteorological observation data from one or more sensors 120 at a location; analyse the data to determine a local vertical turbulence characteristic indicative of a current level of vertical turbulence at the location; compare the vertical turbulence characteristic with a predetermined threshold of the vertical turbulence characteristic; and transmit information to a client device indicating whether local meteorological conditions are suitable for crop spraying based on the comparison between the vertical turbulence characteristic and the predetermined threshold.

In some embodiments, the system 100 may be used for applications other than determining suitable crop-spraying conditions, such as forecasting or monitoring the movement or dispersion of airborne substances in a particular area.

The alert system 100 may comprise the one or more sensors 120, which may include one or more anemometers or temperature sensors, for example. The sensors 120 may be mounted on an observation tower 102 at predetermined heights as set out above. The data logger 110 may be approximately co-located with or (in some embodiments) mounted to the observation tower 102. The temperature sensors may comprise Campbell Scientific type EE181 paired thermocouples, for example. Alternatively, the temperature sensors may comprise resistance thermometers or resistance temperature detectors (RTD) which may comprise a length of fine wire formed of a pure material such as platinum, nickel or copper, wrapped around a core formed of ceramic or glass, for example. Suitable anemometers include, Gill—2D sonic anemometer, Gill—Wind master 3D sonic anemometer, and YOUNG-81000 Ultrasonic 3D Anemometer is a 3D wind speed sensor, for example. The data logger 110 may be configured to sample data at high rates, such as at least 4 Hz, 8 Hz, or higher sampling rates, for example. Suitable data loggers include Campbell Scientific C300, C1000 or C6, or Observator Instruments—IoT Gateway, for example.

The data logger 110 may comprise at least one processor 112 and a memory 114. The memory 114 may store one or more code modules 115 or groups of program code that are executable by the processor 112 to receive, process and store input data from the one or more sensors 120 on the memory 114, manipulate the input data, and perform calculations to determine the vertical turbulence characteristic. The memory 114 may further include a communications module 115 configured to allow the data logger 110 to communicate with a client device 210, server 220 or other data loggers 110 in a network 200 (as described below). For example, in some embodiments, the calculations to determine the vertical turbulence characteristic may be performed on a remote processing unit, such as a server 220 or client device 210.

The alert system 100 may further comprise a power supply 116 configured to supply power to the data logger 110 and sensors 102. For example, the power supply 116 may comprise a solar panel and battery system, or a diesel generator, or a rechargeable battery, such as a conventional car battery, for example. The power supply 116 may be approximately co-located with or (in some embodiments) mounted to the observation tower 102.

The alert system 100 may further comprise a transceiver, transponder or other form of modem 118 to allow communication between the data logger 110 and client device 210 or server 220 or other data loggers 110 in a network 200. For example, the modem 118 may comprise a 4G LTE USB modem, such as a Huawei E3372 E3372h-607 Dongle Stick modem. In some embodiments, the modem 118 may be connected to an antenna to improve signal transmission/reception. The antenna may comprise a compact built in antenna or an external antenna. The antenna may be readily removable for replacement or upgrade to a higher gain antenna. The antenna may be compatible with signal repeaters. For example, the antenna may comprise a 6.5DB OMNI 890-960 MHZ W/N Type W/10 m antenna. Other suitable antennas include Medium gain (3-5 dBi) and high gain (5-9 dBi) antennas to Very High Gain Antennas, for example.

Various sensor arrangements are shown in FIG. 1 which are suitable for determining a vertical turbulence characteristic (such as the standard deviation of vertical wind speed, for example) via different methods. However, different sensor heights may be selected for different applications. Anemometers are represented in the diagrams by the letter W, and temperature sensors are represented by the letter T.

In some embodiments, the alert system 100 may comprise the data logger 110 fitted to an existing observation tower 102 and configured to receive data from existing sensors 120 mounted on the observation tower 102.

In some embodiments, the alert system 100 may comprise a dedicated observation tower 102 and sensors 120 installed at a selected location.

In some embodiments, the alert system 100 may comprise a portable observation tower 102 with sensors 120 and data logger 110 (and optionally also power supply 116 and/or modem 118). For example, the alert system 100 may be mounted on a trailer and configured to be towed to a desired location by a vehicle.

System 100*a* shows a suitable sensor arrangement for estimating the standard deviation of vertical wind speed based on the Richardson number Ri, with two anemometers set at heights of 2 m and 10 m and temperature sensors set at heights of 10 m and 1.25 m.

System 100*b* shows a suitable sensor arrangement for estimating the standard deviation of vertical wind speed based on the Bulk Richardson number Rib, with one anemometer set at a height of 10 m and temperature sensors set at heights of 10 m and 1.25 m.

System 100*c* shows a suitable sensor arrangement for estimating the standard deviation of vertical wind speed based on the Grace-Tepper Ratio GTR, with one anemometer set at a height of 2 m and temperature sensors set at heights of 3.2 m and 1.25 m.

System 100*d* shows a suitable sensor arrangement for estimating the standard deviation of vertical wind speed based on the Yates Stability Ratio YSR, with one anemometer set at a height of 5 m and temperature sensors set at heights of 10 m and 2.5 m.

System 100*e* shows a suitable sensor arrangement for determining the standard deviation of vertical wind speed from direct measurements of the vertical wind speed, with one anemometer set at a height of 10 m. For example, a 3D sonic anemometer.

System 100*f* shows a suitable sensor arrangement for determining the standard deviation of vertical wind speed from direct measurements of the vertical wind speed, with one anemometer set at a height of 2 m. For example, a 3D sonic anemometer.

The alert system 100 may provide the meteorological conditions information to a client device 210, such as a mobile phone, laptop or tablet computer, or in-cab agricultural management system, for example. The client device 210 may comprise at least one processor 212 and a memory 214. The memory 214 may store one or more code modules 215 or groups of program code that are executable by the processor 212 to receive the information regarding local atmospheric conditions transmitted by the data logger 110 and to display the information to a user. For example, the memory 214 may store a bespoke application (i.e. an "app") configured to communicate with the data loggers 110 or server 220 to request and receive information about local atmospheric conditions, such as the vertical turbulence characteristic, and an indication of whether the local atmospheric conditions are suitable for agricultural crop spraying.

Figure 2:
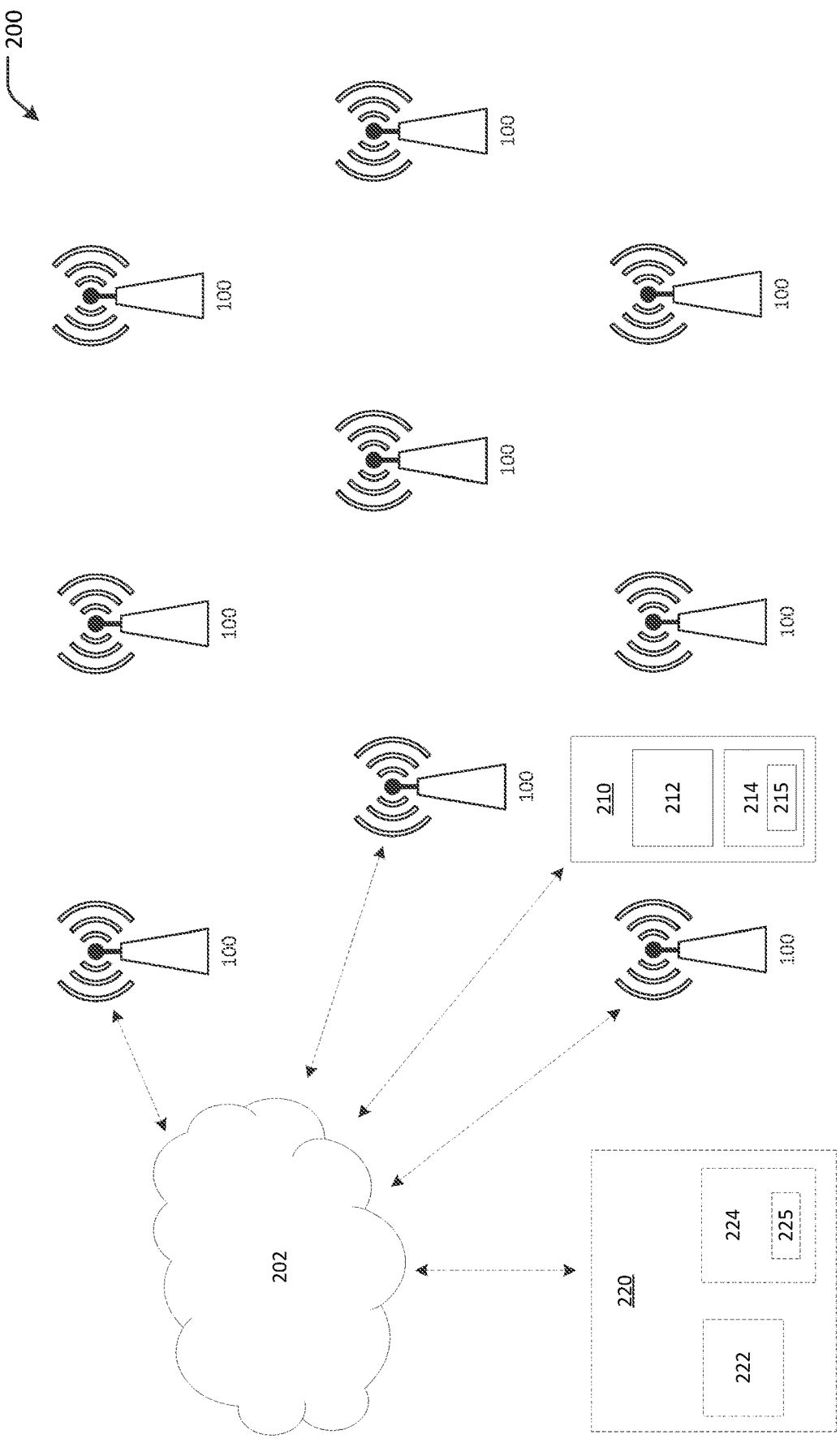
Figure 4:
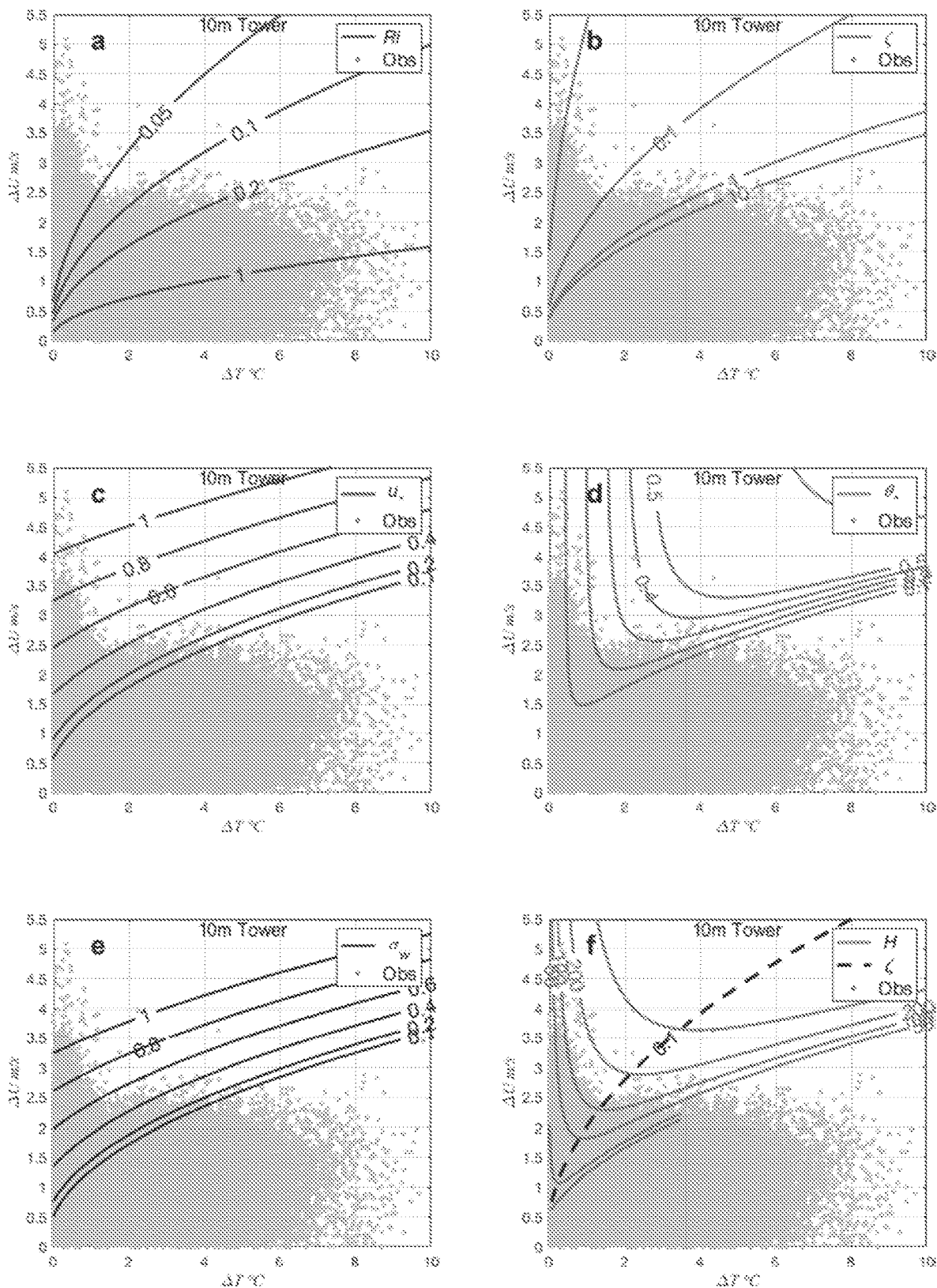
Figure 5:
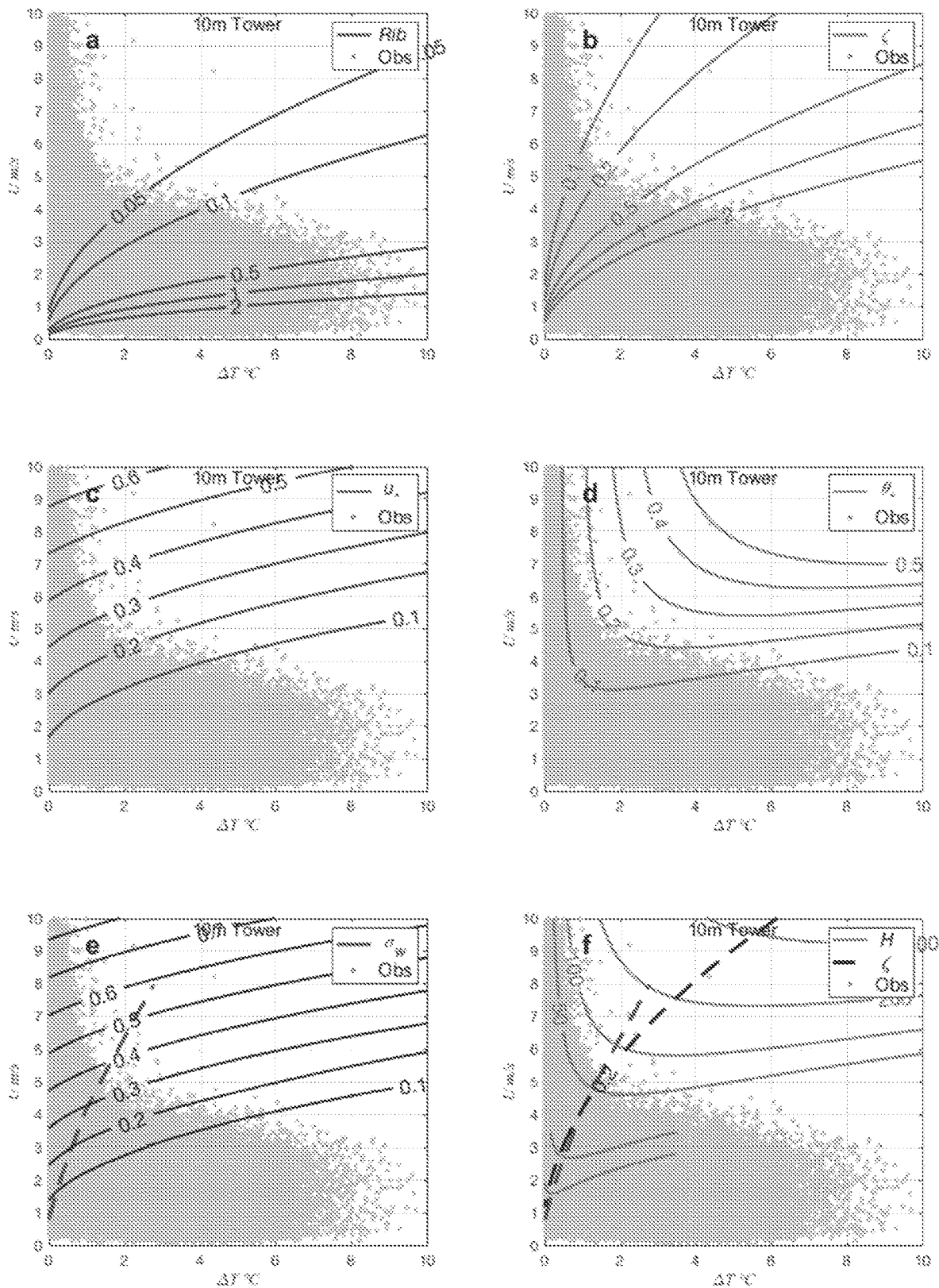
Figure 6:
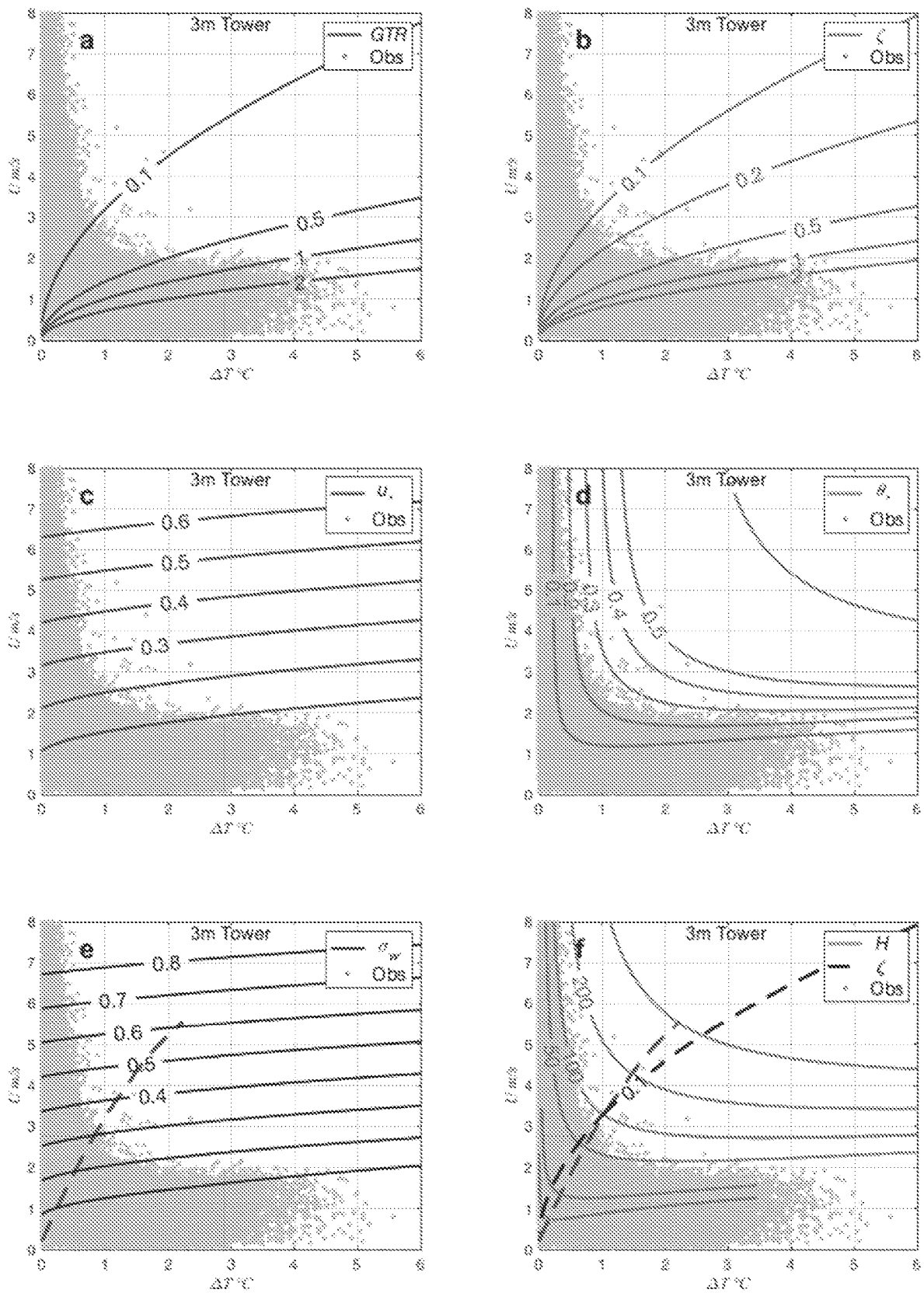
Figure 8:
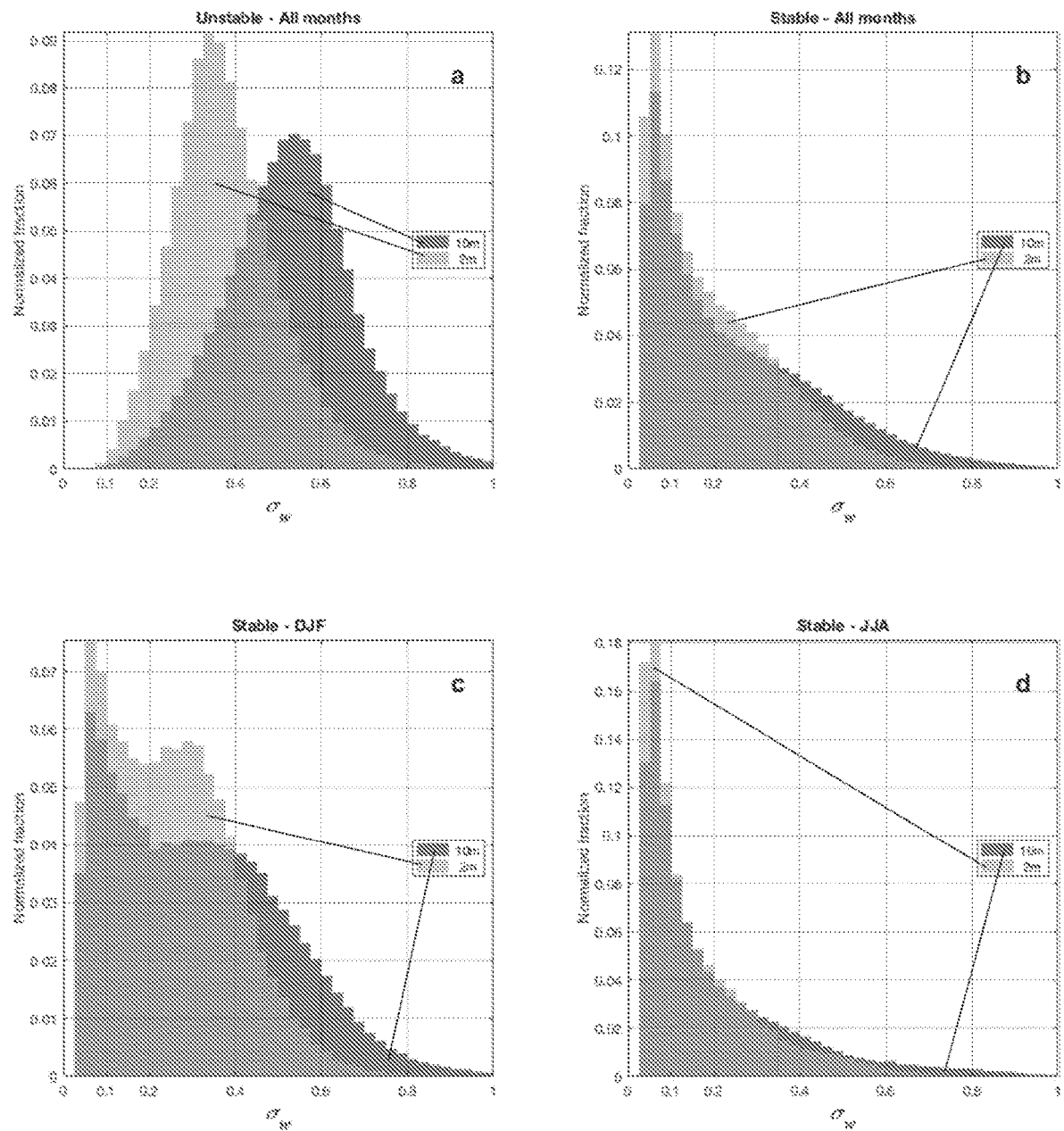
Figure 9:
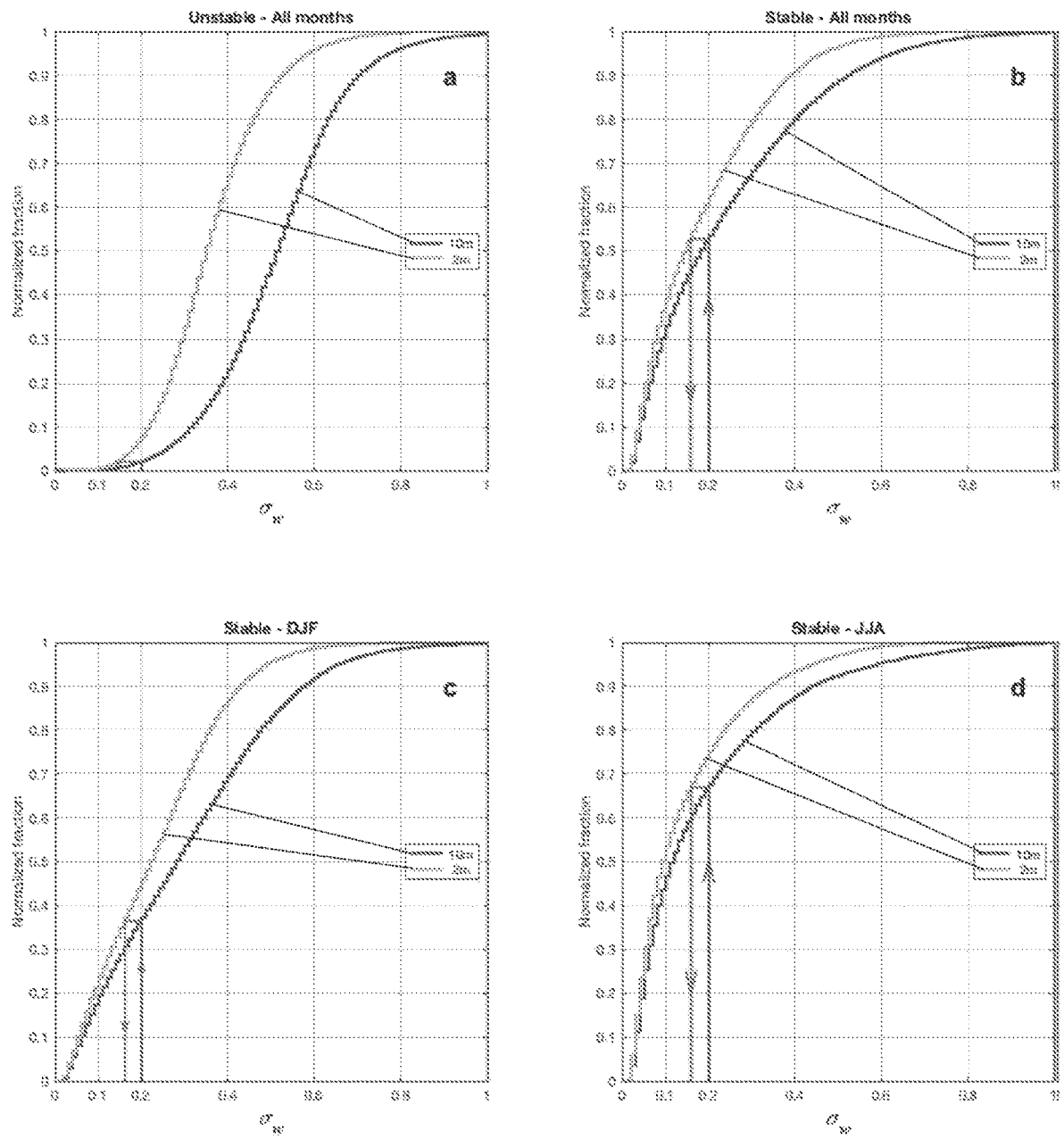
Figure 10:
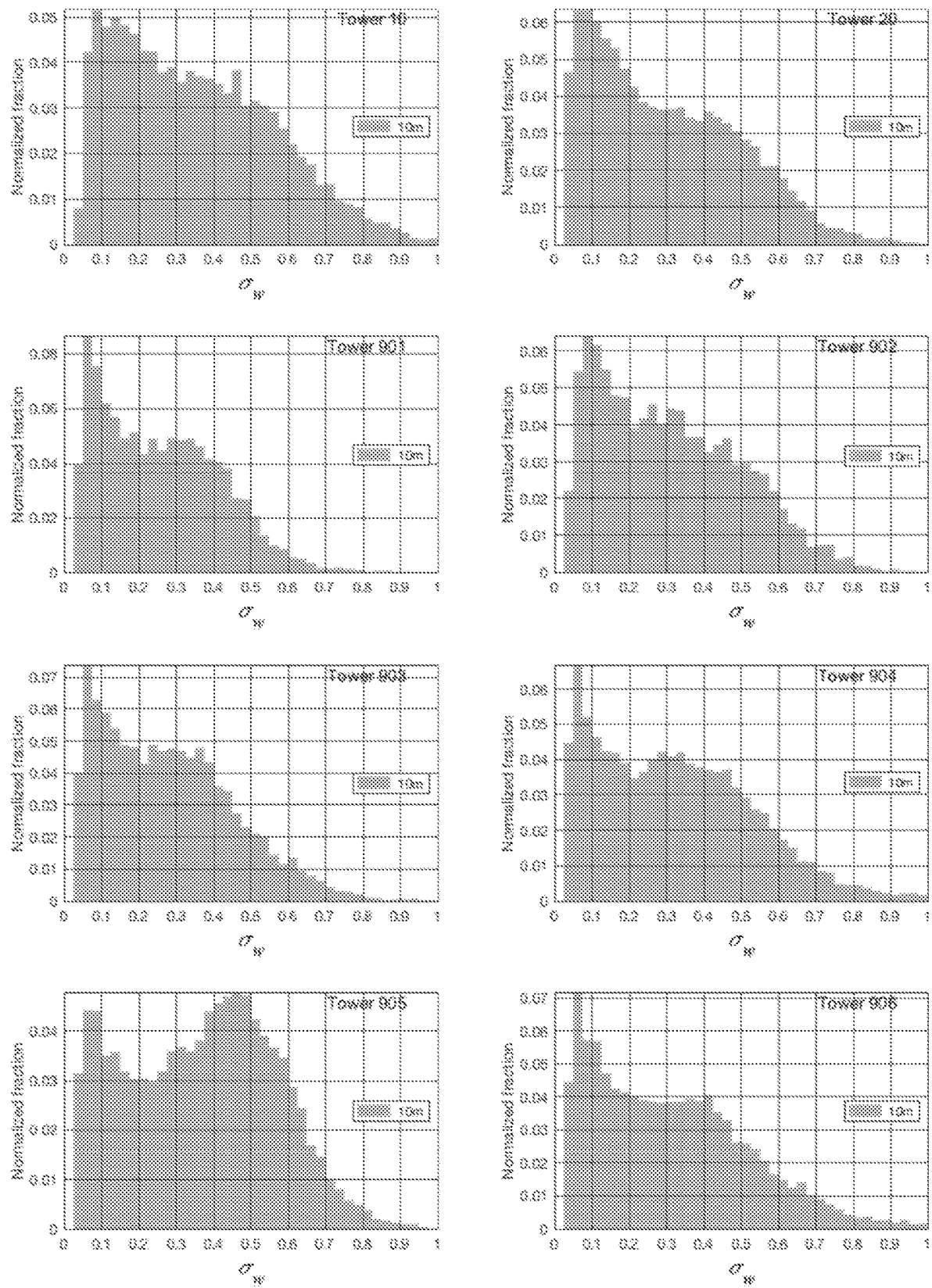

Referring to FIG. 2, a network system 200 of alert systems 100 is shown according to some embodiments. The alert systems 100 may be arranged in a substantially hexagonal array as shown. However, in some embodiments, it may not be possible to arrange the alert systems 100 in an ideal hexagonal array due to land availability and local topography.

The data loggers 110 of the alert systems 100 may communicate with each other as well as one or more client devices 210 via a communications network 202. For example, a wireless internet or telephonic network.

Such a network system 200 allows data comparison between alert systems 100 at different locations for data quality control. It also allows comparison of the proximity of different alert systems 100 in the network system 200 to a user location of the client device 210, so that meteorological condition information can be provided to the client device 210 from the closest alert system 100.

In some embodiments, the network system 200 may further comprise a server 220 configured to communicate with the alert systems 100 and/or client device 210. The server 220 may comprise at least one processor 222 and a memory 224. The memory 224 may store one or more code modules 225 or groups of program code that are executable by the processor 222 to store input data from the one or more sensors 120 on the memory 224, manipulate the data, and perform calculations to determine the vertical turbulence characteristic. The memory 224 may further include a communications module 225 configured to allow the server 224 to communicate with the client device 210 or data loggers 110 in the network 200.

The server 220 may comprise one or more specialist server computers, or one or more desktop computers or mobile devices configured to act as a server, for example. In some embodiments, the server 220 may be accessible via the internet, for example, via a web-based administrator portal (e.g., Eagle.io or Campbell Scientific Loggernet) allowing an administrator to control the server 220. The administrator portal may allow the administrator to set alarms and alarm displays, configure maps, charts, tables data for display to clients and/or to archive observational data or calculated vertical turbulence characteristics, for example.

The memory 224 of the server 220 may include program modules 225 configured to compare the user location with locations of the alert systems 100 to select a subset plurality of nearby alert systems 100 that are in range for providing sufficiently accurate meteorological condition information to the client device 210. In some embodiments, the memory 224 of the server 220 may include program modules 225 configured to select a closest one of the alert systems 100 to the client device 210 for providing the information to the client device.

In some embodiments, the memory 224 of the server 220 may include program modules 225 configured to compare vertical turbulence characteristics from two or more nearby alert systems 100 with the corresponding relative distances to the client device 210, and interpolate between the vertical turbulence characteristics from the nearby alert systems 100 to provide an interpolated estimate of the vertical turbulence characteristic corresponding to the local vertical turbulence conditions at the user location.

In some embodiments, the data loggers 110 or client device 210 may be configured to compare vertical turbulence characteristics from two or more nearby alert systems 100 with the corresponding relative distances to the client device 210, and interpolate between the vertical turbulence characteristics from the nearby alert systems 100 to provide an interpolated estimate of the vertical turbulence characteristic corresponding to the local vertical turbulence conditions at the user location.

In some embodiments, the memory 224 of the server 220 may include program modules 225 configured to compare observation data from two or more nearby alert systems 100 with the corresponding relative distances to the client device 210, and interpolate between the observation data from the nearby alert systems 100 to provide an estimate of the vertical turbulence characteristic corresponding to the local vertical turbulence conditions at the user location based on the interpolated observation data.

In some embodiments, the data loggers 110 or client device 210 may be configured to compare observation data from two or more nearby alert systems 100 with the corresponding relative distances to the client device 210, and interpolate between the observation data from the nearby alert systems 100 to provide an estimate of the vertical turbulence characteristic corresponding to the local vertical turbulence conditions at the user location based on the interpolated observation data.

In some embodiments, an alert system 100 or the network system 200 may send an alert or notification to registered client devices 210 in a certain area when there are hazardous spray conditions in that area (i.e., very stable or laminar conditions with insufficient turbulence for spray dispersion). In some embodiments, the alert system 100 or network system 200 may send a notification to a client device 210, on request from the client device 210, transmitting information regarding the current atmospheric conditions at the location of the client device 210, which may include the vertical turbulence characteristic (e.g., standard deviation of vertical wind speed) and/or an indication as to whether there are hazardous spray conditions at the user location or whether there is sufficient vertical turbulence for sufficient spray dispersion.

In some embodiments, the server 220 may act as a communication intermediary between data loggers 110 or between data loggers and the client device 210. For example, if a data logger 110a does not receive a response from another nearby data logger 110b, it may communicate with the server 220 and request communication with the other data logger 110b via the server 220. This may provide a back-up for communication and assist with fault detection, for example.

In some embodiments, the data loggers 110 may be configured to store observation data and/or calculated parameters, such as the vertical turbulence characteristic, locally on a hard drive. The stored data may be retrieved remotely via a communications network, or retrieved directly from the hard drive at the location of each data logger 110.

Referring to FIG. 3, a method 300 of determining local atmospheric stability conditions is shown, according to some embodiments. The method 300 comprises:

At step 301, receiving local meteorological observation data from one or more sensors at a location.

At step 302, analysing the data to determine a local vertical turbulence characteristic indicative of a current level of vertical turbulence at the location.

At step 303, comparing the vertical turbulence characteristic with a predetermined threshold of the vertical turbulence characteristic.

At step 304, transmitting information to a client device indicating whether local atmospheric stability conditions are suitable for crop spraying based on the comparison between the vertical turbulence characteristic and the predetermined threshold.

Observations

Figure 11:
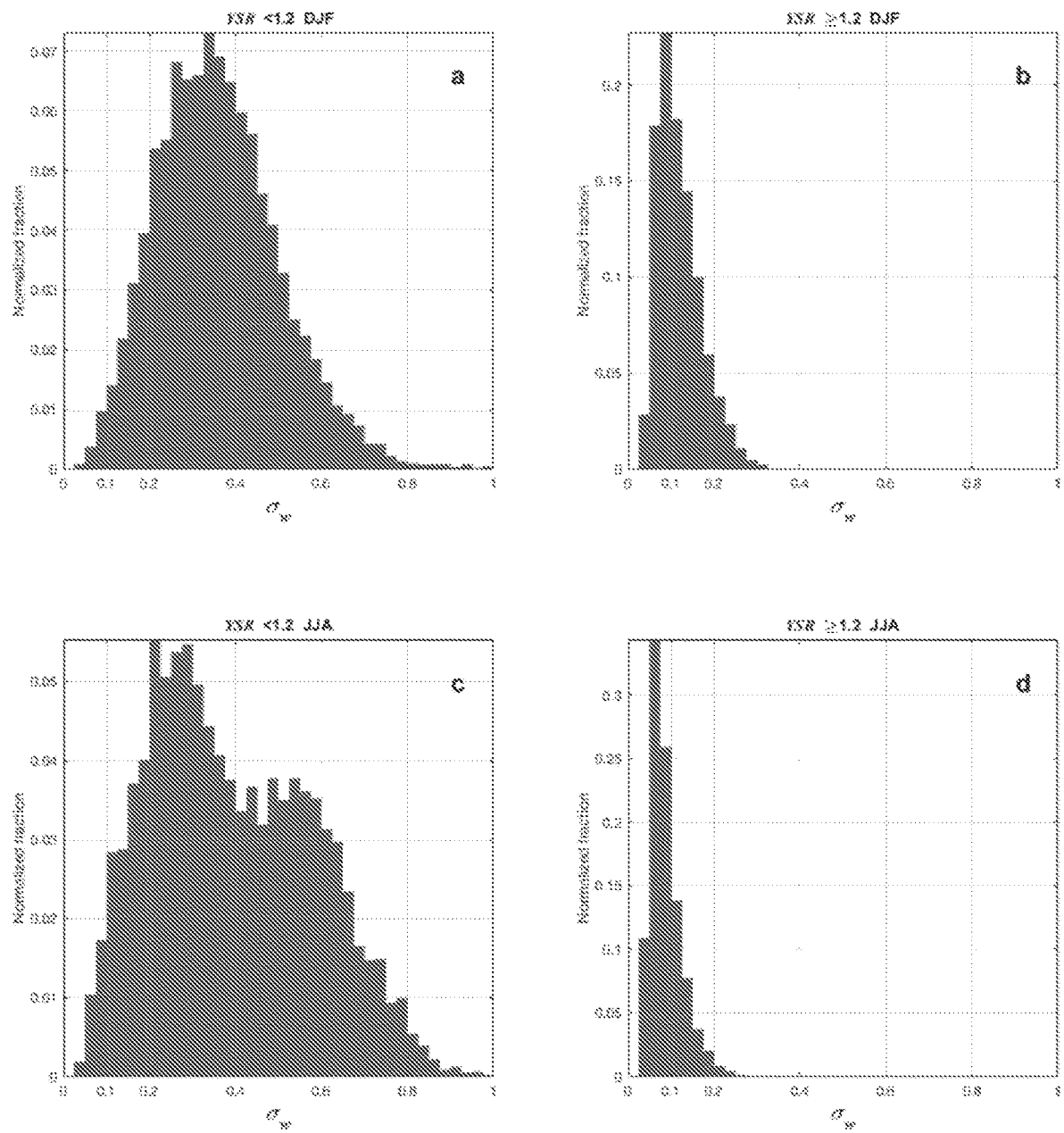
Figure 12:
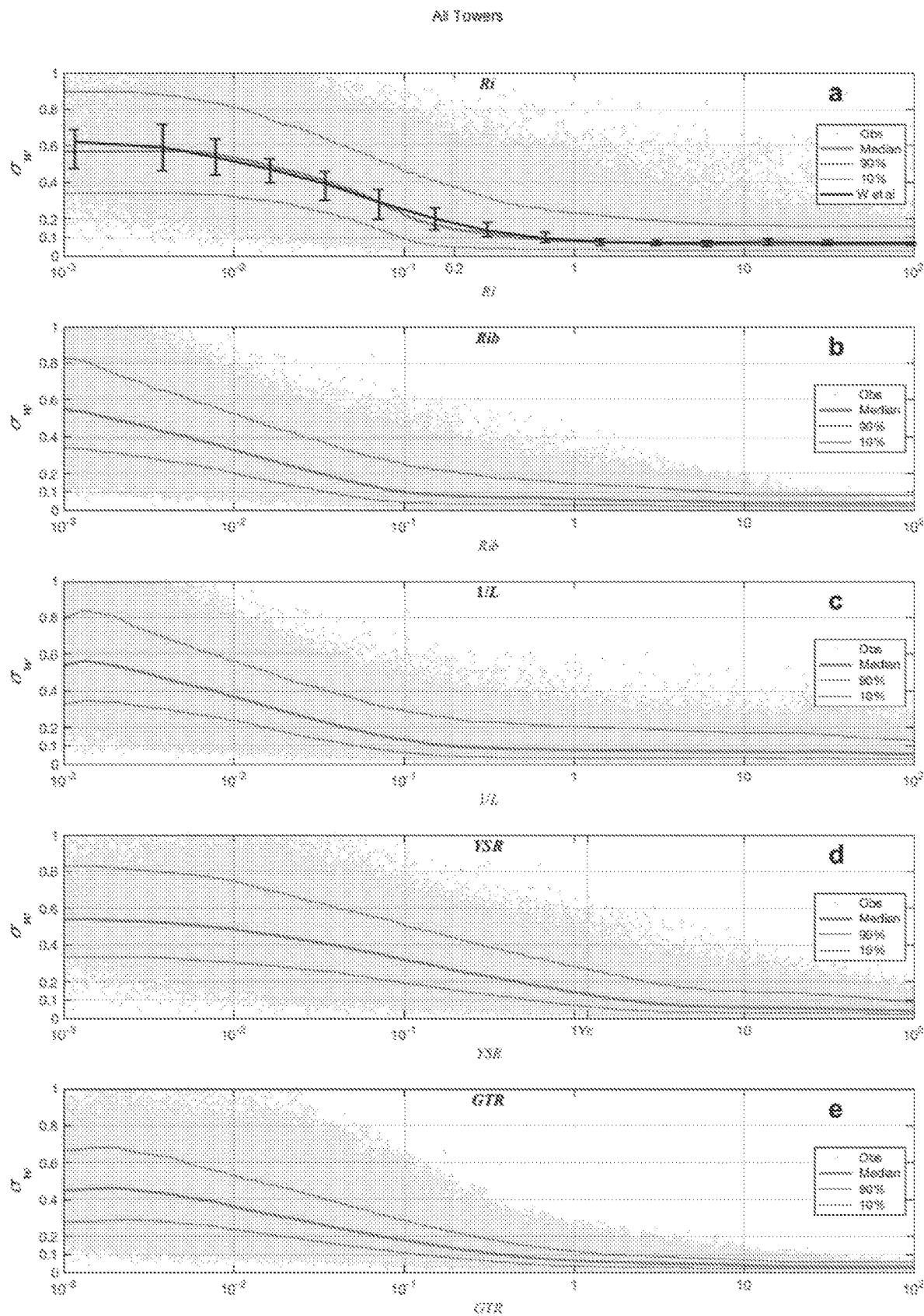
Figure 13:
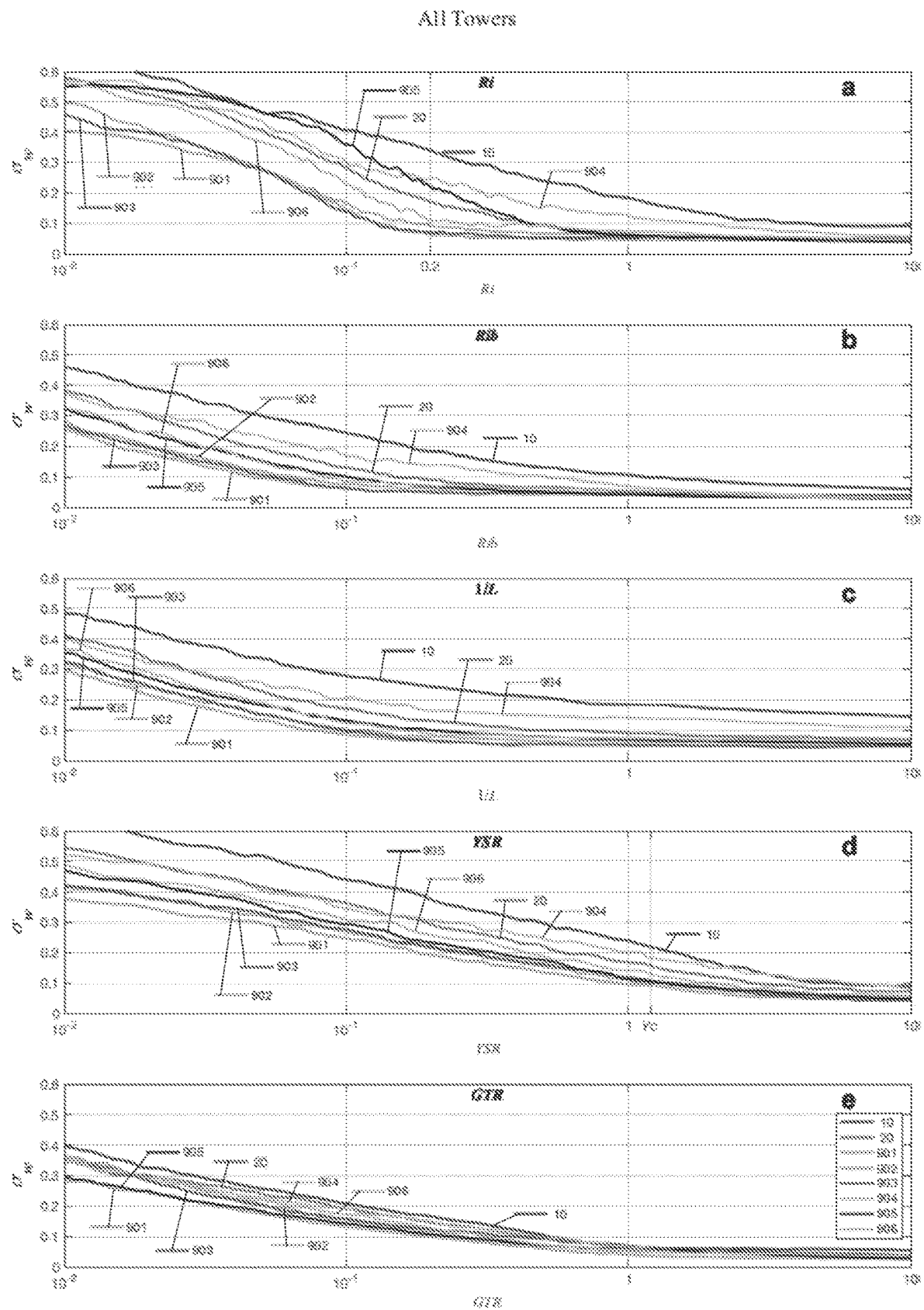
FIG. 13 shows the median of the vertical turbulence $\sigma_w$ for each station.
Figure 14:
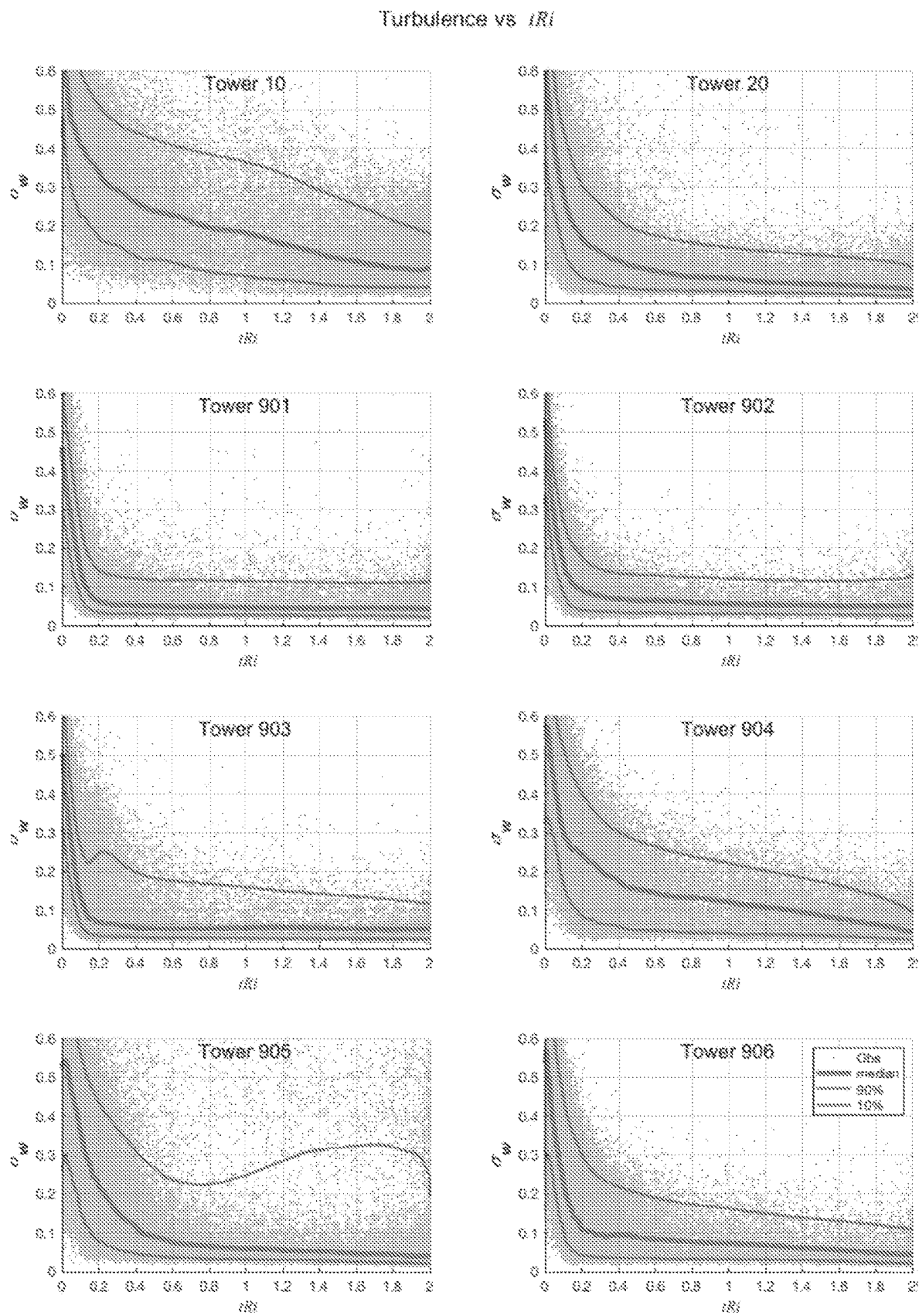
FIG. 14 shows running percentiles (50, 10 and 90%) of the vertical turbulence a, for each station against transformed Ri.
Figure 15:
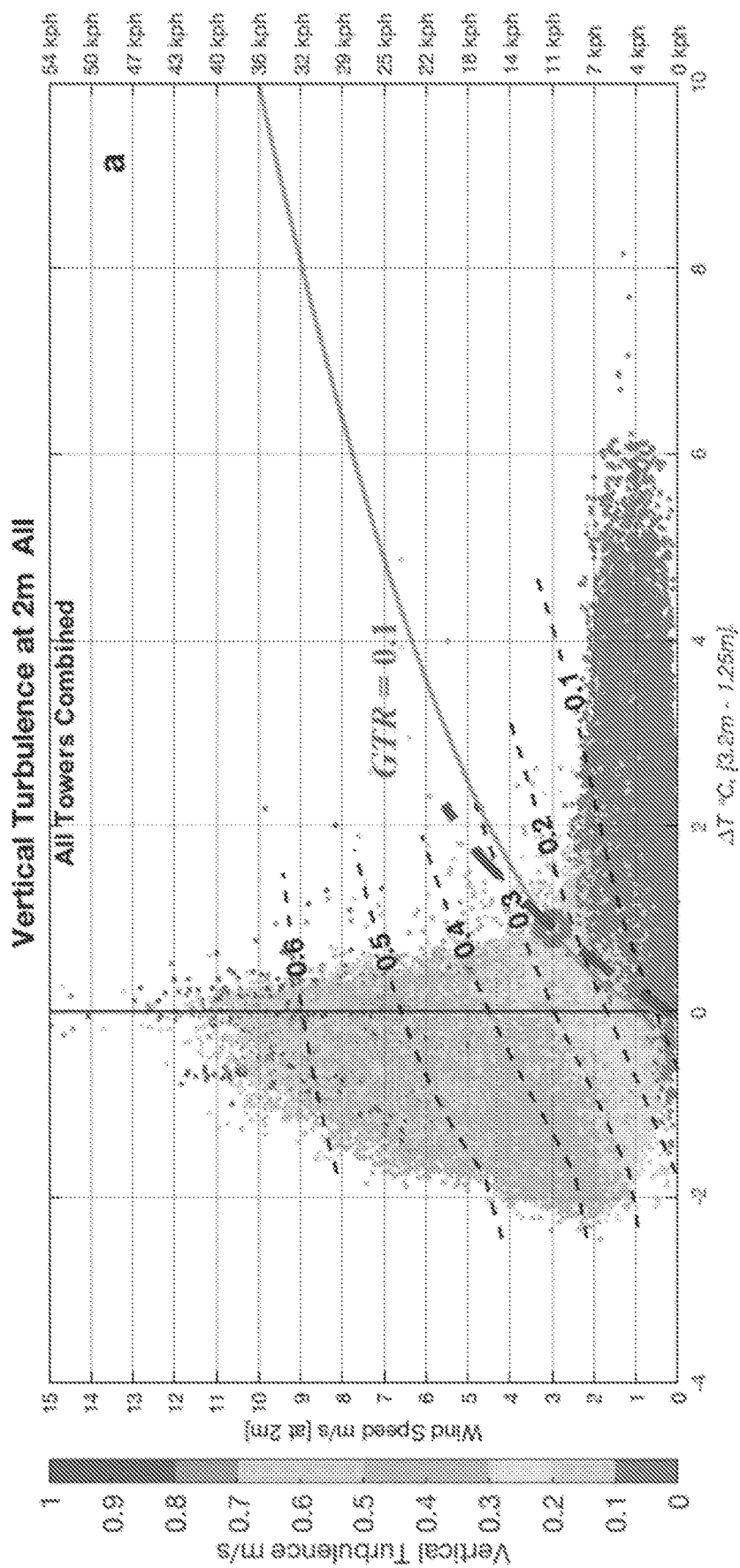
FIG. 15 shows the observational silhouette for all available 2 m data from all eight towers over all months in {ΔT,u} space.
Figure 16:
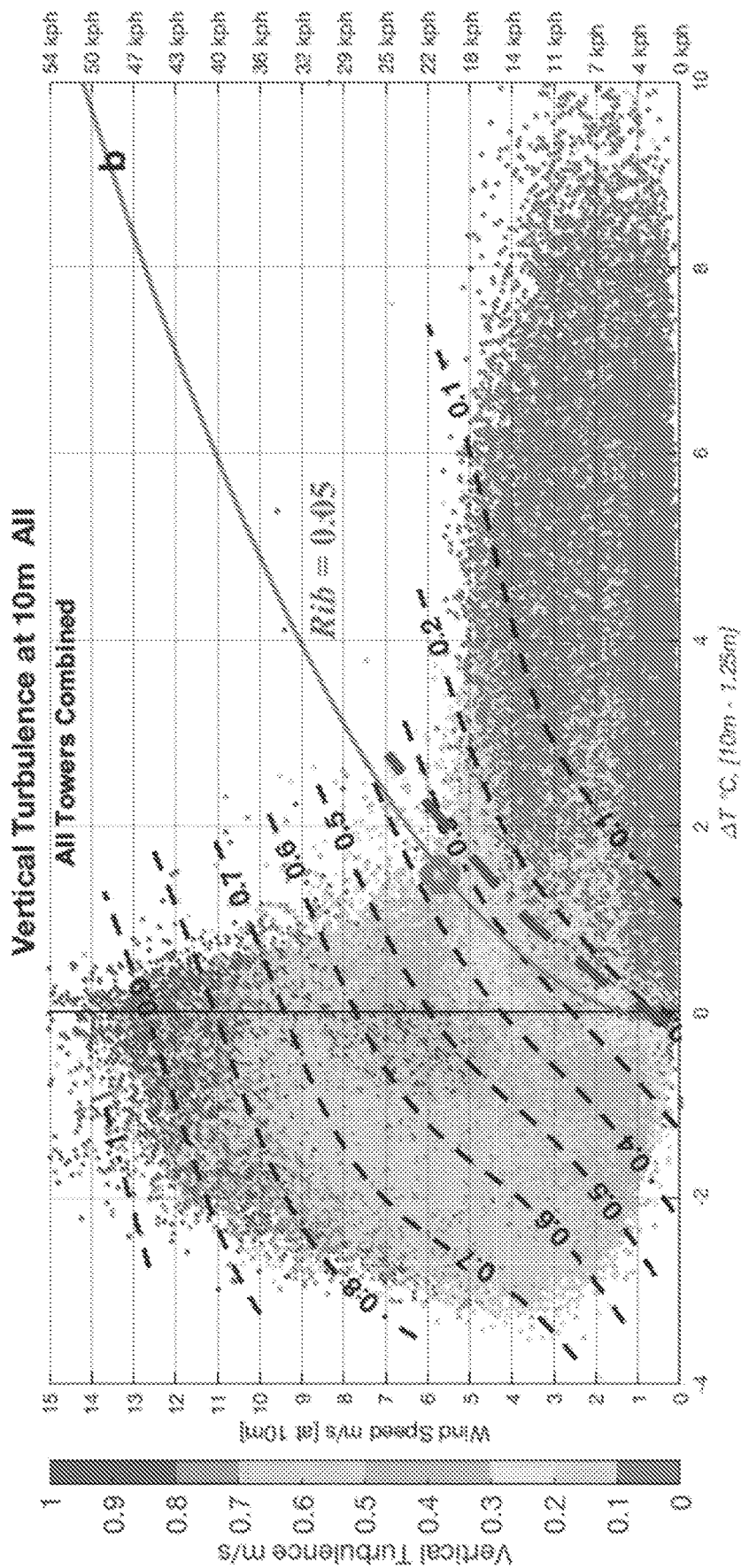
FIG. 16 shows the observational silhouette for all available 10 m data from all eight towers over all months in {ΔT,u} space.
Figure 17A:
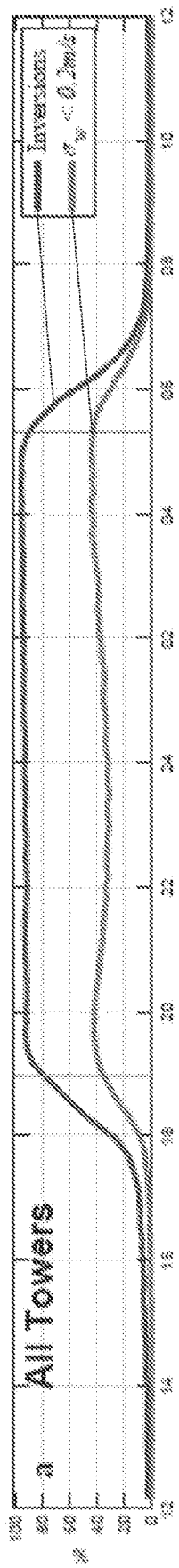
FIG. 17A shows the frequency of inversion conditions compared with hazardous conditions at various times of the day averaged over all 10 m observation towers and averaged over the Summer months December, January and February (DJF)
Figure 17B:
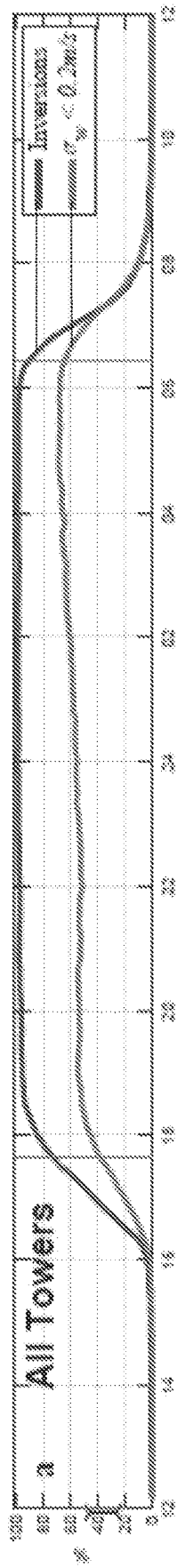
FIG. 17B is similar to FIG. 17A for Autumn—March, April, May (MAM)
Figure 17C:
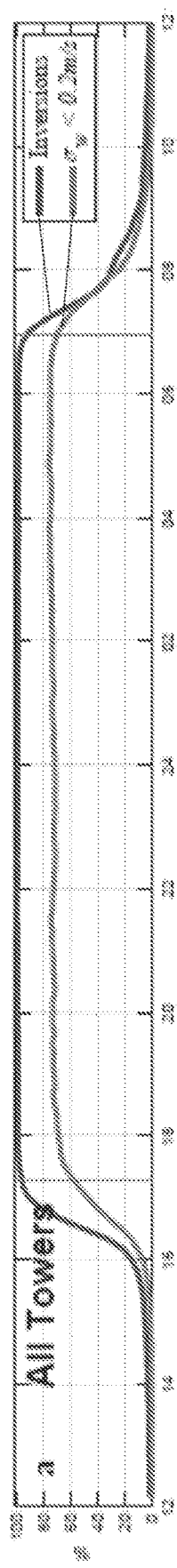
FIG. 17C is similar to FIG. 17A for Winter—June, July, August (JJA)
Figure 17D:
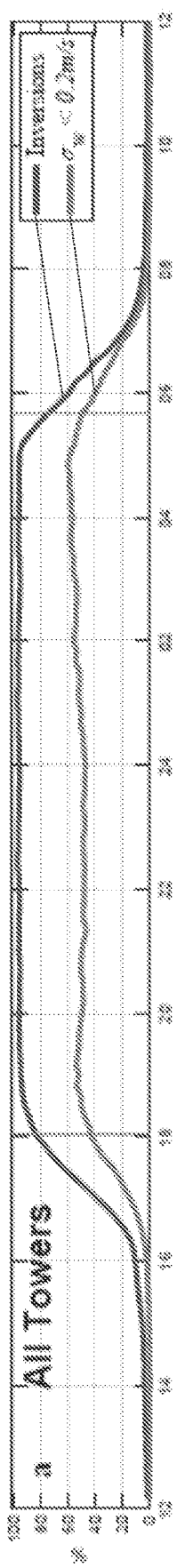
FIG. 17D is similar to FIG. 17A for Spring—September, October, November (SON)

MicroMeteorological observations from eight 10 m tall towers provided the dataset for this study. These towers form the core of a network with thirteen smaller or less well equipped towers which provided corroborative information not presented. All the eight towers are in agricultural cropping settings, in open and mainly flat or gently undulating terrain, with the exception of Tower 10 which is surrounded by significant and complex topography. Tower 10 is in the Clare Valley of South Australia; Tower 20 is in the Riverland of South Australia near Loxton; and Towers 901 to 906 are in northern New South Wales and southern Queensland.

On each of these towers two 3D sonic anemometers (RM Young Ultrasonic anemometer model 81005A with Campbell Scientific CR6 data logger) with response time of 0.25 s (equivalent to 4 Hz) at 2 m and 10 m were maintained. A reference temperature was obtained at 1.25 m with temperature differences obtained between 10 m and the reference and between 3.2 m and the reference. The differences were provided by paired thermocouples (of type EE181) calibrated by provider, Campbell Scientific Australia. Logging of data is for 10 minute periods. Data from the South Australian stations commenced in June 2016 and from those in Queensland and New South Wales in December 2016; this investigation uses all relevant data to end of June 2018. All data were quality controlled by visual scanning of time series and comparisons and a minimum of six-monthly site inspections. Any suspect data have been discarded. Suspect data amounted to less than 2% of data. Reference to 10 m towers will generally imply that some of the observations concerned are from 10 m; reference to 3 m towers implies that the observations concerned are limited to below 3.2 m and below—the equipment is physically on the same tower.

For investigation of the Yates stability ratio, data were obtained by interpolation from the tower readings. Wind speeds at 5 m were obtained by (spline) interpolation from wind speeds at 0, 2 and 10 m; similarly, temperatures for 2.5 m were obtained from readings at 1.25, 3.2 and 10 m above ground level.

Some analyses pertain to summer and winter seasons and these seasons are denoted by acronyms of initial letter of the months; thus, DJF (summer) and JJA (winter) respectively.

Two corrections were applied to the sonic anemometer readings as described by Foken (2016. Micrometeorology. Springer-Verlag. 3rd ed. Pp 362). The first correction is the rotation into the mean wind and the second is the tilt correction. Where relevant, all analyses were also performed without the tilt correction: for stable conditions Rib≥0 (defined later) there was little or no discernible difference with or without the tilt correction.

Referring to equations 1-16 set out above, Model surfaces of ζ, θ*, u*, H (heat flux) and $\sigma_w$ with Rib, GTR or YSR in {ΔT,u} space are provided at FIGS. 4 to 7 for each tower configuration superimposed on the silhouette of all available observations from the Tower 20 with ΔT>0. Tower 20 (at Loxton in South Australia) was chosen arbitrarily as representative or typical.

FIG. 4 shows data for a 10 m tower with two anemometers (at 2 m and 10 m). (a) Ri, (b) ζ, (c) u*, (d) θ*, (e) $\sigma_w$, (f) Heat flux H, with ζ as dashed black. The ridge in (f) marks the transition between WS (above) and VS (below): ζ=0.1 is roughly coincident with the ridge. Grey silhouette shows observations from all months at Loxton.

FIG. 5 is similar to FIG. 4 but for Rib. (a) Rib, (b) ζ, (c) u*, (d) θ*, (e) $\sigma_w$, (f) Heat flux H, with ζ as dashed black. The ridge in f marks the transition between WS (above) and VS (below): ζ=0.2 is roughly coincident with the ridge. Dashed blue line at e and f is subjective position of ridge axis of H at f. Observations tend to be confined below H=100 W/m$^2$ in the WS regime and below H=50 W/m$^2$ in the VS regime.

FIG. 6 is similar to FIGS. 4 and 5, but for GTR with 3 m tower. (a) GTR (blue). (b) ζ, (c) u*, (d) θ*, (e) $\sigma_m$, (f) Heat flux H, with ζ as dashed black. The ridge in f marks the transition between WS (above) and VS (below): ζ=0.1 is roughly coincident with the ridge. Dashed blue line at e and f is subjective position of ridge axis of H at f. Observations tend to be confined below H=100 W/m$^2$ in the WS regime and below H=50 W/m$^2$.

FIG. 7 is similar to FIGS. 4 to 6, but for YSR with 10 m tower as described. (a) YSR, (b) ζ, (c) u*, (d) B*, (e) $\sigma_w$, (f) Heat flux H, with YSR as dashed black. Yates recommended to avoid spraying when YSR≥1.2. The ridge in H marks the transition between WS (above) and VS (below): YSR=1.2 is roughly coincident with the ridge at least in the footprint of observations. Observations tend to be confined below H=100 W/m$^2$.

As anticipated, contours of Calign with Rib, GTR and approximately so with YSR. The contours of H exhibit a broad ridge axis and the ζ=0.1 line approximates this ridge axis. This is consistent with the value of ζ for the transition between WS (weakly stable regime) and VS (very stable regime) noted in the Introduction. The YSR=1.2 line (FIGS. 7*a* and *f*) is coincident with the ridge axis—thus YSR of 1.2 is a fair depiction of the transition between WS and VS regimes.

Referring to FIGS. 8 to 11, the behaviour of vertical turbulence is examined in regard to WS and VS regimes. Particular reference is made to laminar conditions and ideal spraying conditions. The behaviour of $\sigma_w$ in {ΔT,u} space is also examined.

FIG. 8 shows data for or all eight towers combined, Histograms of $\sigma_w$ measured at 2 m (green) and at 10 m (blue) for (a) Rib<0, (b) Rib≥0, (c) Rib≥0 during DJF and (d) Rib≥0 during JJA. Histogram for unstable conditions (Rib<0) shows a peak of about 0.3 m/s and 0.5 m/s for measurements at 2 m and 10 m respectively, and few occurrences with $\sigma_w$ below 0.1 or 0.2 m/s. Histograms for stable conditions invariably have a peak at about 0.05 m/s and are either bimodal with a second peak or shoulder at 0.3 to 0.4 m/s, or a highly skewed tailing off. The first peak is attributed to VS conditions and the second peak, or long tail, to WS conditions. DJF refers to the summer period (December, January and February) and JJA refers to the winter period (June, July and August).

FIG. 9 shows the combined data from all eight towers as empirical cumulative distribution frequencies for $\sigma_w$ at 2 m and 10 m (green and blue respectively) for (a) Rib<0, (b) Rib≥0, (c) Rib≥0 during DJF and (d) Rib≥0 during JJA. Red arrows show the value of $\sigma_w$ at 2 m corresponding to the same percentile of $\sigma_w$ at 10 m equal to 0.2 m/s. For grouped and individual tower observations the corresponding value of $\sigma_w$ at 2 m is generally 0.15 to 0.16 m/s.

FIG. 10 shows histograms of $\sigma_w$ measured at 10 m for Rib≥0 during DJF at each tower. Bimodality or near bimodality is apparent at all stations during summer. The position of the first peak is usually close to 0.05 m/s and less than 0.1 m/s while the secondary peak varies from 0.3 m/s at Tower 901 to 0.5 m/s at Tower 905.

FIG. 11 shows histograms of $\sigma_w$ at 10 m for stable conditions (Rib>0) and split about YSR of 1.2 for DJF and JJA. (a) YSR<1.2 for DJF, (b) YSR≥1.2 for DJF, (c) YSR<1.2 for JJA, and (d) YSR≥1.2 for JJA. Histograms for YSR<1.2 show relatively few occurrences with $\sigma_w$ below 0.1 or 0.2 m/s, whereas with YSR≥1.2, $\sigma_w$ is mostly below 0.1 or 0.2 m/s. The Yates recommendation for no spraying when YSR≥1.2 is consistent with the notion of not spraying during low turbulence environment.

Frequency analysis of vertical turbulence $\sigma_w$ in relation to stability is presented at FIGS. 8 to 11. A series of comparisons (not presented here) for individual towers showed that $\sigma_w$ at 2 m is about 0.7 to 0.8 of $\sigma_w$ at 10 m.

For unstable situations (Rib<0) the histogram of $\sigma_w$ at 10 m (FIG. 8a) reveals a peak at about 0.5 m/s and very few instances where $\sigma_w$<0.1 ms/(<1%) and few instances where $\sigma_w$<0.2 m/s (<2%). On the other hand, for stable situations (Rib>0) the histograms exhibit skewness and a peak at approximately 0.05 m/s with a long tail and a median of approximately 0.2 m/s.

During the summer months (DJF), histograms of the stable cases show a tendency to be bimodal with a peak at 0.05 m/s and a second peak at 0.3 to 0.5 m/s (FIGS. 8*c* and 10). The first and second peaks may correspond to VS and WS regimes respectively.

Histogram plots for stable conditions during winter are unimodal and highly skewed. Histogram analyses (FIG. 11) for $\sigma_w$ at 10 m, for stable conditions (Rib>0) segmented by YSR about the Yates critical value of 1.2, and further split by summer or winter, show that with YSR≥1.2, $\sigma_w$ rarely exceeds 0.2 m/s (6% and 1% of the time during summer and winter respectively) and with YSR<1.2, $\sigma_w$ is rarely <0.1 m/s (2% and 4% of the time during summer and winter respectively).

Inspection reveals that typical values for $\sigma_w$ of 0.3 to 0.5 m/s for winter and summer respectively occur with YSR<1.2 (when spraying is acceptable with respect to stability according to Yates); and $\sigma_w$ likely to be <0.2 m/s when YSR≥1.2 (spraying is to be avoided due to risk of drift according to Yates). Yates' critical value was arrived at by consideration of drift deposition, however, it appears that the critical value is an implicit indicator of vertical turbulence. That is, for YSR<1.2 the turbulence will be moderate to strong and for YSR≥1.2 the turbulence will be weak.

The relationships of vertical turbulence with various stability parameters for stable conditions (Rib>0) are presented at FIGS. 12 to 14.

FIG. 12 shows combined data for all stations and for stable conditions (Rib>0), with plots of the vertical turbulence $\sigma_w$ versus each of Ri, Rib, 1/L, YSR and GTR ($\sigma_w$ is given for 10 m for 12*a* to 12*d* and 2 m for 12*e*—GTR). The silhouette of the actual observations is overlain with the running percentiles (median, and 10% and 90%). The traditional critical value of Ri=0.2 and the Yates critical value are shown.

Turbulence falls off from the near-neutral conditions, where each of the stability parameters is 0.001, to then 'flat-line' with $\sigma_w$ below 0.1 m/s with high stability.

Superimposed on FIG. 12*a* is the $\sigma_w$-Ri relationship reported by Williams et al (Williams Ag, Chambers S, and A Griffiths. 2013. Bulk Mixing and Decoupling of the Nocturnal Stable Boundary Layer Characterized Using a Ubiquitous Natural Tracer. *Boundary Layer Meteorology.* 149:381-402.). Their measure of Ri (which they refer to as Rib) is over the much deeper interval of 2 m to 50 m so is not necessarily directly comparable. Nevertheless, the relationships are remarkably similar.

FIG. 13 is similar to FIG. 12, but shows the median for each station. There is a wide spread in behaviour as higher stability is approached and there is evidently no single critical value for any stability ratio shown which is universal for all stations. At Ri=0.2, three stations have median $\sigma_w$<0.1 m/s but three other stations still have median $\sigma_w$>0.2 m/s.

FIG. 14 shows running percentiles (50, 10 and 90%) of the vertical turbulence for each station against transformed Ri. For convenience, for the plot at FIG. 14, Ri has been transformed according to:

$$tRi = Ri \text{ if } |Ri| \le 1$$

$$tRi = (2/\pi)\text{Arctan } Ri \text{ if } |Ri| > 1 \tag{15}$$

For positive Ri, this transformation compresses Ri>1 into the interval [1,2] while leaving it unchanged over the interval [0,1]. Running medians and percentiles are not distorted by this transformation since they are calculated on percentile bins of Ri.

There is a wide spread in behaviour as higher stability is approached and there is evidently no single critical value for any stability ratio shown which is universal for any station. Tower 905 evidently is strongly influenced by external turbulence as the stability becomes extreme.

From the individual views of the turbulence behaviour with transformed Ri it is seen that Tower 10 has markedly different behaviour. Towers 10 and 905, and to a lesser extent Tower 904, exhibit high $\sigma_w$ values with high Ri. Tower 10 is surrounded by complex topography but Tower 904 is in unremarkable and flat terrain. At these stations in particular, $\sigma_w$ is often much higher than at the other stations when Ri>1. This feature is presumably due to the influence of transient disturbances and/or top-down generated turbulence.

In {ΔT,u} space, the observations reveal some ubiquitous features. FIGS. 15 and 16 show the observational silhouette previously encountered at FIGS. 4 to 7, which includes all available data from all eight towers over all months (2 m data in FIG. 15 and 10 m data in FIG. 16).

The critical point is shown as a red circle, the GTR and Rib curves are those that pass though the critical point and the dashed blue lines are those from the MOST model heat flux maximum from FIGS. 5*f* and 6*f*. Contours show mean $\sigma_w$ while colour coding applies to individual observations.

When unstable conditions are also included the silhouette resembles a foot. Just above the instep is a threshold or critical point, marked as a large red circle. Only if the wind speed is less than at this point does strong stratification occur. In stable conditions, it separates steep and shallow gradients in the graph of u versus ΔT silhouette and coincides with the modelled maximum heat flux (blue line as from the earlier Figures). The mean turbulence is shown by the contour values which increase to the upper-left.

Clearly the lowest turbulence is in the stronger inversion/weaker winds region. Nevertheless, it is remarkable how strong the winds can be within a strong inversion—in rare cases, as much as much as 4 to 5 m/s with 4 to 6° C. inversions for the 10 m towers.

Also plotted are the Rib and GTR curves which pass through the critical point. There is a weak tendency for the mean contours of vertical turbulence to run parallel to these curves. The variability of the observed $\sigma_w$ is shown by the underlying scatterplot which is colour-coded by turbulence intensity. Clearly, red dots ($\sigma_w$<0.1 m/s) are confined to the low winds but purple and green dots ($\sigma_w$ up to 0.4 m/s) are to be found in the predominantly red area. However, the red dots tend not be found above the curves through the critical point.

Referring to FIGS. 17A to 17D, the frequency of inversion conditions is shown compared with the frequency of hazardous conditions at various times of the day averaged over all 10 m observation towers and averaged over the Summer months December, January and February (DJF); Autumn months March, April, May (MAM); Winter months June, July, August (JJA); and Spring months September, October, November (SON).

During average hours between sunset and sunrise, inversion conditions occur more than 90% of the time. However, hazardous spray conditions (with insufficient turbulence for spray dispersion) only occur 30% to 40% of the time during Summer (DJF); 50% to 65% of the time during Autumn (MAM); 70% to 80% of the time during Winter (JJA); and 40% to 60% of the time during Spring (SON).

Therefore, there is a significant proportion of time during inversion conditions (when current guidelines forbid crop spraying), when there is actually sufficient turbulent mixing near the surface to allow safe crop spraying.

These periods of safe spraying conditions during inversions can be identified by determining when there is sufficient vertical turbulence. For example, by determining when the standard deviation of vertical wind speed is above a predetermined threshold, as set out in the present disclosure.

In addition to estimating current local atmospheric conditions and identifying whether there is sufficient vertical turbulence for crop spraying, various stored data may be used for short term forecasting to estimate the likelihood of the local atmospheric conditions being suitable for crop spraying during a selected future period, or forecast period. For example, the likelihood of unsuitable conditions occurring in the next 2 hours, or during another selected future period, may be estimated. Information may then be transmitted to a client device indicating whether local atmospheric conditions at a location of interest (such as a location of the client device) are likely to be suitable for crop spraying during a selected future period (or a number of future time periods), and a "safe"/"unsafe" recommendation may be transmitted to the client device.

Such forecasting estimates may be determined using computer implemented methods by the alert system 100 by one or more of: the processor 112 of the data logger 110; the processor 212 of the client device 210; a number of data loggers 110 in the network system 200; or the processor 222 of the server 220. The computer implemented methods described herein may be performed by execution of processor-executable program code stored in code modules on the memory of the data logger(s) 100 and/or client device 210 and/or server 220.

The information indicating whether local atmospheric conditions at the location of interest are likely to be suitable for crop spraying during the selected future period may then be transmitted to the client device from the data logger(s) 110 or server 220, for example, by the alert system(s) 100 or network system 200.

Some embodiments relate to a computer implemented method of forecasting local atmospheric conditions at a location of interest, the method comprising:

analysing stored data including values of a local vertical turbulence characteristic corresponding to the location of interest for a predetermined past period;

estimating a probability distribution for the local vertical turbulence characteristic at the location of interest over a selected future period, based on statistical characteristics of the stored local vertical turbulence characteristic data of the predetermined past period;

comparing the probability distribution for the local vertical turbulence characteristic with a predetermined threshold of the vertical turbulence characteristic;

determining an estimated likelihood of the local vertical turbulence characteristic at the location of interest falling below the predetermined threshold during the selected future period based on the comparison between the probability distribution for the local vertical turbulence characteristic and the predetermined threshold; and transmitting information to a client device indicating whether local atmospheric stability conditions at the location of interest are likely to be suitable for crop spraying during the selected future period based on the estimated likelihood of the local vertical turbulence characteristic falling below the predetermined threshold.

The stored local vertical turbulence characteristic data corresponding to the location of interest may be determined according to any one of the methods described in the present disclosure.

The local vertical turbulence characteristic may comprise an estimate of the standard deviation of the vertical wind speed ($\sigma$) at the location of interest, for example. The predetermined threshold of the vertical turbulence characteristic may be a predetermined threshold of the standard deviation of the vertical wind speed. For example, the predetermined threshold may be in the range of 0.1 m/s to 0.3 m/s, 0.15 m/s to 0.25 m/s, 0.18 m/s to 0.22 m/s or about 0.2 m/s.

The stored local vertical turbulence characteristic data may include a set of values of the local vertical turbulence characteristic corresponding to a series of regular time intervals spanning the predetermined past period. For example, the time intervals of the stored data may be 10 minutes in duration. Alternatively, other suitable time intervals may be used. For example, the duration of the time intervals of the stored data may be in the range of 1 to 60 minutes, 5 to 30 minutes, 5 to 15 minutes, 8 to 12 minutes, or about 1 minute, 5 minutes, 10 minutes, 15 minutes, 20 minutes, 25 minutes, 30 minutes, 35 minutes, 40 minutes, 45 minutes, 50 minutes, 55 minutes or 60 minutes.

The predetermined past period may be 2 hours in duration, for example, or any other suitable period, such as at least 30 minutes, at least 1 hour, at least 2 hours, or about 1 hour or about 2 hours, for example.

Estimating the probability distribution for the local vertical turbulence characteristic over the selected future period may comprise: determining statistical deviations in the local vertical turbulence characteristic over the predetermined past period relative to a historical baseline for the local vertical turbulence characteristic; and combining the determined statistical deviations with the historical baseline at each of a plurality of timepoints over the selected future period to estimate the probability distribution for the local vertical turbulence characteristic at each timepoint.

For example, the plurality of timepoints may be defined as a series of points in time distributed over the selected future period. The timepoints may be separated by time intervals. The timepoints may be regularly distributed over the selected future period. The timepoints may be separated by regular time intervals (e.g., 10 minute intervals) over the selected future period (e.g. a future 2 hour period).

For example, the statistical deviations in the local vertical turbulence characteristic determined over the predetermined past period may include: minimum deviation; 25$^{th}$ percentile of deviation; median deviation; 75$^{th}$ percentile of deviation; and maximum deviation.

The probability distribution at each timepoint over the selected future period may be estimated by combining the determined statistical deviations with the historical baseline at each timepoint assuming a uniform distribution between each of the quartiles such that there is:

- a 25% likelihood of the vertical turbulence characteristic having a value between the minimum deviation and the 25$^{th}$ percentile of deviation relative to the baseline at each timepoint;
- a 25% likelihood of the vertical turbulence characteristic having a value between the 25$^{th}$ percentile of deviation and the median deviation relative to the baseline at each timepoint;
- a 25% likelihood of the vertical turbulence characteristic having a value between median deviation and the 75$^{th}$ percentile of deviation relative to the baseline at each timepoint; and
- a 25% likelihood of the vertical turbulence characteristic having a value between the 75$^{th}$ percentile of deviation and the maximum deviation relative to the baseline at each timepoint.

Determining the statistical characteristics of the stored local vertical turbulence characteristic data of the predetermined past period may comprise subtracting the historical baseline from the observed or calculated value of local vertical turbulence characteristic to determine the deviation from the historical baseline for each datapoint in the predetermined past period. The statistical characteristics of the stored data may then be determined by calculating the maximum and minimum of all deviations in the predetermined past period (noting that the minimum deviation may be negative) and determining the 25$^{th}$ percentile of deviation, 75$^{th}$ percentile of deviation, and the median or 50$^{th}$ percentile of deviation.

1. Minimum deviation, $\Delta\sigma_a$
2. 25$^{th}$ percentile of deviation, $\Delta\sigma_a$
3. 50$^{th}$ percentile (i.e., median) of deviation, $\Delta\alpha_c$
4. 75$^{th}$ percentile of deviation, $\Delta\sigma_d$
5. Maximum deviation, $\Delta\sigma_e$ These statistical characteristics can then be added onto the historical baseline ($\sigma_{bl}$) for each time point in the selected future period to determine a probability distribution for the local vertical turbulence characteristic (e.g., $\sigma_w$). The probability distribution for each timepoint may be described as:

$$\sigma_i = \sigma_{bl} + \Delta\sigma_i$$

where i refers to each statistical characteristic: maximum deviation, minimum deviation, 25$^{th}$ percentile of deviation, 75$^{th}$ percentile of deviation, and the median or 50$^{th}$ percentile of deviation of the local vertical turbulence characteristic.

The probability distribution for each timepoint in the selected future period is then compared with the predetermined threshold of the vertical turbulence characteristic to estimate a probability or likelihood of the local vertical turbulence characteristic being below the predetermined threshold at the location of interest for each timepoint in the selected future period.

The probability of the local vertical turbulence characteristic being below the predetermined threshold u at the location of interest for each timepoint is:

$$\sigma_{crit} < \sigma_a \qquad \alpha = 0$$
$$\sigma_a \leq \sigma_{crit} < \sigma_b \qquad \alpha = 0.25\left(\frac{\sigma_{crit} - \sigma_a}{\sigma_b - \sigma_a}\right)$$
$$\sigma_b \leq \sigma_{crit} < \sigma_c \qquad \alpha = 0.25 + 0.25\left(\frac{\sigma_{crit} - \sigma_b}{\sigma_c - \sigma_b}\right)$$
$$\sigma_c \leq \sigma_{crit} < \sigma_d \qquad \alpha = 0.5 + 0.25\left(\frac{\sigma_{crit} - \sigma_c}{\sigma_d - \sigma_c}\right)$$
$$\sigma_d \leq \sigma_{crit} < \sigma_e \qquad \alpha = 0.75 + 0.25\left(\frac{\sigma_{crit} + \sigma_d}{\sigma_e - \sigma_d}\right)$$
$$\sigma_{crit} \geq \sigma_e \qquad \alpha = 1$$

where $\sigma_{crit}$ is the critical value of 0.2 and $\sigma_a$, $\sigma_b$, $\sigma_c$, $\sigma_d$, $\sigma_e$ are respectively the minimum, 25$^{th}$, 50$^{th}$ and 75$^{th}$ percentiles and maximum descriptors for the probability distribution.

Summing the probabilities for each timepoint in the selected future period provides the number of timepoints in the selected future period which are expected to have a value of the local vertical turbulence characteristic less than the predetermined threshold u.

Determining the estimated likelihood of the local vertical turbulence characteristic falling below the predetermined threshold during the selected future period may comprise: summing the probabilities of the probability distributions for each timepoint in the selected future time period to determine an expected number of timepoints in the selected future time period with a value of the local vertical turbulence characteristic below the predetermined threshold.

The selected future time period may be considered safe or suitable for crop-spraying if the expected number of timepoints with a value of the local vertical turbulence characteristic below the predetermined threshold is less than a certain number, or less than a predetermined proportion of the total number of timepoints in the selected future period. The selected future time period may be considered unsafe or unsuitable for crop-spraying if the expected number of timepoints with a value of the local vertical turbulence characteristic below the predetermined threshold is greater than a certain number, or greater than a predetermined proportion of the total number of timepoints in the selected future period.

For example, the selected future period may be considered unsafe if the expected number of timepoints with a value of the local vertical turbulence characteristic below the predetermined threshold is greater than 1 ten-minute interval in a two hour period, or greater than a predetermined proportion of 8.33%. The threshold number of points or predetermined proportion may be selected based on the level of acceptable risk for a given application or location. For example, the predetermined proportion may be in the range of 1% to 50%, 1% to 40%, 1% to 30%, 1% to 25%, 10% to 25%, 10% to 20%, 10% to 15%, 1% to 20%, 1% to 15%, 1% to 10%, 1% to 5%, 1% to 3%, 3% to 5%, 4% to 4.5%, 5% to 7%, 7% to 9%, 9% to 11%, or about 10%, about 8%, about 5%, about 4%, about 4.2% or about 1/24.

When the expected number of timepoints in the selected future time period with a value of the local vertical turbulence characteristic below the predetermined threshold is greater than a predetermined proportion of the total number of timepoints in the selected future time period, information may be transmitted to the client device indicating that local atmospheric stability conditions at the location of interest are likely to be unsuitable for crop spraying during the selected future time period.

The timepoints may be regularly distributed over the selected future period. For example, the timepoints may be distributed in time-intervals having a duration in the range of 30 seconds to 60 minutes, 1 minute to 30 minutes, 1 minute to 15 minutes, 5 minutes to 15 minutes, 8 minutes to 12 minutes, or about 30 seconds, 1 minute, 5 minutes, 10 minutes, 15 minutes, 20 minutes, 25 minutes, 30 minutes, 35 minutes, 40 minutes, 45 minutes, 50 minutes, 55 minutes 60 minutes, or any other suitable time-interval.

The number of timepoints in the selected future period may be equal (or different) to the number of datapoints for the local vertical turbulence characteristic from the predetermined past period.

The historical baseline for the local vertical turbulence characteristic may provide a baseline estimate of the expected level of vertical turbulence at the location based on the time of day (and optionally the time of year). The statistical characteristics for the predetermined past period may then be combined with the expected baseline for the selected future period to estimate the probability distribution for the local vertical turbulence characteristic at the location over the selected future period.

The historical baseline may provide an estimation of diurnal fluctuations in the local vertical turbulence characteristic at the location of interest. The historical baseline may provide an estimation of annual fluctuations in the local vertical turbulence characteristic at the location of interest.

The historical baseline may be based on stored data indicating the level of vertical turbulence at the location from recent days, from the previous year, or from a number of previous years. The historical baseline may comprise an average of available data from different days to account for variations or gaps in the data. The historical baseline may comprise data from one or more other (nearby) locations, particularly if there is no data available from the location of interest. For example, the historical baseline data may be created by interpolating from datasets from the one or more other locations.

The historical baseline may be determined based on stored baseline data of the local vertical turbulence characteristic from a plurality of previous days at a similar time of day to the time of day of the selected future period.

The plurality of previous days of stored baseline data may immediately precede the day of the selected future time period. This may be necessary when there is no historical data available for an area. There may be a recently installed alert system 100 and data logger 110 at or near the location of interest (e.g., a mobile observation tower), in which case, recent data may be used. For example, the plurality of previous days of stored baseline data may be the immediately preceding number of days limited to the previous 5 days, the previous 10 days, or the previous 15 days.

The stored baseline data may include (or be limited to) datapoints within a certain time-of-day window on one or more of the plurality of previous days. For example, 20 minutes either side of the same (or a similar) time of day to the selected future period (or each timepoint thereof).

In some embodiments, (some or all of) the plurality of previous days of stored baseline data may be from one or more previous years at a similar time of year to the selected future time period. For example, where an alert system 100 or data logger 110 has been recording data for a longer period, or if there is another historical record of meteorological data available for the area, from which local vertical turbulence data can be determined.

The plurality of previous days of stored baseline data from each of the one or more previous years may include days within a time-of-year window, which is similar to the time of year of the selected future period. For example, a rolling average of the available data at a similar time of year to the selected future period. The time-of-year window may have a duration in the range of 1 to 60 days, 1 to 45 days, 2 to 30 days, 5 to 25 days, 10 to 20 days, 12 to 18 days, 13 to 17 days, 14 to 16 days, or about 15 days, for example.

The time-of-year window of each of the one or more previous years may be centred on a date of each corresponding year that is similar to or the same as the time of year of the selected future period. The time of year window may be centred on the same date of each of the one or more previous years as the date of the selected future period.

The stored baseline data for the selected future period may be limited to datapoints within a time-of-day window in each of the plurality of previous days, which is similar to the time of day of the selected future period. In other words, the stored baseline data may be taken from a similar time of day to the time of day of the selected future period.

The time-of-day window may be any suitable duration and may have a duration in the range of 20 minutes to 6 hours, 30 minutes to 3 hours, 30 minutes to 2 hours, 1 hour to 1.5 hours, 20 minutes to 60 minutes, 30 minutes to 50 minutes, 35 minutes to 45 minutes, less than 6 hours, less than 4 hours, less than 2 hours, less than 1.5 hours, less than 1 hour, less than 45 minutes, less than 30 minutes, or about 40 minutes, for example.

The time-of-day window may be centred on a time of day that is similar to or the same as the time of day of the selected future period. For example, the time-of-day window may be centred on a start, end or mid-point of the selected future period. In some embodiments, the time-of-day window is centred on a time of day that is similar to or the same as the time of day of each timepoint of the selected future period. That is, a separate historical baseline may be determined for each timepoint of the selected future period.

The stored baseline data may be determined from observation measurements made at the location of interest. Alternatively, or additionally, the stored baseline data may be determined from observation measurements made away from location of interest. Using interpolation, for example. Alternatively, or additionally, the stored baseline data may be determined from a model, such as a forecasting model, for example.

The historical baseline may be determined as the mean average of the stored baseline data corresponding to the selected future period. Alternatively, a separate historical baseline may be determined for each timepoint of the selected future period as the mean average of the stored baseline data corresponding to each timepoint of the selected future period.

In some embodiments, any one or more of the methods for determining the historical baseline may be combined, for example, in order to increase the available data if there is insufficient data within one of the definitions of stored baseline data.

The predetermined past period immediately precedes the selected future period. For example, the predetermined past period may be the previous two hours from a current time of day, and the selected future period may be the next two hours. This may allow a user to determine whether conditions are suitable for crop spraying at the current time, and whether the conditions will remain suitable for the next two hours, in which time the crop spraying may be carried out.

In some embodiments, the predetermined past period may precede the selected future period by 24 hours. That is, when forecasting conditions for the selected future period, the statistical characteristics from a similar time of day on the previous day may be used to estimate the probability distribution for the vertical turbulence characteristic.

This may allow a user to plan crop spraying options at any time within the next 24 hours relying on the past 24 hours of data.

In some embodiments, the predetermined past period may precede the selected future period by more than 24 hours, for example, up to 48 hours or 72 hours. However, it will be appreciated that the relevance of the statistical characteristics of the predetermined past period may reduce the longer the duration between the predetermined past period and the selected future period. That is, forecasting further into the future usually becomes less accurate the further ahead the forecast is.

In some embodiments, the predetermined past period may be similar or equal in duration to the selected future period.

In some embodiments, other meteorological forecasts may be used to augment the estimated probability distributions, for example, by modifying the historical baseline. Estimating the probability distribution for the local vertical turbulence characteristic at the location of interest over the selected future period may further comprise adding a forecast contribution to the historical baseline. The forecast contribution may be defined as a change in magnitude of the local vertical turbulence characteristic based on a local horizontal windspeed forecast, for example. Alternatively, the forecast contribution may be based on a forecast of temperature, humidity, wind shear, or surface heat flux, for example.

The forecast contribution may be determined by comparing the predictions of a forecast model corresponding to the location of interest and selected future period with a historical baseline of the forecast model for the location of interest. The historical baseline of the forecast model may be calculated in a similar way to the historical baseline of the stored local vertical turbulence characteristic data.

For example, data from the Global Forecast System (GFS) may be used to determine a forecast contribution to combine with the historical baseline and statistical characteristics to determine the probability distribution for the local vertical turbulence characteristic at the location of interest. The GFS 10 m windspeed forecast may be determined for the selected future period at the location of interest (e.g., by interpolating between the grid points nearest the location of interest) and compared with the historical baseline for the GFS 10 m windspeed data (calculated according to any of the methods described herein). Then (for example, for a forecast base time of t hours and a selected future period of 2 hours), the forecast probability distribution of the local vertical turbulence characteristic (e.g., Sigma W, $\sigma_w$) for the selected future period (t+2n) to (t+2n+2) is therefore given by:

$$\tilde{\sigma} = \sigma_{bl} + \widetilde{\Delta\sigma}_{24} + \alpha\{\Delta U_{gfs}(t+2n, t+2n+2) - \Delta U_{gfs}(t+2n-24, t+2n-22)\}$$

where $\Delta U_{gfs}(t_1,t_2)$ is the mean deviation of the 10 m wind speed from the GFS baseline calculated for the period from $t_1$ to $t_2$, n is an integer value from 1 to 11 (for a 24-hour forecast) and $\alpha$ is a factor describing the scaling from 10 m wind speed deviation to Sigma W deviation.

A similar calculation could be done using local forecasting models and historical data in order to account for predicted meteorological changes that could affect the local vertical turbulence level before or during the selected future period.

In some embodiments, determining the forecast contribution may further comprise comparing past forecast model predictions with stored observation data corresponding to the location of interest at a similar time of day (and optionally a similar time of year); and correcting the forecast contribution for any bias in the forecast model relative to the location of interest.

For example, the forecasting contribution based on GFS data (as described above) may be adjusted to account for differences between the GFS data and observed wind speed data at the location of interest. A linear or non-linear regression model may be applied to fit the observed data to the GFS data, and then the predictions from the model may be compared with the observed data to determine a correction adjustment to the forecasting contribution.

For example, nonlinear adjustments for daytime may be calculated using a non-least squares regression algorithm based on the curve $y=0.5(ax+b\sqrt{x})$, with starting values of 0.01 for both coefficients (a and b). The nonlinear adjustments for night time may be based on the curve $y=ax^2+b$, with starting values of 0.01 for both coefficients (a and b). Other regression models may be used to fit a specific time period for a given application.

While the present disclosure describes illustrative embodiments for determining suitable crop-spraying conditions, it should be appreciated that turbulence information provided by the described embodiments could also be used for forecasting, predicting or monitoring the movement or dispersion of any airborne substances based on suitable modelling for a particular airborne substance (e.g. of certain density, particle size, or droplet size).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Some of the computer implemented forecasting methods described herein were tested using historical observation data to make forecast predictions for particular locations of interest (at specific observation towers). The predictions compared with the observation data for selected periods for validation.

Historic weather data was provided from June 2016 to June 2019 at 8 individual stations across the South East of Australia. The table below (Table 1) shows the locations and altitude of the 8 stations.

TABLE 1

| Station Locations | | | |
|---|---|---|---|
| Station | Latitude (°) | Longitude (°) | Altitude (m) |
| 10 | −33.87148 | 138.69104 | 438 |
| 20 | −34.48859 | 140.57339 | 42 |
| 901 | −27.028349 | 151.125302 | 335 |
| 902 | −27.562737 | 151.485384 | 373 |
| 903 | −29.992431 | 149.48733 | 184 |
| 904 | −29.466139 | 149.679011 | 195 |

TABLE 1-continued

Station Locations

| Station | Latitude (°) | Longitude (°) | Altitude (m) |
|---|---|---|---|
| 905 | −28.550278 | 150.280758 | 213 |
| 906 | −30.169933 | 149.247613 | 181 |

The data for each station is summarised at 10-minute intervals and contains the following meteorological parameters:
- temperature at 1.25 m (° C.)
- relative humidity at 1.25 m (%)
- vertical temperature difference. (° C.) between 10 m and 1.25 m and also between 3 m and 1.25 m
- wind speed (m/s) and direction (°) at both 2 m and 10 m
- Sigma-U, Sigma-V, Sigma-W calculated at 2 m and 10 m (m/s)
- u* (the friction velocity, m/s) at 2 m and 10 m
- Sigma-T (the standard deviation of the temperature) at 1.25 m
- stability ratios indicating the calculated stability of the air at a given time based on the temperature gradients, near surface temperature and wind speed 5 at the two heights
- a radiation parameter (W/m$^2$). For stations 901 to 906, this is the solar radiation and for stations 10 and 20, this is the net radiation
- sunrise and sunset times The data is all provided in standard local time with no daylight saving time applied. All parameters have been subject to quality assurance procedures that filter out any gross or immediate errors in the data.

Four methods were tested for predicting whether the next 2 hour window (after a "current" time) would be safe for crop spraying i.e., with a suitable level of vertical turbulence indicated by the standard deviation of vertical windspeed (Sigm W) remaining above the predetermined threshold of 0.2 m/s.

For example, for the purposes of developing and testing an effective algorithm, a 2 hour window was deemed "safe to spray" if there is a maximum of one 10-minute Sigma W measurement that below the predetermined threshold of 0.2 m/s during the 2 hour window; if the number of 10-minute Sigma W measurements below the threshold is greater than one, then the window is classified as "unsafe to spray". One 10-minute Sigma W measurement is allowed for to account for unrepresentative short period fluctuations.

The four nowcasting (short term forecasting) methods that were tested include:
1. Assume the most recent available Sigma W 10-minute measurement persists for the next two hours;
2. Obtain Sigma W from the historical baseline at each timepoint in the window;
3. Assume that the deviation of the most recent available Sigma W 10-minute measurement from the historical baseline persists over the next 2 hours; and
4. (WP4 method) Calculate a probability distribution from the deviation of the measurements from the historical baseline over the previous two hours and apply it to each point within the next two hours.

For each method, the number of forecast measurements that fell below the Sigma W threshold was compared to the number of observed measurements below the threshold for the same 2-hour window. The observed measurements were taken from the third year of the historical data (1 Jun. 2016 to 31 Dec. 2016 and 1 Jan. 2019 to 30 Jun. 2019); these data were not used in the calculation of the historical baseline and therefore represent an independent test of the forecast methods.

In the fourth method, a probability distribution is derived based on the previous 2 hours and then applied to each point of the next two hours to calculate an expected number of measurement points below the threshold. This is carried out as follows. For a specific time, the observed values in the previous two hours are compared to the baseline and the minimum deviation, the 25th percentile of deviation, the median deviation, the 75th percentile of deviation and the maximum deviation are calculated. Note that these deviations are calculated as observed minus baseline so, for instance, the minimum deviation is actually likely to be the largest negative deviation. This produces a set of statistics describing the behaviour relative to the baseline for the previous 2-hour period:

1. Minimum deviation, $\Delta\sigma_a$
2. $25^{th}$ percentile of deviation, $\Delta\sigma_b$
3. $50^{th}$ percentile (i.e., median) of deviation, $\Delta\sigma_c$
4. $75^{th}$ percentile of deviation, $\Delta\sigma_d$
5. Maximum deviation, $\Delta\sigma_e$ Then for each point in the next 2 hours these values are used to calculate a probability distribution for the value of Sigma W at that time. This probability distribution is described by the same set of statistics i.e., $$\sigma_i = \sigma_{bl} + \Delta\sigma_i$$

where i refers to each statistic (minimum, 25th, 50th and 75 m percentiles and maximum), and $\sigma_{bl}$ is the value of the historical baseline Sigma W at that time. It is then assumed that there is a uniform distribution between each of the quartiles such that 50% of the data lies in between the 25th percentile and the 75th percentile and the other 50% is equally split between those percentiles and the minimum and maximum. This produces a probability distribution for the value of Sigma W for each time point in the 2-hour window ahead, which is then compared to the threshold value (0.2 m/s) to produce a probability of being below the threshold for that point. The probability of being below the threshold, $\sigma_w$ is calculated by:

$$\begin{aligned}
&\sigma_{crit} < \sigma_a && \alpha = 0 \\
&\sigma_a \leq \sigma_{crit} < \sigma_b && \alpha = 0.25\left(\frac{\sigma_{crit} - \sigma_a}{\sigma_b - \sigma_a}\right) \\
&\sigma_b \leq \sigma_{crit} < \sigma_c && \alpha = 0.25 + 0.25\left(\frac{\sigma_{crit} - \sigma_b}{\sigma_c - \sigma_b}\right) \\
&\sigma_c \leq \sigma_{crit} < \sigma_d && \alpha = 0.5 + 0.25\left(\frac{\sigma_{crit} - \sigma_c}{\sigma_d - \sigma_c}\right) \\
&\sigma_d \leq \sigma_{crit} < \sigma_e && \alpha = 0.75 + 0.25\left(\frac{\sigma_{crit} + \sigma_d}{\sigma_e - \sigma_d}\right) \\
&\sigma_{crit} \geq \sigma_e && \alpha = 1
\end{aligned}$$

where $\sigma_{crit}$ is the critical value (or predetermined threshold) of 0.2 m/s, and $\sigma_a$, $\sigma_b$, $\sigma_c$, $\sigma_d$, and $\sigma_e$ are, respectively, the minimum, 25th, 50th and 75th percentiles and maximum descriptors for the probability distribution at each timepoint.

Stunning the probabilities for each timepoint over the next 2 hours gives the expected number of measurements below the threshold for the next 2 hours.

For each 2 hour window (for each of the four methods tested), the expected number of times the Sigma W value was below the threshold was compared to the observed number of measurements of Sigma W that were below the threshold in the 2 hour window. Each 2 hour window was then classified as "safe" or "unsafe" for the forecast and observed data respectively, depending on the number of forecast and observed measurements below the threshold. A 2 hour window is classified as unsafe if there are two or more 10-minute Sigma W measurements under the 0.2 m/s threshold in the 2 hour period.

Tables 3 to 6 show the percentage of correct predictions for each method. Method 4 (WP4) is most accurate and shows the best correlation between predicted and observed levels of vertical turbulence. Tables 7 to 14 show the accuracy of method 4 for each station and hour of the day, and FIG. 21 summarises these results.

TABLE 3

Frequency table for Method 1, persistent sigma W

| Forecast | Observed | 10 | 20 | 901 | 902 | 903 | 904 | 905 | 906 |
|---|---|---|---|---|---|---|---|---|---|
| Safe | Safe | 30992 | 28198 | 16289 | 17394 | 16259 | 16349 | 8654 | 13871 |
| Unsafe | Safe | 368 | 424 | 268 | 229 | 270 | 281 | 91 | 220 |
| Safe | Unsafe | 4771 | 5348 | 3359 | 3361 | 3356 | 3593 | 986 | 2616 |
| Unsafe | Unsafe | 10134 | 13355 | 9129 | 6175 | 9165 | 7169 | 1336 | 8931 |
| Total number of points | | 46265 | 47325 | 29045 | 27159 | 29050 | 27392 | 11067 | 25638 |
| Percentage correct | | 89% | 88% | 88% | 87% | 88% | 86% | 90% | 89% |

TABLE 4

Frequency table for Method 2, baseline sigma W

| Forecast | Observed | 10 | 20 | 901 | 902 | 903 | 904 | 905 | 906 |
|---|---|---|---|---|---|---|---|---|---|
| Safe | Safe | 30570 | 25889 | 14217 | 15401 | 15037 | 15875 | 8586 | 13691 |
| Unsafe | Safe | 790 | 2733 | 2340 | 2222 | 1492 | 755 | 159 | 400 |
| Safe | Unsafe | 14278 | 12617 | 3309 | 3241 | 5413 | 7484 | 2163 | 7467 |
| Unsafe | Unsafe | 627 | 6086 | 9179 | 6295 | 7108 | 3278 | 159 | 4080 |
| Total number of points | | 46265 | 47325 | 29045 | 27159 | 29050 | 27392 | 11067 | 25638 |
| Percentage correct | | 67% | 68% | 81% | 80% | 76% | 70% | 79% | 69% |

TABLE 5

Frequency table for Method 3, constant deviation from baseline sigma W

| Forecast | Observed | 10 | 20 | 901 | 902 | 903 | 904 | 905 | 906 |
|---|---|---|---|---|---|---|---|---|---|
| Safe | Safe | 30668 | 27913 | 16094 | 17183 | 16077 | 16160 | 8587 | 13818 |
| Un safe | Safe | 692 | 709 | 463 | 440 | 452 | 470 | 158 | 273 |
| Safe | Unsafe | 3907 | 3856 | 2494 | 2610 | 2399 | 2628 | 782 | 1863 |
| Unsafe | Unsafe | 10998 | 14847 | 9994 | 6926 | 10122 | 8134 | 1540 | 9684 |
| Total number of points | | 46265 | 47325 | 29045 | 27159 | 29050 | 27392 | 11067 | 25638 |
| Percentage correct | | 90% | 90% | 90% | 89% | 90% | 89% | 92% | 92% |

TABLE 6

Frequency table for Method 4, using a probability distribution

| Forecast | Observed | 10 | 20 | 901 | 902 | 903 | 904 | 905 | 906 |
|---|---|---|---|---|---|---|---|---|---|
| Safe | Safe | 29519 | 26666 | 15363 | 16601 | 15082 | 15147 | 8317 | 13105 |
| Unsafe | Safe | 1841 | 1956 | 1194 | 1022 | 1447 | 1483 | 428 | 986 |
| Safe | Unsafe | 895 | 828 | 666 | 624 | 569 | 599 | 277 | 419 |
| Unsafe | Unsafe | 14010 | 17875 | 11822 | 8912 | 11952 | 10163 | 2045 | 11128 |
| Total number of points | | 46265 | 47325 | 29045 | 27159 | 29050 | 27392 | 11067 | 25638 |
| Percentage correct | | 94% | 94% | 94% | 94% | 93% | 92% | 94% | 95% |

TABLE 7

Frequency table by the hour of the day for the Method 4 (using a probability distribution) for station 10

| Forecast | Observed | 0 | 1 | 2 | 3 | 4 | 5 | 6 | 7 | 8 | 9 | 10 |
|---|---|---|---|---|---|---|---|---|---|---|---|---|
| Safe | Safe | 790 | 735 | 712 | 713 | 724 | 713 | 740 | 781 | 1053 | 1457 | 1687 |
| Unsafe | Safe | 99 | 130 | 119 | 77 | 84 | 103 | 90 | 140 | 126 | 63 | 85 |
| Safe | Unsafe | 47 | 54 | 45 | 42 | 35 | 31 | 40 | 49 | 45 | 25 | 14 |
| Unsafe | Unsafe | 990 | 1012 | 1054 | 1093 | 1080 | 1078 | 1061 | 960 | 703 | 381 | 126 |
| % Correct | | 92.4% | 90.5% | 91.5% | 93.8% | 93.8% | 93.0% | 93.3% | 90.2% | 91.1% | 954% | 94.8% |
| Total Number of Points | | 1926 | 1931 | 1930 | 1925 | 1923 | 1925 | 1931 | 1930 | 1927 | 1926 | 1912 |

| 11 | 12 | 13 | 14 | 15 | 16 | 17 | 18 | 19 | 20 | 21 | 22 | 23 |
|---|---|---|---|---|---|---|---|---|---|---|---|---|
| 1883 | 1912 | 1903 | 1902 | 1888 | 1830 | 1408 | 1227 | 1227 | 1091 | 975 | 908 | 851 |
| 21 | 0 | 1 | 3 | 5 | 34 | 67 | 72 | 87 | 101 | 123 | 118 | 93 |
| 4 | 5 | 10 | 2 | 2 | 14 | 53 | 62 | 54 | 58 | 78 | 69 | 57 |
| 19 | 12 | 15 | 22 | 33 | 55 | 174 | 387 | 559 | 678 | 756 | 837 | 925 |
| 98.7% | 99.7% | 99.4% | 99.7% | 99.6% | 97.5% | 93.8% | 93.1% | 92.7% | 91.8% | 89.6% | 90.3% | 92.2% |
| 1927 | 1929 | 1929 | 1929 | 1928 | 1933 | 1930 | 1929 | 1927 | 1928 | 1932 | 1932 | 1926 |

TABLE 8

Frequency table by the hour of the day for the Method 4 (using a probability distribution) for station 20

| Forecast | Observed | 0 | 1 | 2 | 3 | 4 | 5 | 6 | 7 | 8 | 9 | 10 |
|---|---|---|---|---|---|---|---|---|---|---|---|---|
| Safe | Safe | 669 | 621 | 535 | 479 | 479 | 476 | 489 | 608 | 1048 | 1538 | 1834 |
| Unsafe | Safe | 121 | 126 | 141 | 104 | 77 | 77 | 94 | 155 | 164 | 74 | 46 |
| Safe | Unsafe | 33 | 39 | 65 | 47 | 30 | 22 | 23 | 25 | 28 | 22 | 13 |
| Unsafe | Unsafe | 1144 | 1181 | 1233 | 1344 | 1387 | 1399 | 1368 | 1185 | 734 | 340 | 80 |
| % Correct | | 92.2% | 91.6% | 89.6% | 92.4% | 94.6% | 95.0% | 94.1% | 90.9% | 90.3% | 95.1% | 97.0% |
| Total Number of Points | | 1967 | 1967 | 1974 | 1974 | 1973 | 1974 | 1974 | 1973 | 1974 | 1974 | 1973 |

| 11 | 12 | 13 | 14 | 15 | 16 | 17 | 18 | 19 | 20 | 21 | 22 | 23 |
|---|---|---|---|---|---|---|---|---|---|---|---|---|
| 1943 | 1957 | 1959 | 1960 | 1938 | 1850 | 1554 | 1153 | 824 | 708 | 671 | 675 | 698 |
| 2 | 1 | 1 | 0 | 11 | 43 | 53 | 73 | 75 | 109 | 132 | 155 | 122 |
| 13 | 0 | 3 | 2 | 7 | 20 | 52 | 102 | 89 | 48 | 63 | 49 | 33 |
| 16 | 16 | 11 | 12 | 19 | 67 | 311 | 639 | 980 | 1103 | 1102 | 1089 | 1115 |
| 99.2% | 99.9% | 99.8% | 99.9% | 99.1% | 96.8% | 94.7% | 91.1% | 91.7% | 92.0% | 90.1% | 89.6% | 92.1% |
| 1974 | 1974 | 1974 | 1974 | 1975 | 1980 | 1970 | 1967 | 1968 | 1968 | 1968 | 1968 | 1968 |

TABLE 9

Frequency table by the hour of the day for the Method 4 (using a probability distribution) for station 901

| Forecast | Observed | 0 | 1 | 2 | 3 | 4 | 5 | 6 | 7 | 8 | 9 | 10 |
|---|---|---|---|---|---|---|---|---|---|---|---|---|
| Safe | Safe | 366 | 300 | 261 | 186 | 131 | 125 | 138 | 265 | 707 | 1108 | 1204 |
| Unsafe | Safe | 53 | 33 | 32 | 48 | 22 | 25 | 35 | 32 | 12 | 26 | 5 |
| Safe | Unsafe | 36 | 39 | 39 | 42 | 51 | 53 | 56 | 124 | 153 | 28 | 0 |
| Unsafe | Unsafe | 751 | 835 | 880 | 936 | 1008 | 1008 | 983 | 791 | 340 | 48 | 3 |
| % Correct | | 92.6% | 94.0% | 94.1% | 92.6% | 94.0% | 93.6% | 92.5% | 87.1% | 86.4% | 95.5% | 99.6% |
| Total Number of Points | | 1206 | 1207 | 1212 | 1212 | 1212 | 1211 | 1212 | 1212 | 1212 | 1210 | 1212 |

| 11 | 12 | 13 | 14 | 15 | 16 | 17 | 18 | 19 | 20 | 21 | 22 | 23 |
|---|---|---|---|---|---|---|---|---|---|---|---|---|
| 1212 | 1209 | 1197 | 1189 | 1180 | 1082 | 798 | 599 | 483 | 433 | 390 | 388 | 412 |
| 0 | 3 | 7 | 0 | 4 | 27 | 58 | 38 | 41 | 51 | 38 | 42 | 34 |
| 0 | 0 | 0 | 8 | 21 | 33 | 58 | 64 | 76 | 56 | 89 | 96 | 72 |
| 0 | 0 | 8 | 14 | 6 | 70 | 298 | 511 | 610 | 666 | 689 | 679 | 688 |
| 100.0% | 99.8% | 99.4% | 99.3% | 97.9% | 95.0% | 90.4% | 91.6% | 90.3% | 91.1% | 89.5% | 88.5% | 91.2% |
| 1212 | 1212 | 1212 | 1211 | 1211 | 1212 | 1212 | 1212 | 1210 | 1206 | 1206 | 1205 | 1206 |

TABLE 10

Frequency table by the hour of the day for the Method 4 (using a probability distribution) for station 902

| Forecast | Observed | 0 | 1 | 2 | 3 | 4 | 5 | 6 | 7 | 8 | 9 | 10 |
|---|---|---|---|---|---|---|---|---|---|---|---|---|
| Safe | Safe | 458 | 352 | 263 | 175 | 157 | 160 | 196 | 371 | 806 | 1096 | 1134 |
| Unsafe | Safe | 55 | 40 | 33 | 50 | 61 | 61 | 69 | 78 | 68 | 8 | 0 |
| Safe | Unsafe | 46 | 48 | 48 | 42 | 21 | 26 | 23 | 24 | 52 | 15 | 0 |
| Unsafe | Unsafe | 568 | 683 | 788 | 864 | 892 | 882 | 842 | 661 | 208 | 15 | 0 |
| % Correct | | 91.0% | 92.2% | 92.8% | 91.9% | 92.7% | 92.3% | 91.9% | 91.0% | 89.4% | 98.0% | 100.0% |
| Total Number of Points | | 1127 | 1123 | 1132 | 1131 | 1131 | 1129 | 1130 | 1134 | 1134 | 1134 | 1134 |

| 11 | 12 | 13 | 14 | 15 | 16 | 17 | 18 | 19 | 20 | 21 | 22 | 23 |
|---|---|---|---|---|---|---|---|---|---|---|---|---|
| 1130 | 1128 | 1128 | 1130 | 1134 | 1087 | 905 | 728 | 626 | 606 | 622 | 634 | 575 |
| 0 | 0 | 5 | 4 | 0 | 7 | 22 | 38 | 71 | 94 | 96 | 91 | 71 |
| 4 | 1 | 0 | 0 | 0 | 22 | 55 | 56 | 35 | 24 | 19 | 10 | 53 |
| 0 | 5 | 1 | 0 | 0 | 18 | 151 | 309 | 397 | 409 | 396 | 396 | 427 |
| 99.6% | 99.9% | 99.6% | 99.6% | 100.0% | 97.4% | 93.2% | 91.7% | 90.6% | 89.6% | 89.8% | 91.1% | 89.0% |
| 1134 | 1134 | 1134 | 1134 | 1134 | 1134 | 1133 | 1131 | 1129 | 1133 | 1133 | 1131 | 1126 |

TABLE 11

Frequency table by the hour of the day for the Method 4 (using a probability distribution) for station 903

| Forecast | Observed | 0 | 1 | 2 | 3 | 4 | 5 | 6 | 7 | 8 | 9 | 10 |
|---|---|---|---|---|---|---|---|---|---|---|---|---|
| Safe | Safe | 296 | 305 | 336 | 360 | 332 | 299 | 355 | 476 | 727 | 1075 | 1185 |
| Unsafe | Safe | 115 | 118 | 78 | 37 | 82 | 83 | 84 | 77 | 109 | 38 | 11 |
| Safe | Unsafe | 26 | 30 | 24 | 16 | 30 | 48 | 34 | 39 | 12 | 24 | 9 |
| Unsafe | Unsafe | 769 | 785 | 774 | 799 | 768 | 782 | 739 | 620 | 364 | 75 | 7 |
| % Correct | | 88.3% | 87.7% | 91.6% | 95.6% | 90.8% | 89.2% | 90.3% | 90.4% | 90.0% | 94.9% | 98.3% |
| Total Number of Points | | 1206 | 1207 | 1212 | 1212 | 1212 | 1212 | 1212 | 1212 | 1212 | 1212 | 1212 |

| 11 | 12 | 13 | 14 | 15 | 16 | 17 | 18 | 19 | 20 | 21 | 22 | 23 |
|---|---|---|---|---|---|---|---|---|---|---|---|---|
| 1194 | 1199 | 1205 | 1197 | 1187 | 1080 | 799 | 460 | 197 | 172 | 191 | 191 | 264 |
| 3 | 7 | 1 | 0 | 4 | 22 | 42 | 65 | 72 | 68 | 71 | 146 | 114 |
| 8 | 4 | 0 | 6 | 4 | 24 | 38 | 84 | 45 | 10 | 6 | 32 | 16 |
| 7 | 2 | 6 | 9 | 17 | 86 | 333 | 602 | 896 | 956 | 938 | 837 | 812 |
| 91.1% | 99.1% | 99.9% | 99.5% | 99.3% | 96.2% | 93.4% | 87.7% | 90.3% | 93.5% | 93.6% | 85.2% | 89.2% |
| 1212 | 1212 | 1212 | 1212 | 1212 | 1212 | 1212 | 1211 | 1210 | 1206 | 1206 | 1206 | 1206 |

TABLE 12

Frequency table by the hour of the day for the Method 4 (using a probability distribution) for station 904

| Forecast | Observed | 0 | 1 | 2 | 3 | 4 | 5 | 6 | 7 | 8 | 9 | 10 |
|---|---|---|---|---|---|---|---|---|---|---|---|---|
| Safe | Safe | 342 | 420 | 447 | 419 | 425 | 374 | 361 | 464 | 724 | 1025 | 1109 |
| Unsafe | Safe | 151 | 82 | 98 | 117 | 82 | 73 | 63 | 99 | 101 | 32 | 0 |
| Safe | Unsafe | 20 | 11 | 19 | 46 | 34 | 48 | 44 | 22 | 24 | 19 | 18 |
| Unsafe | Unsafe | 627 | 627 | 576 | 558 | 599 | 645 | 672 | 555 | 291 | 64 | 13 |
| % Correct | | 85.0% | 91.8% | 89.7% | 85.7% | 89.8% | 89.4% | 90.6% | 89.4% | 89.0% | 95.5% | 98.4% |
| Total Number of Points | | 1140 | 1140 | 1140 | 1140 | 1140 | 1140 | 1140 | 1140 | 1140 | 1140 | 1140 |

| 11 | 12 | 13 | 14 | 15 | 16 | 17 | 18 | 19 | 20 | 21 | 22 | 23 |
|---|---|---|---|---|---|---|---|---|---|---|---|---|
| 1127 | 1127 | 1125 | 1132 | 1112 | 1006 | 801 | 444 | 233 | 207 | 223 | 229 | 271 |
| 0 | 4 | 10 | 1 | 12 | 26 | 41 | 55 | 64 | 60 | 66 | 100 | 146 |
| 1 | 0 | 4 | 5 | 4 | 24 | 36 | 80 | 30 | 28 | 19 | 43 | 20 |
| 12 | 8 | 0 | 8 | 18 | 90 | 268 | 567 | 817 | 845 | 832 | 768 | 703 |
| 99.9% | 99.6% | 98.8% | 99.5% | 98.6% | 95.6% | 93.3% | 88.2% | 91.8% | 92.3% | 92.5% | 87.5% | 85.4% |
| 1140 | 1139 | 1139 | 1146 | 1146 | 1146 | 1146 | 1146 | 1144 | 1140 | 1140 | 1140 | 1140 |

TABLE 13

Frequency table by the hour of the day for the Method 4 (using a probability distribution) for station 905

| Forecast | Observed | 0 | 1 | 2 | 3 | 4 | 5 | 6 | 7 | 8 | 9 | 10 |
|---|---|---|---|---|---|---|---|---|---|---|---|---|
| Safe | Safe | 321 | 309 | 311 | 309 | 288 | 261 | 259 | 335 | 442 | 462 | 461 |
| Unsafe | Safe | 15 | 28 | 24 | 20 | 33 | 27 | 25 | 26 | 15 | 0 | 0 |
| Safe | Unsafe | 1 | 8 | 12 | 6 | 13 | 28 | 37 | 30 | 0 | 0 | 0 |
| Unsafe | Unsafe | 119 | 111 | 115 | 127 | 128 | 146 | 141 | 70 | 5 | 0 | 0 |
| % Correct | | 96.5% | 92.1% | 92.2% | 94.4% | 90.0% | 88.1% | 86.6% | 87.9% | 96.8% | 100.0% | 100.0% |
| Total Number of Points | | 456 | 456 | 462 | 462 | 462 | 462 | 462 | 461 | 462 | 462 | 461 |
| 11 | 12 | 13 | 14 | 15 | 16 | 17 | 18 | 19 | 20 | 21 | 22 | 23 |
| 462 | 462 | 461 | 461 | 461 | 449 | 431 | 293 | 163 | 157 | 174 | 266 | 319 |
| 0 | 0 | 0 | 0 | 0 | 5 | 6 | 14 | 20 | 21 | 81 | 53 | 15 |
| 0 | 0 | 0 | 0 | 0 | 6 | 10 | 57 | 21 | 9 | 11 | 19 | 9 |
| 0 | 0 | 0 | 0 | 0 | 2 | 13 | 97 | 258 | 275 | 196 | 124 | 118 |
| 100.0% | 100.0% | 100.0% | 100.0% | 100.0% | 97.6% | 96.5% | 84.6% | 91.1% | 93.5% | 80.1% | 84.4% | 94.8% |
| 1134 | 1134 | 1134 | 1134 | 1134 | 1134 | 1133 | 1131 | 1129 | 1133 | 1133 | 1131 | 1126 |

TABLE 14

Frequency table by the hour of the day for the Method 4 (using a probability distribution) for station 906

| Forecast | Observed | 0 | 1 | 2 | 3 | 4 | 5 | 6 | 7 | 8 | 9 | 10 |
|---|---|---|---|---|---|---|---|---|---|---|---|---|
| Safe | Safe | 230 | 288 | 338 | 337 | 306 | 289 | 293 | 374 | 578 | 919 | 1051 |
| Unsafe | Safe | 97 | 89 | 66 | 37 | 21 | 21 | 50 | 82 | 134 | 73 | 4 |
| Safe | Unsafe | 8 | 8 | 11 | 21 | 25 | 20 | 10 | 11 | 0 | 10 | 7 |
| Unsafe | Unsafe | 726 | 677 | 653 | 673 | 715 | 737 | 715 | 601 | 356 | 66 | 6 |
| % Correct | | 90.1% | 90.9% | 92.8% | 94.6% | 95.7% | 96.2% | 94.4% | 91.3% | 87.5% | 92.2% | 99.0% |
| Total Number of Points | | 1061 | 1062 | 1068 | 1068 | 1067 | 1067 | 1068 | 1068 | 1068 | 1068 | 1068 |
| 11 | 12 | 13 | 14 | 15 | 16 | 17 | 18 | 19 | 20 | 21 | 22 | 23 |
| 1059 | 1066 | 1068 | 1064 | 1047 | 965 | 708 | 380 | 162 | 125 | 132 | 153 | 173 |
| 6 | 2 | 0 | 4 | 7 | 7 | 21 | 26 | 35 | 26 | 38 | 48 | 92 |
| 2 | 0 | 0 | 0 | 9 | 28 | 48 | 113 | 44 | 20 | 4 | 7 | 13 |
| 1 | 0 | 0 | 0 | 10 | 74 | 296 | 553 | 830 | 896 | 894 | 860 | 789 |
| 99.3% | 99.8% | 100.0% | 99.6% | 98.5% | 96.7% | 93.6% | 87.0% | 92.6% | 95.7% | 96.1% | 94.9% | 90.2% |
| 1068 | 1068 | 1068 | 1068 | 1073 | 1074 | 1073 | 1072 | 1071 | 1067 | 1068 | 1068 | 1067 |

Modification of Predetermined Portion of Timepoints Below Threshold

In the nowcasting algorithm (short term forecasting method) WP4, a 2 hour period is classified as "unsafe" if Sigma W is less than the predetermined threshold (0.2 m/s) for more than N out of the 12 10-minute intervals within it. In method WP4, this number was set as N=1 for both nowcasts (forecasts) and observations.

In a further modification of the forecasting method, for the purposes of validation testing, N=1 was maintained for observations, but varied between N=1, N=0.75 and N=0.5 for the purposes of forecasting to examine the effect on forecast accuracy at both fixed and mobile observation towers.

Note: the number of 10-minute measurements above or below a threshold is an integer value, but due to the use of a distribution function in the calculation of the nowcast (forecast), the expected number of predicted 10-minute values above or below the threshold is a continuous number.

The comparison of the method using different N values is shown in tables 15 and 16 below. The results demonstrate that reducing the safe/unsafe threshold from N=1.0 to N=0.5 in the WP4 algorithm increased the accuracy of "unsafe" nowcasts (predictions) so that the percentage of "unsafe" periods correctly predicted increased from 85.7% to 88% for the fixed towers and from 81.4% to 84.3% for the mobile observation towers.

The proportion of forecasts where "safe" conditions were predicted but "unsafe" conditions were subsequently measured reduced from 5.5% to 4.6% for the fixed towers and from 5.0% to 4.2% for the mobile towers.

As expected, the change also resulted in a small reduction in overall nowcast (forecast) accuracy from 88.8% to 88.6% for the fixed towers and from 89.8% to 89.2% for the mobile towers.

Table 15: Frequency table over all fixed towers, comparing the nowcast results with measured data using 3 different values (1, 0.75 and 0.5) for the highest number of predicted 10-minute Sigma W values that can fall below 0.2 m/s in a 2-hour window for a window to be declared 'safe'. In all 3 tests, only 1 measurement may fall below 0.2 m/s in order for an observed 2-hour period to be declared 'safe'.

| Nowcast | Observed | N = 1.0 | N = 0.75 | N = 0.5 |
|---|---|---|---|---|
| Insufficient Data Coverage | Safe | 67 | 67 | 67 |
| Insufficient Date Coverage | Unsafe | 43 | 43 | 43 |
| Safe | Safe | 140135 | 138924 | 137368 |
| Safe | Unsafe | 13971 | 12812 | 11664 |
| Unsafe | Safe | 14182 | 15393 | 16949 |
| Unsafe | Unsafe | 83692 | 84851 | 85999 |
| % of nowcasts that were correct | | 88.8% | 88.8% | 88.6% |
| % of nowcasts that were predicted "safe" but observed "unsafe" | | 5.5% | 5.1% | 4.6% |
| % of observed "unsafe" periods where nowcast was correct | | 85.7% | 86.8% | 88.0% |

Table 16: Frequency table over all mobile towers, comparing the nowcast results with measured data using 3 different values (1, 0.75 and 0.5) for the highest number of predicted 10-minute Sigma W values that can fall below 0.2 m/s in a 2-hour window for a window to be declared 'safe'. In all 3 tests, only 1 measurement may fall below 0.2 m/s in order for an observed 2-hour period to be declared 'safe'.

| Nowcast | Observed | N = 1.0 | N = 0.75 | N = 0.5 |
|---|---|---|---|---|
| Insufficient Data Coverage | Safe | 96 | 96 | 96 |
| Insufficient Date Coverage | Unsafe | 18 | 18 | 18 |
| Safe | Safe | 25601 | 25384 | 25080 |
| Safe | Unsafe | 1885 | 1739 | 1588 |
| Unsafe | Safe | 1966 | 2183 | 2487 |
| Unsafe | Unsafe | 8355 | 8501 | 8652 |
| % of nowcasts that were correct | | 89.8% | 89.6% | 89.2% |
| % of nowcasts that were predicted "safe" but observed "unsafe" | | 5.0% | 4.6% | 4.2% |
| % of observed "unsafe" periods where nowcast was correct | | 81.4% | 82.9% | 84.3% |

Baseline Determination for New Observation Towers

A 8 mobile towers were installed on farms in the vicinity of two of the fixed rowers. #901 and #902. Compared with the fixed towers, the new mobile towers have only a short period of measurements available and therefore a different approach to calculating a baseline (or historical baseline) is required.

Three baseline methodologies have been tested and compared: •"Method 1" calculates a combined 15-day rolling average baseline from the nearby fixed towers 901 and 902: "Method 2" calculates a baseline at each mobile tower using a rolling average over the measurements 20 minutes either side of a specific time for the previous 10 days of data: and "Method 3" combines Methods 1 and 2 by taking the Method 2 baseline and filling in any missing data with the Method 1 baseline.

Each of the three methods has been tested on its ability (or accuracy), when incorporated into the nowcasting algorithm (WP4), to correctly identify whether the next 2 hours are "safe to spray", for any given date and time, in comparison with measured data.

The results show that all baseline methods had a similar overall accuracy, but the methodology that gives the most accurate nowcast is Method 3 (89.5%), followed by Method 1 (87.4%) and Method 2 (83.8%).

Methods 1 and 3 had the highest nowcast coverage (99.7%). Methods 2 and 3 had the lowest percentage of incorrect "safe" nowcasts (4.96% and 4.99% respectively).

Method 3 had the highest percentage of observed unsafe periods where the nowcast was available and correct (81.4%). As expected, the most challenging times of day to accurately nowcast are around dawn and dusk, when the temporal gradients in Sigma W are greatest and, therefore, the uncertainty in the calculated Sigma W baseline is highest.

However, even in these periods, the nowcast accuracy at most of the mobile towers remained above 70% for Baseline Methods 2 and 3.

Baseline Method 3 combines relatively high overall nowcast accuracy with high nowcast coverage: it also gives a low risk that the nowcast for 2 hours ahead will be "safe" when the observations were "unsafe" and the highest chance that an observed "•unsafe" period will be correctly nowcast.

Near real time weather data was provided from 8 mobile meteorological observation towers across Eastern Australia from the 18 Nov. 2019, when they were installed. They were distributed over a 130 km stretch (as the crow flies) surrounding two fixed meteorological towers (901, 902). The table below (Table 17) shows the locations and altitude of the 8 stations.

TABLE 17

Mobile station locations

| Tower | Latitude (°) | Longitude (°) |
|---|---|---|
| 1 | −26.9503 | 151.0205 |
| 2 | −27.7397 | 151.4078 |
| 3 | −27.8956 | 151.4563 |
| 4 | −26.8106 | 151.0101 |
| 5 | −27.5644 | 151.4315 |
| 6 | −27.3978 | 151.1901 |
| 7 | −27.2234 | 151.1239 |
| 8 | −27.2765 | 151.2277 |

The data for each mobile tower are summarised at approximately 10-minute intervals and contains 24 meteorological parameters including:
temperature at 1.25 m (° C.)
relative humidity at 1.25 m (%)
vertical temperature difference (° C.} between 10 m and 1.25 m and also between 3 m and 1.25 m
wind speed (m/s) and wind direction (°) at 2 m and 10 m
Sigma-W calculated at 2 m and 10 m (m/s)
stability ratios indicating the calculated stability of the air at a given time based on the temperature gradients, near surface temperature and wind speeds at the two heights
solar radiation parameter (W/m2)

The data are all provided with date and time in UTC with no daylight-saving time applied.

The three baseline methods tested in the nowcasting system and validated against measured data are:
1) Combining the 15-day rolling average historical baselines generated at the fixed towers 901 and 902.
2) Calculating a baseline at each mobile tower using a rolling average over the measurements 20 minutes either side of a specific time for the previous 10 days of data.
3) Combining methods 1 and 2 to generate a baseline that is specific to each tower.

For the first method, the average is calculated using the measurements from both fixed stations (901 and 902) and applies the following baseline methodology. This method averages measurements at the same time each day within the 15-day averaging window and those within 20 minutes either side of the given time. The averaging window is aligned such that it incorporates the data 7 days previous and 7 days ahead of that specific time. The averages are calculated where 75% of the data for that window is present and valid. These averages are calculated using 2 of the 3 years (1 Jan. 2017 to 31 Dec. 2018) of historical weather data provided for the fixed stations to form a mean yearly baseline profile. This baseline method produced an identical baseline for all mobile towers.

For the second method, the average is calculated using the measurements from each mobile tower at the same time of day over the previous 10 days and those within 20 minutes either side of the given time of day. The averages are calculated where 75% of the data for that window is present and valid, and as a result there is insufficient data to calculate the baseline for the first 8 days the towers were installed.

This method uses the data for each individual tower, which is more representative of the variations at each tower, but there are a reduced number of measurements available in an averaging window, leading to some missing baseline values.

To combine the two methods and appropriately rectify any missing data, the third method filled any missing time phases in the 10-day baseline with the respective baseline values from the 15-day rolling average baseline, calculated from the fixed towers. This generates a site-specific baseline with fewer windows missing.

All of the baseline methods were compared with the raw observed values for each mobile tower. The observed data are available from the 18 Nov. 2019 (when the mobile towers were installed at their specified locations) to 31" Dec. 2019. This period has been used to compare the baseline methods 1, 2 and 3.

Method 2 needs 75% of the data over the previous 10 clays at a given time of day and those within 20 minutes either side of the given time to be present in order to calculate a baseline. There is insufficient data, therefore, to calculate a baseline before 7-8 days of data have been collected; this is longer for Tower 3 due to connection problems at the end of November.

Any missing data for this method is aptly filled by substituting the values from Baseline Method 1.

For 7 out of 8 mobile towers the three baseline methods show a clear daily pattern and smooth out any larger fluctuations to lie between 0.2 m/s and 0.5 m/s.

Tower 8 exhibited higher values in the observed data during December and hence, Baseline Method 2 has higher baseline values for this tower than Baseline Method 1.

Baseline Method 1 uses more individual data points to calculate a baseline and can effectively smooth any higher observed values. Baseline Methods 2 and 3 are site-specific and are more reflective of local turbulence.

For each Sigma W baseline for each 2-hour window, the number of nowcast measurements that fell below the Sigma W threshold was compared to the number of observed measurements below the threshold for the same 2-hour window. The mobile tower measurements were taken from the 18 Nov. 2019 to 31 Dec. 2019. These data were used in the calculation of the 10-day rolling baseline and therefore only the 15-day rolling baseline values represent an independent test of the algorithms.

For direct comparability, the comparison between the three methods and observations covers only the period after the 10-day rolling baseline became available (26 Nov. 2019).

The number of nowcast and observed measurements that fell below the threshold in each 2-hour window were only calculated for windows that have 75% data that is present and valid.

For each 2-hour window the window was then classified as "safe" or "unsafe" for the nowcast and observed data respectively, depending on the number of nowcast and observed measurements that fell below the threshold. A 2-hour window is classified as "unsafe" if there are 2 or more 10-minute Sigma W measurements under the 0.2 m/s threshold in the 2-hour period.

Table 18 to Table 20 show the percentage of measurements where each nowcast method either correctly or incorrectly predicted the 2-hours ahead of that measurement to be "safe" or "unsafe", for each mobile tower. The percentage correct is calculated over the available nowcasts.

Data points labelled as "insufficient data coverage" contain more than 3 missing observed or baseline measurements in a 2-hour window. There were a greater number of measurements missing for the baseline in Baseline Method 2 and therefore a lower number of 2-hour windows for which nowcasts could be generated.

Table 21 shows the percentage of nowcasts where the observed conditions were "unsafe", but the nowcast incorrectly predicted the 2-hours ahead of that measurement to be "safe". Reducing the number of predictions that that fall in this category would reduce the likelihood of encouraging spraying when the conditions are not suitable to do so.

Baseline Method 3 has the lowest percentage values here; however, for the majority of the mobile towers, there is a negligible difference between Baseline Method 2 and Baseline Method 3.

Table 22 provides summary statistics over all 8 mobile towers for each baseline method.

TABLE 18

Frequency table for Baseline Method 1, 15-day rolling baseline calculated using measurements from fixed stations 901 and 902

| Nowcast | Observed | Tower 1 | Tower 2 | Tower 3 | Tower 4 | Tower 5 | Tower 6 | Tower 7 | Tower 8 |
| --- | --- | --- | --- | --- | --- | --- | --- | --- | --- |
| Insufficient Data Coverage | Insufficient Data Coverage | 142 | 152 | 1950 | 541 | 178 | 210 | 95 | 283 |
| Insufficient Date Coverage | Safe | 17 | 11 | 3 | 16 | 11 | 8 | 13 | 17 |
| Insufficient Date Coverage | Unsafe | 0 | 3 | 3 | 3 | 0 | 6 | 0 | 3 |
| Safe | Safe | 3234 | 3690 | 2252 | 2960 | 3241 | 3356 | 3178 | 3473 |
| Safe | Unsafe | 304 | 345 | 204 | 324 | 290 | 311 | 329 | 367 |
| Unsafe | Safe | 304 | 241 | 162 | 310 | 321 | 252 | 335 | 258 |
| Unsafe | Unsafe | 1183 | 742 | 610 | 1030 | 1143 | 1041 | 1234 | 783 |

TABLE 18-continued

Frequency table for Baseline Method 1, 15-day rolling baseline calculated using measurements from fixed stations 901 and 902

| Nowcast | Observed | Tower 1 | Tower 2 | Tower 3 | Tower 4 | Tower 5 | Tower 6 | Tower 7 | Tower 8 |
|---|---|---|---|---|---|---|---|---|---|
| % of valid observed periods where nowcast is available | | 99.7% | 99.7% | 99.8% | 99.6% | 99.8% | 99.7% | 99.7% | 99.6% |
| % of valid observed periods where nowcast is correct | | 87.6% | 88.1% | 88.5% | 85.9% | 87.6% | 88.4% | 86.7% | 86.8% |
| % of nowcasts that are correct | | 87.9% | 88.3% | 88.7% | 86.3% | 87.8% | 88.6% | 86.9% | 87.2% |
| % of observed "unsafe" periods where nowcast was correct | | 79.6% | 68.1% | 74.7% | 75.9% | 79.8% | 76.7% | 79.0% | 67.9% |

TABLE 19

Frequency table for Baseline Method 2, 10-day rolling baseline calculated using measurements from each mobile tower

| Nowcast | Observed | Tower 1 | Tower 2 | Tower 3 | Tower 4 | Tower 5 | Tower 6 | Tower 7 | Tower 8 |
|---|---|---|---|---|---|---|---|---|---|
| Insufficient Data Coverage | Insufficient Data Coverage | 142 | 152 | 1950 | 541 | 178 | 210 | 95 | 283 |
| Insufficient Date Coverage | Safe | 51 | 39 | 1068 | 378 | 153 | 37 | 40 | 267 |
| Insufficient Date Coverage | Unsafe | 0 | 3 | 303 | 57 | 11 | 6 | 0 | 16 |
| Safe | Safe | 3097 | 3667 | 1268 | 2658 | 3147 | 3384 | 3187 | 3283 |
| Safe | Unsafe | 276 | 213 | 100 | 207 | 241 | 231 | 244 | 245 |
| Unsafe | Safe | 307 | 236 | 81 | 250 | 273 | 195 | 299 | 198 |
| Unsafe | Unsafe | 1211 | 874 | 414 | 1093 | 1181 | 1121 | 1319 | 892 |
| % of valid observed periods where nowcast is available | | 97.0% | 99.2% | 57.6% | 90.6% | 96.7% | 99.1% | 99.2% | 94.2% |
| % of valid observed periods where nowcast is correct | | 85.4% | 90.2% | 52.0% | 80.8% | 96.5% | 90.6% | 88.5% | 85.2% |
| % of nowcasts that are correct | | 88.1% | 91.0% | 90.3% | 89.1% | 89.4% | 91.4% | 89.2% | 90.4% |
| % of observed "unsafe" periods where nowcast was correct | | 81.4% | 80.2% | 50.7% | 80.5% | 82.4% | 82.5% | 84.4% | 77.4% |

TABLE 20

Frequency table for Baseline Method 3, substituting missing values for the 10-day rolling baseline with values from the 15-day rolling baseline

| Nowcast | Observed | Tower 1 | Tower 2 | Tower 3 | Tower 4 | Tower 5 | Tower 6 | Tower 7 | Tower 8 |
|---|---|---|---|---|---|---|---|---|---|
| Insufficient Data Coverage | Insufficient Data Coverage | 142 | 152 | 1950 | 541 | 178 | 210 | 95 | 283 |
| Insufficient Date Coverage | Safe | 17 | 11 | 3 | 16 | 11 | 8 | 13 | 17 |
| Insufficient Date Coverage | Unsafe | 0 | 3 | 3 | 3 | 0 | 6 | 0 | 3 |
| Safe | Safe | 3233 | 3695 | 2260 | 2982 | 3281 | 3415 | 3202 | 3533 |
| Safe | Unsafe | 276 | 213 | 174 | 230 | 251 | 232 | 245 | 264 |
| Unsafe | Safe | 305 | 236 | 154 | 288 | 281 | 193 | 311 | 198 |
| Unsafe | Unsafe | 1211 | 874 | 640 | 1124 | 1182 | 1120 | 1318 | 886 |
| % of valid observed periods where nowcast is available | | 99.7% | 99.7% | 99.8% | 99.6% | 99.8% | 99.7% | 99.7% | 99.6% |
| % of valid observed periods where nowcast is correct | | 88.1% | 90.8% | 89.7% | 88.4% | 89.2% | 91.2% | 88.8% | 90.2% |
| % of nowcasts that are correct | | 88.4% | 91.1% | 89.8% | 88.8% | 89.3% | 91.4% | 89.0% | 90.5% |
| % of observed "unsafe" periods where nowcast was correct | | 81.4% | 80.2% | 78.3% | 82.8% | 82.5% | 82.5% | 84.3% | 76.8% |

TABLE 21

Percentage of nowcasts that were predicted "safe" but observed "unsafe" for each Baseline Method

| Method | Tower 1 | Tower 2 | Tower 3 | Tower 4 | Tower 4 | Tower 6 | Tower 7 | Tower 8 |
|---|---|---|---|---|---|---|---|---|
| Method 1 | 6.05% | 6.88% | 6.32% | 7.01% | 5.81% | 6.27% | 6.48% | 7.52% |
| Method 2 | 5.64% | 4.27% | 5.37% | 4.92% | 4.98% | 4.68% | 4.83% | 5.31% |
| Method 3 | 5.49% | 4.24% | 5.39% | 4.97% | 5.03% | 4.68% | 4.83% | 5.41% |

TABLE 22

Summary statistics over all mobile towers

| | Method 1 | Method 2 | Method 3 |
|---|---|---|---|
| % of valid observed periods where nowcast is available | 99.7% | 93.3% | 99.7% |
| % of valid observed periods where nowcast is correct | 87.4% | 93.8% | 89.5% |
| % of nowcasts that are correct | 87.7% | 89.8% | 89.8% |
| % of observed unsafe periods where nowcast is correct | 75.7% | 79.0% | 81.4% |
| % of "safe" nowcasts that were observed to be "unsafe" | 6.54% | 4.96% | 4.99% |

Comparing Results by Hour of the Day at Each Mobile Tower

The graphs in FIG. 22 summarise the percentage accuracy results for each tower by hour of the day for each baseline method.

There is a greater level of uncertainty for Baseline Method 1 with the percentage of nowcasts that were correct falling as low as 60% for Tower 7 at 17:00.

Baseline Method 2 is marginally better than Baseline Method 3, with the majority of the mobile towers maintaining the lowest uncertainty and a minimum accuracy record of 70%, even during the more challenging hours at dawn and dusk where there are the greatest temporal gradients.

The results show that all baseline methods have a similar overall accuracy, but the methodology that gives the most accurate nowcast for these data sets is Method 3 (89.5%), followed by Method 1 (87.4%) and Method 2 (83.8%). Methods 1 and 3 had the highest nowcast coverage (99.7%). Methods 2 and 3 had the lowest percentage of incorrect "safe" nowcasts (4.96% and 4.99%, respectively). Method 3 had the highest percentage of observed unsafe periods where the nowcast was available and correct (81.4%).

As expected, the most challenging time of day to accurately nowcast is around dawn and dusk, when temporal gradients in Sigma W are greatest and, therefore, the uncertainty in the calculated Sigma W baseline is highest. However, even in these periods, the nowcast accuracy at most mobile towers remained above 70% for Baseline Methods 2 and 3.

Using GFS Data to Determine Forecast Contribution and Bias Correction

As discussed above, a forecasting model may be used to determine a forecast contribution to the probability distribution.

GFS provides a free source of global weather forecast data and may therefore be useful in any algorithm developed to provide a nowcast of Sigma W at the measurement sites. The raw GFS forecast data is provided in 3-hour timesteps with 0.5-degree spatial resolution. To test the accuracy of GFS data, historical GFS data was obtained for a 7-day period during May 2018. The gridded GFS forecasts of wind speed and direction at 10 m were linearly interpolated to the 8 measurement site locations. The 10-minute measured data from each station was averaged over a three-hour period for direct comparison with the GFS data. The 3 hour averaged observation data from each station showed good agreement with the corresponding GFS data interpolated to the station locations. Therefore, the GFS data is suitable for determining a forecast contribution to augment the estimated probability distributions.

To test the forecast methodology incorporating a forecast contribution, historical GFS data were obtained for the period from 10 Oct. 2018 to 31 Dec. 2019. The gridded GFS forecasts of wind speed and direction at 10 m were linearly interpolated to the measurement site locations.

In nowcasting (forecasting) method WP4, a probability distribution is derived based on the previous 2 hours of measured data and then applied to each point of the next two hours to calculate an expected number of measurement points below the Sigma W threshold. The nowcast Sigma W at a time, t, for the next two hours is:

$$\tilde{\sigma} = \sigma_{bl} + \tilde{\Delta\sigma}$$

where $\tilde{\Delta\sigma}$ is the distribution of deviations of observed Sigma W over the previous 2 hours.

The forecasting algorithm is similar to the nowcasting methodology with two main differences: firstly, for a given 2-hour forecast 'window', the $\tilde{\Delta\sigma}$ term is modified to use the distribution of deviations from the baseline over the 2 hours that occur 24 hours previous to the forecast window ($\tilde{\Delta\sigma}_{24}$), in order to account for diurnal effects; secondly, to correct for changing conditions in the near future an additional correction term is applied based on the GFS 10 m wind speed forecast and how this varies compared to the GFS 10 m wind speed baseline. For a forecast base time of t hours, the forecast distribution of Sigma W for the period (t+2n) to (t+2n+2) is therefore given by:

$$\tilde{\sigma} = \sigma_{bl} + \tilde{\Delta\sigma}_{24} + \alpha\{\Delta U_{gfs}(t+2n, t+2n+2) - \Delta U_{gfs}(t+2n-24, t+2n-22)\}$$

where $\Delta U_{gfs}(t_1,t_2)$ is the mean deviation of the 10 m wind speed from the GFS baseline calculated for the period from $t_1$ to $t_2$, n is an integer value from 1 to 11 (for a 24-hour forecast) and $\alpha$ is a factor describing the scaling from 10 m wind speed deviation to Sigma W deviation.

The GFS 10 m wind speed baseline has been calculated for stations 901 and 902 by averaging GFS 10 m wind speed values at the same time each day within the 15-day averaging window. The averaging window is aligned such that it incorporates the data 7 days previous and 7 days ahead of that specific time. The averages are calculated where 75% of the data for that window is present and valid. These averages are calculated using all the available data (10 Oct. 2018 to 31 Dec. 2019) of archived forecast GFS data for the fixed stations 901 and 902 to form a mean yearly baseline profile.

In the measured data, deviations from the Sigma W baseline and deviations from the wind speed baseline were well correlated (R2=0.5 for 901 and R2=0.6 for 902). It is sufficient therefore to assume that the deviations from the wind speed baseline and Sigma W baseline are similarly well correlated in the GFS data, since GFS provides wind speed but not Sigma W. The correlations between the observed and GFS wind speeds further justify this assumption. The factor $\alpha$ in the equation can therefore be calculated from regression slopes found: i.e. a=0.045 for 901 and a=0.049 for 902.

Initially, it is implicitly assumed that the GFS 10 m wind speed forecast is 100% accurate compared with measurements; this is refined further to make adjustments for any differences. The 3-hourly GFS data and baseline were temporally interpolated, using a weighted average, to approximate the 10-minute resolution of the observed data.

Adjustments to Account for GFS Bias

Adjustments were then made to the forecasting algorithm to account for differences between the GFS and observed wind speed data. A linear and nonlinear regression model were applied to fit the observed data to the GFS data and then the predictions from each model were compared to the observed data.

The data used in these calculations goes from 1" Jan. 2019 to 29 Feb. 2020. The data are separated by station, and by day and night, with the distinction between day and night made using the sunset and sunrise times for the latitude and longitude at each fixed station.

The nonlinear adjustments for the daytime were calculated using a non-least squares regression algorithm based on the curve $y=0.5(ax+b\sqrt{x})$, with starting values of 0.01 for both coefficients (a and b). The nonlinear adjustments for night time are based on the curve $y=ax^2+b$, with starting values of 0.01 for both coefficients (a and b). These equations were chosen because they demonstrated the best fit for a nonlinear model for the specific time period.

Table 23 shows the correlation coefficients between the observed wind speed and the predicted wind speeds generated by applying the linear and nonlinear expressions to the GFS forecast data for each station, for day and night.

TABLE 23

The correlation coefficients between the observed values and the predicted wind speed values using linear and nonlinear models for each station for each period.

|  | Linear | Nonlinear |
|---|---|---|
| 901 Day | 0.767 | 0.760 |
| 902 Day | 0.787 | 0.780 |
| 901 Night | 0.498 | 0.506 |
| 902 Night | 0.616 | 0.641 |

Table 24 shows the scale factors a and b that are used to fit each regression model. There is a greater variation in the distribution of the wind speeds at night, and it is harder therefore to accurately predict the wind speeds at night using either model.

TABLE 24

The coefficients for the linear and nonlinear regression models for each station for each period. The coefficients used in the adjustments in the forecast are underlined. Note, the nonlinear models use a different expression for day and night.

|  | Linear Coefficient a | Linear Coefficient b | Linear Coefficient a | Linear Coefficient b |
|---|---|---|---|---|
| 901 Day | 0.674 | <u>1.255</u> | 0.868 | 2.243 |
| 902 Day | <u>0.731</u> | <u>1.436</u> | 0.934 | 2.518 |
| 901 Night | <u>0.425</u> | <u>1.642</u> | <u>0.041</u> | <u>2.562</u> |
| 902 Night | 0.537 | 1.214 | <u>0.053</u> | <u>2.344</u> |

During the day the predicted values from each model had a correlation coefficient of at least 0.75 with the observed values, whereas during the night the correlation coefficients averaged 0.50 for station 901 and 0.63 for 902.

The correlations are higher for the day time using the linear expressions and higher for nonlinear in the night time and thus, a combination of the linear adjustments for the daytime and nonlinear adjustments for night time are used to correct the bias in the forecast algorithm.

For a forecast base time of t hours, the forecast distribution of Sigma W for the period (t+2n) to (t+2n+2), including the GFS bias correction is therefore given by:

$$\sigma = \sigma_{bl} + (\bar{\Delta}\sigma_{24}) + \\ \alpha\{\Delta U_{gfs_{adj}}(t+2n, t+2n+2) - \Delta U_{gfs_{adj}}(t+2n-24, t+2n-22)\}$$

where n is an integer value from 1 to 11 (for a 24 hour forecast) and $\alpha$ is a factor describing the scaling from 10 m wind speed deviation to Sigma W deviation. $\Delta U_{gfs,adj}(t_1,t_2)$ is the mean deviation of the 10 m adjusted wind speed from the GFS baseline calculated for the period from $t_1$ to $t_2$.

The adjustments are applied to the raw GFS data before the deviations are calculated and the adjusted GFS wind speed is given by:

$$U_{gfs_{adj}}(\text{day})=aU_{gfs}(\text{day})+b$$

for the daytime, and $$U_{gfs_{adj}}(\text{night})=aU_{gfs}(\text{night})^2+b$$

for night time, where a and b are the station specific coefficient underlined in Table 24.

Table 25 shows the percentage of correct forecasts for each 2-hour window from the current time to 24 hours ahead, with and without GFS bias correction. The accuracy calculated over all the windows remains above 83% for both stations and is fractionally (<0.1%) affected by including the GFS bias correction.

TABLE 25

Percentage correct forecasts for each 2-hour window ahead of current time

| Number of hours ahead | 901 Without GFS bias correction | 901 With GFS bias correction | 902 Without GFS bias correction | 902 With GFS bias correction |
|---|---|---|---|---|
| 0-2 | 89.0% | 89.0% | 90.03% | 90.3% |
| 2-4 | 83.4% | 83.5% | 84.9% | 85.1% |
| 4-6 | 83.4% | 83.5% | 84.9% | 85.1% |
| 6-8 | 83.4% | 83.5% | 84.9% | 85.1% |
| 8-10 | 83.4% | 83.5% | 84.9% | 85.1% |
| 10-12 | 83.4% | 83.5% | 84.9% | 85.1% |

TABLE 25-continued

Percentage correct forecasts for each
2-hour window ahead of current time

| Number of hours ahead | 901 Without GFS bias correction | 901 With GFS bias correction | 902 Without GFS bias correction | 902 With GFS bias correction |
|---|---|---|---|---|
| 12-14 | 83.4% | 83.5% | 84.9% | 85.1% |
| 14-16 | 83.4% | 83.5% | 84.9% | 85.1% |
| 16-18 | 83.4% | 83.5% | 84.9% | 85.1% |
| 18-20 | 83.4% | 83.5% | 84.9% | 85.1% |
| 20-22 | 83.4% | 83.5% | 84.9% | 85.1% |
| 22-24 | 83.4% | 83.5% | 84.9% | 85.1% |
| Overall | 83.9% | 83.9% | 85.4% | 85.5% |

Table 26 shows the percentage of measured unsafe periods that were correctly forecast for each two hour window from the current time to 24 hours ahead. The percentage accuracy of unsafe periods that were correctly forecast is over 84% for both stations, and displays an increase by approximately 1% with the GFS bias correction.

TABLE 26

Percentage of unsafe periods forecast correctly
for each 2-hour window ahead of the current time

| Number of hours ahead | 901 Without GFS bias correction | 901 With GFS bias correction | 902 Without GFS bias correction | 902 With GFS bias correction |
|---|---|---|---|---|
| 0-2 | 90.1% | 90.1% | 89.8% | 89.8% |
| 2-4 | 84.9% | 85.9% | 83.7% | 84.8% |
| 4-6 | 84.9% | 85.9% | 83.7% | 84.9% |
| 6-8 | 85.0% | 86.0% | 83.8% | 84.9% |
| 8-10 | 85.0% | 86.0% | 83.8% | 84.9% |
| 10-12 | 85.1% | 86.1% | 83.9% | 85.0% |
| 12-14 | 85.1% | 86.1% | 83.9% | 85.0% |
| 14-16 | 85.1% | 86.1% | 83.9% | 85.0% |
| 16-18 | 85.1% | 86.1% | 83.9% | 85.0% |
| 18-20 | 85.1% | 86.1% | 83.9% | 85.0% |
| 20-22 | 85.1% | 86.1% | 83.9% | 85.0% |
| 22-24 | 85.1% | 86.1% | 83.9% | 85.0% |
| Overall | 85.5% | 86.4% | 84.3% | 85.4% |

The reason for the small step-change in accuracy between hours 0-2 and 2-4 is that for hours 0-2 the WP4 forecasting methodology is used, which uses the distribution of deviations from the measured baseline during the 2 hours immediately prior to the nowcast period; for hours 2-4 onwards the adjustment is made based on the deviations 24 hours previously.

The above results and associated discussion are presented for exemplary purposes only—and for validation of the tested forecasting models, according to some embodiments—and should not, therefore, be taken as limiting the scope of the patent.

The invention claimed is:

1. A system configured to deliver a sensory alert indicative of crop spraying conditions in an agricultural region independent of inversion conditions as measured by vertical temperature difference, the system including:
   at least one monitoring physical tower which extends from ground level in the agricultural region, wherein the tower includes a first anemometer configured to measure a first horizontal wind speed at a first predetermined height above the ground level, and a second anemometer configured to measure a second horizontal wind speed at a second predetermined height above the ground level;
   a processor which is configured to process periodic values of the first horizontal wind speed and the second horizontal wind speed, thereby to derive a real-time measure representative of a local vertical turbulence characteristic for the location of the monitoring tower, wherein the real-time measure representative of a local vertical turbulence characteristic for the location of the monitoring tower is based on a standard deviation of vertical wind speed at the agricultural location, wherein the standard deviation of vertical wind speed is calculated by processing in combination the periodic values of the first horizontal wind speed and the periodic values of the second horizontal wind speed; and an output which is configured to provide the sensory alert indicative of crop spraying conditions independent of inversion conditions based on a comparison between: (i) the real-time measure representative of the local vertical turbulence characteristic; and (ii) one or more predetermined threshold values.

2. A system according to claim 1 wherein the output is configured to cause the sensory alert to be communicated via a mobile device remote of the physical monitoring tower.

3. A system according to claim 1 wherein there is a plurality of the physical monitoring towers, and wherein the system includes a component which is configured to determine a user location associated with a client device which provides a request, and cause the sensory alert to be provided to that client device based on the user location.

4. A system according to claim 3 wherein the sensory alert to be provided to that client device based on the user location is derived from the one of the plurality of the physical monitoring towers closest to the user location.

5. A system according to claim 3 wherein the sensory alert to be provided to that client device based on the user location is derived from data interpolation using multiple of the plurality of the physical monitoring towers thereby to provide a predicted value for the user location.

6. A system according to claim 5 wherein deriving the sensory alert from data interpolation using multiple of the plurality of the physical monitoring towers thereby to provide a predicted value for the user location includes:

selecting a subset plurality of the physical towers based on the proximity of the physical towers to the client device;

processing the respective real-time measures representative of the local vertical turbulence characteristic for each of the selected monitoring towers; and interpolating the real-time measures between the locations of the respective data loggers to determine an interpolated estimate for a client device location vertical turbulence characteristic;

wherein the output is configured to provide a sensory alert indicative of crop spraying conditions independent of inversion conditions for the client device location based on that interpolated estimate.

7. A system according to claim 1 wherein the system is additionally configured to generate output representative of predicted future of crop spraying conditions.

8. A system according to claim 7 wherein generating the output representative of predicted future of crop spraying conditions includes:

processing stored data including historical values of the real-time measure representative of the local vertical turbulence characteristic for a predetermined past period, thereby to estimate a probability distribution for a forecast local vertical turbulence characteristic over a selected future period, based on statistical characteristics stored data including historical values of the real-time measure representative of the local vertical turbulence characteristic;

wherein the output is configured to provide a sensory alert indicative of crop spraying conditions independent of inversion conditions based on that forecast local vertical turbulence characteristic over a selected future period.

9. A system according to claim 8 wherein estimating the probability distribution for the forecast local vertical turbulence characteristic over a selected future period includes:

determining statistical deviations in local vertical turbulence characteristics over the predetermined past period relative to a historical baseline for the local vertical turbulence characteristic; and combining the determined statistical deviations with the historical baseline at each of a plurality of timepoints over the selected future period to estimate the probability distribution for the local vertical turbulence characteristic at each timepoint.

10. A system according to claim 9 wherein the historical baseline is determined based on stored baseline data of the local vertical turbulence characteristic from a plurality of previous days at a similar time of day to the time of day of the selected future period.

11. A system configured to deliver a sensory alert indicative of crop spraying conditions in an agricultural region independent of inversion conditions as measured by vertical temperature difference, the system including:

at least one monitoring physical tower which extends from ground level in the agricultural region, wherein the tower includes one or more anemometers configured to measure respective wind speeds at a predetermined heights above the ground level, wherein the one or more anemometers include at least one 3D anemometer configured to measure three-dimensional wind speed components;

a processor which is configured to process periodic values of respective wind speeds at a predetermined heights above the ground level, thereby to derive a real-time measure representative of a local vertical turbulence characteristic for the location of the monitoring tower, wherein the real-time measure representative of a local vertical turbulence characteristic for the location of the monitoring tower is based on a standard deviation of vertical wind speed at the agricultural location; and an output which is configured to provide the sensory alert indicative of crop spraying conditions independent of inversion conditions based on a comparison between: (i) the real-time measure representative of the local vertical turbulence characteristic; and (ii) one or more predetermined threshold values.

12. A system according to claim 11 wherein the one or more anemometers configured to measure respective wind speeds at a predetermined heights above the ground level include at least one 3D anemometer configured to measure three-dimensional wind speed components and at least one 2D anemometer configured to measure 2D horizontal wind speed characteristics.

13. A system according to claim 12 wherein the standard deviation of vertical wind speed at the agricultural location is calculated via a combination of: (i) a first estimate of the standard deviation of vertical wind speed as measured by the 3D anemometers, and (ii) an estimate of the standard deviation of horizontal wind speed derived from the 2D anemometer.

14. A system according to claim 11 wherein the output is configured to cause the sensory alert to be communicated via a mobile device remote of the physical monitoring tower.

15. A system according to claim 11 wherein there is a plurality of the physical monitoring towers, and wherein the system includes a component which is configured to determine a user location associated with a client device which provides a request, and cause the sensory alert to be provided to that client device based on the user location.

16. A system according to claim 15 wherein the sensory alert to be provided to that client device based on the user location is derived from the one of the plurality of the physical monitoring towers closest to the user location.

17. A system according to claim 15 wherein the sensory alert to be provided to that client device based on the user location is derived from data interpolation using multiple of the plurality of the physical monitoring towers thereby to provide a predicted value for the user location.

18. A system according to claim 17 wherein deriving the sensory alert from data interpolation using multiple of the plurality of the physical monitoring towers thereby to provide a predicted value for the user location includes:

selecting a subset plurality of the physical towers based on the proximity of the physical towers to the client device;

processing the respective real-time measures representative of the local vertical turbulence characteristic for each of the selected monitoring towers; and interpolating the real-time measures between the locations of the respective data loggers to determine an interpolated estimate for a client device location vertical turbulence characteristic;

wherein the output is configured to provide a sensory alert indicative of crop spraying conditions independent of inversion conditions for the client device location based on that interpolated estimate.

19. A system according to claim 11 wherein the system is additionally configured to generate output representative of predicted future of crop spraying conditions.

20. A system according to claim 19 wherein generating the output representative of predicted future of crop spraying conditions includes:

processing stored data including historical values of the real-time measure representative of the local vertical turbulence characteristic for a predetermined past period, thereby to estimate a probability distribution for a forecast local vertical turbulence characteristic over a selected future period, based on statistical characteristics stored data including historical values of the real-time measure representative of the local vertical turbulence characteristics;

wherein the output is configured to provide a sensory alert indicative of crop spraying conditions independent of inversion conditions based on that forecast local vertical turbulence characteristic over a selected future period.

21. A system according to claim 20 wherein estimating the probability distribution for the forecast local vertical turbulence characteristic over a selected future period includes:

determining statistical deviations in local vertical turbulence characteristics over the predetermined past period relative to a historical baseline for the local vertical turbulence characteristics; and combining the determined statistical deviations with the historical baseline at each of a plurality of timepoints over the selected future period to estimate the probability distribution for the local vertical turbulence characteristic at each timepoint.

22. A system according to claim 21 wherein the historical baseline is determined based on stored baseline data of the local vertical turbulence characteristic from a plurality of previous days at a similar time of day to the time of day of the selected future period.

\* \* \* \* \*